(12) United States Patent
Adachi et al.

(10) Patent No.: US 7,657,372 B2
(45) Date of Patent: Feb. 2, 2010

(54) MAP MATCHING METHOD, MAP MATCHING DEVICE, DATABASE FOR SHAPE MATCHING, AND SHAPE MATCHING DEVICE

(75) Inventors: Shinya Adachi, Yokohama (JP); Makoto Sato, Sagamihara (JP)

(73) Assignee: Panasonic Corporation, Osaka (JP)

( * ) Notice: Subject to any disclaimer, the term of this patent is extended or adjusted under 35 U.S.C. 154(b) by 971 days.

(21) Appl. No.: 10/509,315

(22) PCT Filed: Mar. 28, 2003

(86) PCT No.: PCT/JP03/04022

§ 371 (c)(1),
(2), (4) Date: Apr. 11, 2005

(87) PCT Pub. No.: WO03/088189

PCT Pub. Date: Oct. 23, 2003

(65) Prior Publication Data

US 2005/0228584 A1  Oct. 13, 2005

(30) Foreign Application Priority Data

Mar. 29, 2002 (JP) .............................. 2002-096893
Sep. 30, 2002 (JP) .............................. 2002-288149

(51) Int. Cl.
*G01C 21/30* (2006.01)

(52) U.S. Cl. .................. 701/208; 701/209; 701/213; 340/995.14

(58) Field of Classification Search ......... 701/200–213; 340/995.1–995.23

See application file for complete search history.

(56) References Cited

U.S. PATENT DOCUMENTS 5,285,391 A * 2/1994 Smith et al. ................ 701/200

(Continued)

FOREIGN PATENT DOCUMENTS

EP    0 706 031    4/1996

(Continued)

OTHER PUBLICATIONS

European Search Report Dated Dec. 4, 2007.

(Continued)

*Primary Examiner*—Richard M. Camby
(74) *Attorney, Agent, or Firm*—Pearne & Gordon LLP

(57) ABSTRACT

An object of the present invention is to provide a map matching method capable of performing a process operation in a high speed. In the map matching method of the present invention, while employing road network data in which road networks are formed in a plurality of hierarchical layers "a", "b", "c", and a road network of an upper-grade hierarchical layer is established by such a road network which is extracted from a road network having a lower-grade hierarchical layer lower than the road network having the upper-grade hierarchical layer, a road network of the uppermost-grade hierarchical layer "a" is matched with a shape vector indicative of a shape of a objective road in a beginning stage; and when such a candidate road which is matched with the shape vector cannot be obtained in the road network of the uppermost-grade hierarchical layer "a", since such a road network having another hierarchical layer "b", or "c" is matched with the shape vector, the objective road is identified. In the most cases, as to a objective road of traffic information and the like, the objective road can be identified by executing a map matching operation with employment of the road network having the uppermost-grade hierarchical layer "a", and the map matching operation can be carried out in a high speed.

4 Claims, 65 Drawing Sheets

U.S. PATENT DOCUMENTS

| | | | | |
|---|---|---|---|---|
| 5,519,619 | A | * | 5/1996 | Seda .......................... 701/201 |
| 5,552,990 | A | | 9/1996 | Ihara et al. |
| 6,636,802 | B1 | | 10/2003 | Nakano et al. |

FOREIGN PATENT DOCUMENTS

| | | |
|---|---|---|
| JP | 7-36381 | 2/1995 |
| JP | 7-114692 | 5/1995 |
| JP | 7-260499 | 10/1995 |
| JP | 7-280576 | 10/1995 |
| JP | 9-304093 | 11/1997 |
| JP | 11-83511 | 3/1999 |
| JP | 11-257987 | 9/1999 |
| JP | 2000-146607 | 5/2000 |
| JP | 2001-27536 | 1/2001 |
| JP | 2001-56823 | 2/2001 |
| JP | 2001-91284 | 4/2001 |
| JP | 2001-147131 | 5/2001 |
| JP | 2001-147925 | 5/2001 |
| WO | 93-03452 | 2/1993 |
| WO | 01-01370 | 1/2001 |

OTHER PUBLICATIONS

Guzolek J et al.; "Real-time route planning in road networks"; Vehicle navigation and information systems conference, 1989. Conference Record Toronto, Ont., Canada; Sep. 11-13, 1989, New York, NY; IEEE Sep. 11, 1989; pp. 165-169.

Matsuda, A. "Gazo Joho no Chikuseki Kensaku Gijutsu", IN: The Journal of the Institute of Image Information and Television Engineers. Jun. 20, 1997, vol. 51, No. 6, pp. 763-765.

* cited by examiner

FIG. 1

| HEADER INFORMATION (SECTION DEFINITION ETC.) ||
|---|---|
| TOTAL NODE NUMBER N ||
| NODE NUMBER 1 ||
| NODE ATTRIBUTE INFORMATION OF NODE 1 ||
| LONGITUDE OF NODE 1 | LATITUDE OF NODE 1 |
| TOTAL NUMBER OF NODES CONNECTED TO NODE 1 ||
| CONNECTION NODE NUMBER #1 | LINK NUMBER #1-1 |
| ⋮ | ⋮ |
| CONNECTION NODE NUMBER #m | LINK NUMBER #1-m |
| ⋮ | ⋮ |
| NODE NUMBER N ||
| NODE ATTRIBUTE INFORMATION OF NODE N ||
| LONGITUDE OF NODE N | LATITUDE OF NODE N |
| TOTAL NUMBER OF NODES CONNECTED TO NODE N ||
| CONNECTION NODE NUMBER #1 | LINK NUMBER #N-1 |
| ⋮ | ⋮ |
| CONNECTION NODE NUMBER #m | LINK NUMBER #N-m |
| TOTAL LINK NUMBER L ||
| LINK NUMBER 1 ||
| ROAD ATTRIBUTE INFORMATION OF LINK 1 ||
| TOTAL STRUCTURAL INTERPOLATION POINT NUMBER OF LINK 1 ||
| LONGITUDE OF INTERPOLATION POINT 1-1 | LATITUDE OF INTERPOLATION POINT 1-1 |
| ⋮ | ⋮ |
| LONGITUDE OF INTERPOLATION POINT 1-p | LATITUDE OF INTERPOLATION POINT 1-p |
| ⋮ | ⋮ |
| LINK NUMBER L ||
| ROAD ATTRIBUTE INFORMATION OF LINK L ||
| TOTAL STRUCTURAL INTERPOLATION POINT NUMBER OF LINK L ||
| LONGITUDE OF INTERPOLATION POINT L-1 | LATITUDE OF INTERPOLATION POINT L-1 |
| ⋮ | ⋮ |
| LONGITUDE OF INTERPOLATION POINT L-p | LATITUDE OF INTERPOLATION POINT L-p |

FIG. 3

(a) UPPER-GRADE ROAD NETWORK DATA

| HEADER INFORMATION (HIERARCHICAL NUMBER/SECTION DEFINITION ETC.) ||
|---|---|
| TOTAL NODE NUMBER N1 ||
| NODE NUMBER 1 ||
| NODE ATTRIBUTE INFORMATION OF NODE 1 ||
| LATITUDE OF NODE 1 | LONGITUDE OF NODE 1 |
| TOTAL NUMBER OF NODES CONNECTED TO NODE 1 ||
| CONNECTION NODE NUMBER #J1 | LINK NUMBER #J1-1 |
| ⋮ ||
| CONNECTION NODE NUMBER #Jm | LINK NUMBER #J1-m |
| ⋮  ⋮ ||
| NODE NUMBER S ||
| NODE ATTRIBUTE INFORMATION OF NODE S ||
| LONGITUDE OF NODE S | LATITUDE OF NODE S |
| TOTAL NUMBER OF NODES CONNECTED TO NODE S (=1) ||
| CONNECTION NODE NUMBER #J1 | LINK NUMBER #SJ1 |
| ⋮  ⋮ ||
| TOTAL LINK NUMBER L1 ||
| LINK NUMBER A ||
| ROAD ATTRIBUTE INFORMATION OF LINK A ||
| TOTAL STRUCTURAL INTERPOLATION POINT NUMBER OF LINK A ||
| LONGITUDE OF INTERPOLATION POINT A-1 | LATITUDE OF INTERPOLATION POINT A-1 |
| ⋮ ||
| LONGITUDE OF INTERPOLATION POINT A-p | LATITUDE OF INTERPOLATION POINT A-p |
| ⋮  ⋮ ||
| LINK NUMBER SJ1 ||
| ROAD ATTRIBUTE INFORMATION OF LINK SJ1 ||
| TOTAL STRUCTURAL INTERPOLATION POINT NUMBER OF LINK SJ1 ||
| LONGITUDE OF INTERPOLATION POINT 1 | LATITUDE OF INTERPOLATION POINT 1 |
| ⋮ ||
| LONGITUDE OF INTERPOLATION POINT p | LATITUDE OF INTERPOLATION POINT p |
| ⋮  ⋮ ||

(CONT.)

(b) MIDDLE-GRADE ROAD NETWORK DATA

| HEADER INFORMATION (HIERARCHICAL NUMBER/SECTION DEFINITION ETC.) ||
|---|---|
| TOTAL NODE NUMBER N2 ||
| NODE NUMBER 1 ||
| NODE ATTRIBUTE INFORMATION OF NODE 1 ||
| LATITUDE OF NODE 1 | LONGITUDE OF NODE 1 |
| TOTAL NUMBER OF NODES CONNECTED TO NODE 1 ||
| CONNECTION NODE NUMBER #K1 | LINK NUMBER #K1-1 |
| ⋮ ||
| CONNECTION NODE NUMBER #Km | LINK NUMBER #K1-m |
| ⋮ ⋮ ||
| NODE NUMBER S ||
| NODE ATTRIBUTE INFORMATION OF NODE S ||
| LONGITUDE OF NODE S | LATITUDE OF NODE S |
| TOTAL NUMBER OF NODES CONNECTED TO NODE S (=2) ||
| CONNECTION NODE NUMBER #K1 | LINK NUMBER #SK1 |
| CONNECTION NODE NUMBER #K2 | LINK NUMBER #SK2 |
| ⋮ ⋮ ||
| TOTAL LINK NUMBER L2 ||
| LINK NUMBER B ||
| ROAD ATTRIBUTE INFORMATION OF LINK B ||
| TOTAL STRUCTURAL INTERPOLATION POINT NUMBER OF LINK B ||
| LONGITUDE OF INTERPOLATION POINT B-1 | LATITUDE OF INTERPOLATION POINT B-1 |
| ⋮ ||
| LONGITUDE OF INTERPOLATION POINT B-p | LATITUDE OF INTERPOLATION POINT B-p |
| ⋮ ⋮ ||
| LINK NUMBER SK2 ||
| ROAD ATTRIBUTE INFORMATION OF LINK SK2 ||
| TOTAL STRUCTURAL INTERPOLATION POINT NUMBER OF LINK SK2 ||
| LONGITUDE OF INTERPOLATION POINT 1 | LATITUDE OF INTERPOLATION POINT 1 |
| ⋮ ||
| LONGITUDE OF INTERPOLATION POINT q | LATITUDE OF INTERPOLATION POINT q |
| ⋮ ⋮ ||

(c) LOWER-GRADE ROAD NETWORK DATA

| HEADER INFORMATION (HIERARCHICAL NUMBER/SECTION DEFINITION ETC.) ||
|---|---|
| TOTAL NODE NUMBER N3 ||
| NODE NUMBER 1 ||
| NODE ATTRIBUTE INFORMATION OF NODE 1 ||
| LATITUDE OF NODE 1 | LONGITUDE OF NODE 1 |
| TOTAL NUMBER OF NODES CONNECTED TO NODE 1 ||
| CONNECTION NODE NUMBER #1 | LINK NUMBER #1-1 |
| ⋮ ||
| CONNECTION NODE NUMBER #m | LINK NUMBER #1-m |
| ⋮ ⋮ ||
| NODE NUMBER S ||
| NODE ATTRIBUTE INFORMATION OF NODE S ||
| LONGITUDE OF NODE S | LATITUDE OF NODE S |
| TOTAL NUMBER OF NODES CONNECTED TO NODE S (=3) ||
| CONNECTION NODE NUMBER #M1 | LINK NUMBER #SM1 |
| CONNECTION NODE NUMBER #M2 | LINK NUMBER #SM2 |
| CONNECTION NODE NUMBER #M3 | LINK NUMBER #SM3 |
| ⋮ ⋮ ||
| TOTAL LINK NUMBER L3 ||
| LINK NUMBER C ||
| ROAD ATTRIBUTE INFORMATION OF LINK C ||
| TOTAL STRUCTURAL INTERPOLATION POINT NUMBER OF LINK C ||
| LONGITUDE OF INTERPOLATION POINT C-1 | LATITUDE OF INTERPOLATION POINT C-1 |
| ⋮ ||
| LONGITUDE OF INTERPOLATION POINT C-p | LATITUDE OF INTERPOLATION POINT C-p |
| ⋮ ⋮ ||
| LINK NUMBER SM2 ||
| ROAD ATTRIBUTE INFORMATION OF LINK SM2 ||
| TOTAL STRUCTURAL INTERPOLATION POINT NUMBER OF LINK SM2 ||
| LONGITUDE OF INTERPOLATION POINT 1 | LATITUDE OF INTERPOLATION POINT 1 |
| ⋮ ||
| LONGITUDE OF INTERPOLATION POINT r | LATITUDE OF INTERPOLATION POINT r |
| ⋮ ⋮ ||

FIG. 9
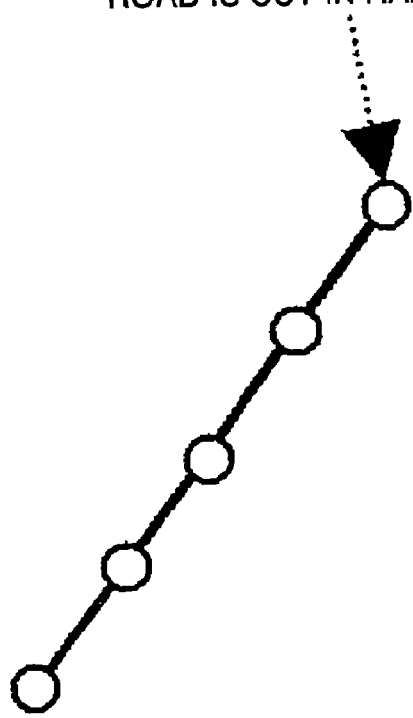
EXAMPLE IN WHICH PARALLEL-TRAVELING ROAD IS CUT IN HALF WAY
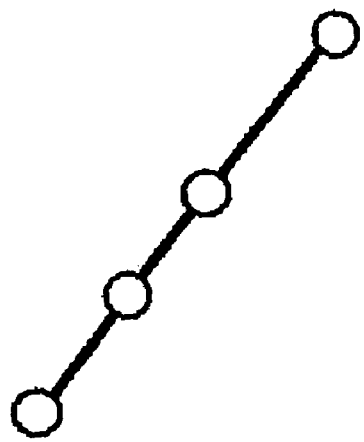

FIG. 10

EXAMPLE OF MAP MATCHING PURPOSE ROAD NETWORK DATA (a)

| HEADER INFORMATION (HIERARCHICAL NUMBER/SECTION DEFINITION ETC.) ||
|---|---|
| TOTAL NODE NUMBER N ||
| NODE NUMBER 1 ||
| ATTRIBUTE INFORMATION OF NODE 1 ||
| LONGITUDE OF NODE 1 | LATITUDE OF NODE 1 |
| TOTAL NUMBER OF NODES CONNECTED TO NODE 1 ||
| CONNECTION NODE NUMBER #1 | LINK NUMBER #1-1 |
| ⋮ ||
| CONNECTION NODE NUMBER #m | LINK NUMBER #1-m |
| ⋮ ⋮ ||
| TOTAL LINK NUMBER L ||
| LINK NUMBER 1 ||
| ROAD ATTRIBUTE INFORMATION OF LINK 1 ||
| PARALLEL-TRAVELING RESEMBLING SHAPE ATTRIBUTE OF LINK 1 ||
| TOTAL STRUCTURAL INTERPOLATION POINT NUMBER OF LINK 1 ||
| LONGITUDE OF INTERPOLATION POINT 1-1 | LATITUDE OF INTERPOLATION POINT 1-1 |
| ⋮ ||
| LONGITUDE OF INTERPOLATION POINT 1-p | LATITUDE OF INTERPOLATION POINT 1-p |
| ⋮ ⋮ ||
| LINK NUMBER L ||
| ROAD ATTRIBUTE INFORMATION OF LINK L ||
| PARALLEL-TRAVELING RESEMBLING SHAPE ATTRIBUTE OF LINK L ||
| TOTAL STRUCTURAL INTERPOLATION POINT NUMBER OF LINK L ||
| LONGITUDE OF INTERPOLATION POINT L-1 | LATITUDE OF INTERPOLATION POINT L-1 |
| ⋮ ||
| LONGITUDE OF INTERPOLATION POINT L-p | LATITUDE OF INTERPOLATION POINT L-p |

(CONT.)

(b) PARALLEL-TRAVELING RESEMBLING SHAPED ROAD
PRESENCE/ABSENCE INFORMATION
(IN CASE THAT ONE DIRECTION IS REPRESENTED BY 1 LINK)

| PRESENCE/ABSENCE OF PARALLEL-TRAVELING RESEMBLING SHAPE (PRESENCE/PRESENCE IN PARTIAL SECTION/ABSENCE) |
|---|
| CONNECTION/NON-CONNECTION AT UP/DOWN-STREAM SIDED INTERSECTIONS |

EXAMPLE OF MAP MATCHING PURPOSE ROAD NETWORK DATA (a)

| HEADER INFORMATION (HIERARCHICAL NUMBER/SECTION DEFINITION ETC.) ||
|---|---|
| TOTAL NODE NUMBER N ||
| NODE NUMBER 1 ||
| ATTRIBUTE INFORMATION OF NODE 1 ||
| LONGITUDE OF NODE 1 | LATITUDE OF NODE 1 |
| TOTAL NUMBER OF NODES CONNECTED TO NODE 1 ||
| CONNECTION NODE NUMBER #1 | LINK NUMBER #1-1 |
| ⋮ | |
| CONNECTION NODE NUMBER #m | LINK NUMBER #1-m |
| ⋮ | ⋮ |
| TOTAL LINK NUMBER L ||
| LINK NUMBER 1 ||
| ROAD ATTRIBUTE INFORMATION (ROAD SOAT ETC.) OF LINK 1 ||
| PARALLEL-TRAVELING RESEMBLING SHAPE ATTRIBUTE OF LINK 1 ||
| TOTAL STRUCTURAL INTERPOLATION POINT NUMBER OF LINK 1 ||
| LONGITUDE OF INTERPOLATION POINT 1-1 | LATITUDE OF INTERPOLATION POINT 1-1 |
| ⋮ | |
| LONGITUDE OF INTERPOLATION POINT 1-p | LATITUDE OF INTERPOLATION POINT 1-p |
| ⋮ | ⋮ |
| LINK NUMBER L ||
| ROAD ATTRIBUTE INFORMATION (ROAD SOAT ETC.) OF LINK L ||
| PARALLEL-TRAVELING CONNECTING SHAPE ATTRIBUTE OF LINK L ||
| TOTAL STRUCTURAL INTERPOLATION POINT OF LINK L ||
| LONGITUDE OF INTERPOLATION POINT L-1 | LATITUDE OF INTERPOLATION POINT L-1 |
| ⋮ | |
| LONGITUDE OF INTERPOLATION POINT L-p | LATITUDE OF INTERPOLATION POINT L-p |

(CONT.)

(b)
PARALLEL-TRAVELING RESEMBLING SHAPE ATTRIBUTE INFORMATION
(IN CASE THAT ONE DIRECTION IS INDICATED BY 1 LINK)

| | |
|---|---|
| DECLINATION ACCUMULATED VALUE OF LINK 1 ||
| DECLINATION ABSOLUTE VALUE ACCUMULATED VALUE OF LINK 1 ||
| TOTAL NUMBER OF PARALLEL-TRAVELING RESEMBLING SHAPES ||
| RESEMBLING SHAPE EVALUATION VALUE | HIERARCHICAL LAYER |
| ROAD ATTRIBUTE | ENTIRE/PARTIAL IDENTIFY |
| DECLINATION ACCUMULATED VALUE ||
| DECLINATION ABSOLUTE VALUE ACCUMULATED VALUE ||
| FLUCTUATION (STANDARD DEVIATION) WITH RESPECT TO LINK 1 ||
| CONNECT/NOT CONNECT AT UP-STREAM SIDED INTERSECTION ||
| DECLINATION ABSOLUTE VALUE ACCUMULATED VALUE (MINIMUM VALUE) OF CONNECTION PORTION ||
| RESEMBLING SHAPE EVALUATION VALUE | HIERARCHICAL LAYER |
| ROAD ATTRIBUTE | ENTIRE/PARTIAL IDENTIFY |
| DECLINATION ACCUMULATED VALUE ||
| DECLINATION ABSOLUTE VALUE ACCUMULATED VALUE ||
| FLUCTUATION (STANDARD DEVIATION) WITH RESPECT TO LINK 1 ||
| CONNECT/NON-CONNECT FLAG TO UP-STREAM SIDED INTERSECTION ||
| DECLINATION ABSOLUTE VALUE ACCUMULATED VALUE (MINIMUM VALUE) OF CONNECTION PORTION ||

(FIG. 12 CONTINUED)

EXAMPLE IN WHICH PARALLEL-TRAVELING
ROAD IS PRESENT IN PARTIAL SECTION

FIG. 21

| HEADER INFORMATION (HIERARCHICAL NUMBER/SECTION DEFINITION ETC.) ||
|---|---|
| TOTAL NODE NUMBER N ||
| NODE NUMBER 1 ||
| ATTRIBUTE INFORMATION OF NODE 1 ||
| LONGITUDE OF NODE 1 | LATITUDE OF NODE 1 |
| TOTAL NUMBER OF NODES CONNECTED TO NODE 1 ||
| CONNECTION NODE NUMBER #1 | LINK NUMBER #1-1 |
| ⋮ | |
| CONNECTION NODE NUMBER #m | LINK NUMBER #1-m |
| ⋮  ⋮ ||
| TOTAL LINK NUMBER L ||
| LINK NUMBER 1 ||
| ROAD ATTRIBUTE INFORMATION OF LINK 1 ||
| PARALLEL-TRAVELING RESEMBLING SHAPE ATTRIBUTE OF LINK 1 ||
| UPPERMOST-GRADE LAYER NUMBER OF PRESENT ROAD ||
| TOTAL STRUCTURAL INTERPOLATION POINT OF LINK 1 ||
| LONGITUDE OF INTERPOLATION POINT 1-1 | LATITUDE OF INTERPOLATION POINT 1-1 |
| RECOMMENDED SKIP DISTANCE IN LINK BETWEEN 1-1 AND 1-2 ||
| (RETURN DISTANCE IN LINK BETWEEN 1-1 AND 1-2 WHEN MAP MATCHING OPERATION IS TRANSFERRED TO LOWER-GRADE LAYER) ||
| LONGITUDE OF INTERPOLATION POINT 1-2 | LATITUDE OF INTERPOLATION POINT 1-2 |
| ⋮ ||
| LONGITUDE OF INTERPOLATION POINT 1-p | LATITUDE OF INTERPOLATION POINT 1-p |
| ⋮  ⋮ ||

FIG. 24

SHAPE VECTOR DATA STREAM

| |
|---|
| BASE MAP PRECISION INFORMATION OF SHAPE VECTOR |
| SHAPE VECTOR STREAM IDENTIFICATION NUMBER = 1 |
| ROAD ATTRIBUTE |
| MAXIMUM DEFORMATION AMOUNT [m] WHEN DEFORMATION IS MADE SO AS TO PREVENT ERRONEOUS MAP MATCHING OPERATION |
| MAXIMUM ALLOWABLE ERROR AMOUNT [m] WHEN NON-REVERSIBLE COMPRESSING OPERATION IS CARRIED OUT |
| TOTAL NODE NUMBER OF SHAPE DATA AFTER COMPRESSING OPERATION |
| NODE NUMBER p1 |
| X-DIRECTION ABSOLUTE COORDINATE (LONGITUDE) OF NODE 1 |
| Y-DIRECTION ABSOLUTE COORDINATE (LONGITUDE) OF NODE 1 |
| SHAPE DATA WHICH HAS BEEN NONREVERSIBLE-COMPRESSED |
| ⋮ |
| SHAPE VECTOR STREAM IDENTIFICATION NUMBER = 100 |
| ⋮ |
| SHAPE VECTOR STREAM IDENTIFICATION NUMBER = ZZ |
| ⋮ |

UPPER-GRADE ROAD NETWORK DATA

| |
|---|
| HEADER INFORMATION (HIERARCHICAL LAYER NUMBER/SECTION DEFINITION ETC.) |
| TOTAL NODE NUMBER N1 |
| NODE NUMBER 1 |
| ATTRIBUTE INFORMATION OF NODE 1 |

| | |
|---|---|
| LONGITUDE OF NODE 1 | LATITUDE OF NODE 1 |

| |
|---|
| TOTAL NUMBER OF NODES CONNECTED TO NODE 1 |

| | |
|---|---|
| CONNECTION NODE NUMBER #J1 | LINK NUMBER #J1-1 |
| ⋮ | |
| CONNECTION NODE NUMBER #Jm | LINK NUMBER #J1-m |

⋮

| |
|---|
| NODE NUMBER S |
| NODE ATTRIBUTE INFORMATION OF NODE S |

| | |
|---|---|
| LONGITUDE OF NODE S | LATITUDE OF NODE S |

| |
|---|
| TOTAL NUMBER OF NODES CONNECTED TO NODE S (=2) |

| | |
|---|---|
| CONNECTION NODE NUMBER #J1 | LINK NUMBER #SJ1 |
| CONNECTION NODE NUMBER #J2 | LINK NUMBER #SJ2 |

⋮

| |
|---|
| TOTAL LINK NUMBER L1 |
| LINK NUMBER A |
| ROAD ATTRIBUTE INFORMATION OF LINK A |
| PARALLEL-TRAVELING RESEMBLING SHAPE ATTRIBUTE OF LINK A |
| TOTAL STRUCTURAL INTERPOLATION POINT NUMBER OF LINK A |

| | |
|---|---|
| LONGITUDE OF INTERPOLATION POINT A-1 | LATITUDE OF INTERPOLATION POINT A-1 |
| ⋮ | |
| LONGITUDE OF INTERPOLATION POINT A-p | LATITUDE OF INTERPOLATION POINT A-p |

⋮

| |
|---|
| LINK NUMBER SJ1 |
| ROAD ATTRIBUTE INFORMATION OF LINK SJ1 |
| PARALLEL-TRAVELING CONNECTING SHAPE ATTRIBUTE OF LINK SJ1 |
| TOTAL STRUCTURAL INTERPOLATION POINT OF LINK SJ1 |

| | |
|---|---|
| LONGITUDE OF INTERPOLATION POINT 1 | LATITUDE OF INTERPOLATION POINT 1 |
| ⋮ | |
| LONGITUDE OF INTERPOLATION POINT p | LATITUDE OF INTERPOLATION POINT p |

⋮

(CONT.)

(b) LOWER-GRADE ROAD NETWORK DATA

| HEADER INFORMATION (HIERARCHICAL LAYER NUMBER/SECTION DEFINITION ETC.) ||
|---|---|
| TOTAL NODE NUMBER N1 ||
| NODE NUMBER 1 ||
| ATTRIBUTE INFORMATION OF NODE 1 ||
| LONGITUDE OF NODE 1 | LATITUDE OF NODE 1 |
| TOTAL NUMBER OF NODES CONNECTED TO NODE 1 ||
| CONNECTION NODE NUMBER #1 | LINK NUMBER #1-1 |
| ⋮ | ⋮ |
| CONNECTION NODE NUMBER #m | LINK NUMBER #1-m |
| ⋮ | ⋮ |
| NODE NUMBER S ||
| NODE ATTRIBUTE INFORMATION OF NODE S ||
| LONGITUDE OF NODE S | LATITUDE OF NODE S |
| TOTAL NUMBER OF NODES CONNECTED TO NODE S (=3) ||
| CONNECTION NODE NUMBER #K1 | LINK NUMBER #SK1 |
| CONNECTION NODE NUMBER #K2 | LINK NUMBER #SK2 |
| CONNECTION NODE NUMBER #K3 | LINK NUMBER #SK3 |
| ⋮ | ⋮ |
| TOTAL LINK NUMBER L2 ||
| LINK NUMBER B ||
| ROAD ATTRIBUTE INFORMATION OF LINK B ||
| PARALLEL-TRAVELING RESEMBLING SHAPE ATTRIBUTE OF LINK B ||
| TOTAL STRUCTURAL INTERPOLATION POINT NUMBER OF LINK B ||
| LONGITUDE OF INTERPOLATION POINT B-1 | LATITUDE OF INTERPOLATION POINT B-1 |
| ⋮ | ⋮ |
| LONGITUDE OF INTERPOLATION POINT B-p | LATITUDE OF INTERPOLATION POINT B-p |
| ⋮ | ⋮ |
| LINK NUMBER SK2 ||
| ROAD ATTRIBUTE INFORMATION OF LINK SK2 ||
| PARALLEL-TRAVELING CONNECTING SHAPE ATTRIBUTE OF LINK SK2 ||
| TOTAL STRUCTURAL INTERPOLATION POINT OF LINK SK2 ||
| LONGITUDE OF INTERPOLATION POINT 1 | LATITUDE OF INTERPOLATION POINT 1 |
| ⋮ | ⋮ |
| LONGITUDE OF INTERPOLATION POINT p' | LATITUDE OF INTERPOLATION POINT p' |
| ⋮ | ⋮ |

(c) CACHE LAYER ROAD NETWORK DATA (HATCHED PORTIONS OF UPPER-GRADE/LOWER-GRADE LAYER DATA ARE COPIED, AND EVERY TIME TOTAL NUMBER OF NODES IS CALCULATED, CACHE LAYER ROAD NETWORK DATA IS PRODUCED)

| HEADER INFORMATION (HIERARCHICAL LAYER NUMBER/SECTION DEFINITION ETC.) | |
|---|---|
| TOTAL NODE NUMBER N (SEQUENTIALLY ADD EVERY COPY) | |
| ⋮ | ⋮ |
| NODE NUMBER S | |
| ATTRIBUTE INFORMATION OF NODE S | |
| LONGITUDE OF NODE S | LATITUDE OF NODE S |
| TOTAL NUMBER OF NODES CONNECTED TO NODE S (=2) | |
| CONNECTION NODE NUMBER #J1 | LINK NUMBER #SJ1 |
| CONNECTION NODE NUMBER #K2 | LINK NUMBER #SK2 |
| ⋮ | ⋮ |
| TOTAL LINK NUMBER L (SEQUENTIALLY ADD EVERY COPY) | |
| ⋮ | ⋮ |
| LINK NUMBER SJ1 | |
| ROAD ATTRIBUTE INFORMATION OF LINK SJ1 | |
| PARALLEL-TRAVELING RESEMBLING SHAPE ATTRIBUTE OF LINK SJ1 | |
| TOTAL STRUCTURAL INTERPOLATION POINT OF LINK SJ1 | |
| LONGITUDE OF INTERPOLATION POINT 1 | LATITUDE OF INTERPOLATION POINT 1 |
| ⋮ | ⋮ |
| LONGITUDE OF INTERPOLATION POINT p | LATITUDE OF INTERPOLATION POINT p |
| ⋮ | ⋮ |
| LINK NUMBER SK2 | |
| ROAD ATTRIBUTE INFORMATION OF LINK SK2 | |
| PARALLEL-TRAVELING CONNECTING SHAPE ATTRIBUTE OF LINK SK2 | |
| TOTAL STRUCTURAL INTERPOLATION POINT NUMBER OF LINK SK2 | |
| LONGITUDE OF INTERPOLATION POINT 1 | LATITUDE OF INTERPOLATION POINT 1 |
| ⋮ | ⋮ |
| LONGITUDE OF INTERPOLATION POINT p' | LATITUDE OF INTERPOLATION POINT p' |
| ⋮ | ⋮ |

FIG. 31

EXAMPLE 1, SHAPE VECTOR DATA STREAM (HIERARCHICAL LAYER JUDGING INFORMATION IS ADDED IN UNIT OF SHAPE VECTOR)

(a)

| SHAPE VECTOR STREAM IDENTIFICATION NUMBER = 1 |
| --- |
| HIERARCHICAL LAYER NUMBER |
| ROAD ATTRIBUTE (ROAD SORT ETC.) |
| TOTAL NODE NUMBER |
| NODE NUMBER p1 |
| X DIRECTION ABSOLUTE COORDINATE (LONGITUDE) OF NODE 1 |
| Y DIRECTION ABSOLUTE COORDINATE (LONGITUDE) OF NODE 1 |
| ABSOLUTE AZIMUTH OF NODE 1 |
| ⋮ |
| NODE NUMBER pN |
| RELATIVE COORDINATE (xn) OF NODE N |
| RELATIVE COORDINATE (yn) OF NODE N |
| RELATIVE AZIMUTH OF NODE N |
| ⋮ |
| SHAPE VECTOR STREAM IDENTIFICATION NUMBER = 100 |
| ⋮ |
| SHAPE VECTOR STREAM IDENTIFICATION NUMBER = ZZ |
| ⋮ |

(b) EXAMPLE 2, SHAPE VECTOR DATA STREAM (HIERARCHICAL LAYER JUDGING INFORMATION IS ADDED IN UNIT OF NODE)

| SHAPE VECTOR STREAM IDENTIFICATION NUMBER = 1 | |
|---|---|
| TOTAL NODE NUMBER | |
| NODE NUMBER p1 | |
| HIERARCHICAL LAYER NUMBER OF NODE 1 | ROAD ATTRIBUTE OF NODE 1 |
| X DIRECTION ABSOLUTE COORDINATE (LONGITUDE) OF NODE 1 | |
| Y DIRECTION ABSOLUTE COORDINATE (LONGITUDE) OF NODE 1 | |
| ABSOLUTE AZIMUTH OF NODE 1 | |
| ⋮ | |
| NODE NUMBER pN | |
| HIERARCHICAL LAYER NUMBER OF NODE N | ROAD ATTRIBUTE OF NODE N |
| RELATIVE COORDINATE (xn) OF NODE N | |
| RELATIVE COORDINATE (yn) OF NODE N | |
| RELATIVE AZIMUTH OF NODE N | |
| ⋮ | |
| SHAPE VECTOR STREAM IDENTIFICATION NUMBER = 100 | |
| ⋮ | |
| SHAPE VECTOR STREAM IDENTIFICATION NUMBER = ZZ | |
| ⋮ | |

FIG. 36

(a) SHAPE VECTOR DATA STREAM

| SHAPE VECTOR STREAM IDENTIFICATION NUMBER = 1 |
| --- |
| SORT OF VECTOR DATA (= ROAD) |
| TOTAL NODE NUMBER |
| NODE NUMBER p1 |
| X DIRECTION ABSOLUTE COORDINATE (LONGITUDE) OF NODE 1 |
| Y DIRECTION ABSOLUTE COORDINATE (LONGITUDE) OF NODE 1 |
| ABSOLUTE AZIMUTH OF NODE 1 |
| ⋮ |
| NODE NUMBER pN |
| RELATIVE COORDINATE (xn) OF NODE N |
| RELATIVE COORDINATE (yn) OF NODE N |
| RELATIVE AZIMUTH OF NODE N |
| ⋮ |
| SHAPE VECTOR STREAM IDENTIFICATION NUMBER = 100 |
| ⋮ |
| SHAPE VECTOR STREAM IDENTIFICATION NUMBER = ZZ |
| ⋮ |

(b) TRAVEL TIME INFORMATION

| TOTAL NUMBER V OF TRAVEL TIME PROVIDING SECTIONS ||
|---|---|
| PROVIDED TRAVEL TIME SERIAL NUMBER = 1 ||
| REFERENCE SHAPE VECTOR STREAM NUMBER = 8 ||
| DIRECTION IDENTIFICATION FLAG (FORWARD DIRECTION/REVERSE DIRECTION) ||
| REFERENCE NODE Pa OF STARTING TERMINAL SIDE | RELATIVE DISTANCE La OF STRATTON TERMINAL SIDE |
| REFERENCE NODE Pb OF END TERMINAL SIDE | RELATIVE DISTANCE Lb OF STRATTON TERMINAL SIDE |
| TRAVEL TIME T1 BETWEEN STARTING TERMINAL AND END TERMINAL ||
| : : ||
| PROVIDED TRAVEL TIME SERIAL NUMBER V ||
| REFERENCE SHAPE VECTOR STREAM NUMBER = 124 ||
| DIRECTION IDENTIFICATION FLAG (FORWARD DIRECTION/REVERSE DIRECTION) ||
| REFERENCE NODE Pc OF STARTING TERMINAL SIDE | RELATIVE DISTANCE Lc OF STRATTON TERMINAL SIDE |
| REFERENCE NODE Pd OF END TERMINAL SIDE | RELATIVE DISTANCE Ld OF STRATTON END SIDE |
| TRAVEL TIME Tv BETWEEN STARTING TERMINAL AND END TERMINAL = Tv ||

SHAPE VECTOR DATA STREAM INFORMATION (CODED/COMPRESSED DATA)

| HEADER INFORMATION ||
|---|---|
| TOTAL SHAPE VECTOR NUMBER N ||
| SHAPE VECTOR DATA IDENTIFICATION NUMBER =1 ||
| CODE TABLE IDENTIFICATION CODE ||
| PRECISION INFORMATION OF SHAPE ACQUISITION SOURCE MAP DATA ||
| ONE-DIRECTION TRAVEL DIRECTION (FORWARD/REVERSE/NON-DIRECTION) ||
| STARTING TERMINAL NODE NUMBER ps ||
| X DIRECTION ABSOLUTE COORDINATE (LONGITUDE) OF NODE ps ||
| Y DIRECTION ABSOLUTE COORDINATE (LONGITUDE) OF NODE ps ||
| ABSOLUTE AZIMUTH OF NODE ps ||
| ps POSITION ERROR(m) | ps AZIMUTH ERROR (DEGREE) |
| MAXIMUM POSITIONAL ERROR(m) OF CODED SHAPE DATA | MAXIMUM AZIMUTH ERROR (DEGREE) OF CODED SHAPE DATA |
| CODED SHAPE DATA, IT SHOULD BE NOTED THAT CODED SHAPE DATA ALSO CONTAINS FOLLOWING INFORMATION: REFERENCE CODE SETTING CODE, SECTION LENGTH CHANGING CODE, EOD CODE ||
| END TERMINAL NODE NUMBER pe ||
| X DIRECTION ABSOLUTE COORDINATE (LONGITUDE) OF NODE pe ||
| Y DIRECTION ABSOLUTE COORDINATE (LONGITUDE) OF NODE pe ||
| ABSOLUTE AZIMUTH OF NODE pe ||
| pe POSITION ERROR (m) | pe AZIMUTH ERROR (DEGREE) |
| ⋮ ||
| SHAPE VECTOR DATA IDENTIFICATION NUMBER = M ||
| ⋮ ||

(b) TRAFFIC INFORMATION

| HEADER INFORMATION |
|---|
| TOTAL NUMBER V OF TRAFFIC INFORMATION PROVIDING SECTIONS |
| SERIAL NUMBER 1 OF TRAFFIC INFORMATION PROVIDING SECTION |
| REFERENCE SHAPE VECTOR STREAM NUMBER = N |
| DIRECTION IDENTIFICATION FLAG (FORWARD DIRECTION/REVERE DIRECTION) |
| START TERMINAL-SIDED REFERENCE NODE pa     END TERMINAL-SIDED REFERENCE NODE pb |
| QUANTIZING SECTION LENGTH IDENTIFICATION CODE OF DISTANCE DIRECTION |
| TRAFFIC INFORMATION QUANTIZING TABLE IDENTIFICATION CODE |
| CODED TABLE IDENTIFICATION CODE |
| TOTAL NUMBER OF QUANTIZED UNIT SECTIONS *2 |
| TRAFFIC INFORMATION (INITIAL VALUE) OF START TERMINAL |
| TRAFFIC INFORMATION CODED BY DIFFERENCE VALUE WITH RESPECT TO PREDICTED STATISTICAL VALUE, IT SHOULD BE NOTED THAT TRAFFIC INFORMATION CONTAINS ALSO FOLLOWING INFORMATION: SECTION LENGTH CHANGING CODE AND CHANGED SECTION LENGTH, TRAFFIC INFORMATION QUANTIZED TABLE CHANGING CODE AND CHANGED TABLE NUMBER, REFERENCE NODE CORRESPONDING POINT IDENTIFICATION CODE AND CORRESPONDING REFERENCE NODE NUMBER + OFFSET DISTANCE |
| ⋮ |
| TRAFFIC INFORMATION PROVIDING SECTION SERIAL NUMBER = W |
| ⋮ |

FIG. 44

EVENT INFORMATION

| REFERENCE SHAPE VECTOR STREAM NUMBER (= 56) ||
|---|---|
| EVENT 1 (= CLOSED-TO-ALL-VEHICLES EVENT) ||
| DETAILED EVENT INFORMATION (CLOSED-TO-ALL-VEHICLES ETC.) ||
| NODE NUMBER 1 (Pm') | NODE NUMBER 2 (Pn') |
| RELATIVE POSITION OF EVENT FROM Pm' ||
| DIRECTION IDENTIFICATION FLAG (= 1) ||
| ⋮ ||
| EVENT "n" (TRAFFIC JAM) ||
| TRAFFIC JAM DEGREE RANK ||
| NODE NUMBER 1 (Pm') | NODE NUMBER 2 (Pn') |
| EVENT RELATIVE POSITION 1 FROM Pm' (START TERMINAL SIDE OF TRAFFIC JAM) ||
| EVENT RELATIVE POSITION 1 FROM Pm' (END TERMINAL SIDE OF TRAFFIC JAM) ||

SELECT NODES TO BE FEATURED NODES, AND SET SELECTED NODES TO NODE NUMBERS Pm, Pn, ETC.

FIG. 45

LINK INFORMATION

| ROAD SORT CODE |
| --- |
| ROAD NUMBER |
| TOLL ROAD CODE |
| START NODE NUMBER p4, AND END NODE NUMBER e4 |
| BELONGING HIERARCHICAL LAYER: UPPER, MIDDLE, LOWER |
| TOTAL CONNECTION LINK NUMBER I4 OF p4 |
| CONNECTION LINK ANGLE 1 OF p4 |
| ⋮ |
| CONNECTION LINK ANGLE I4 OF P4 |
| ⋮ |
| TOTAL CONNECTION LINK NUMBER In OF Pm |
| CONNECTION LINK ANGLE 1 OF Pm |
| ... |
| CONNECTION LINK ANGLE In OF Pm |

FIG. 46

NODE INFORMATION

| VECTOR DATA SORT (= ROAD) ||
|---|---|
| TOTAL NODE NUMBER ||
| BELONGING HIERARCHICAL LAYER INFORMATION ||
| DEFINITION ALONG FORWARD DIRECTION (= 2) | DEFINITION ALONG REVERES DIRECTION (= 1) |
| NODE NUMBER p1 ||
| X DIRECTION ABSOLUTE COORDINATE (LONGITUDE) OF NODE 1 ||
| Y DIRECTION ABSOLUTE COORDINATE (LONGITUDE) OF NODE 1 ||
| NODE NUMBER p2 ||
| RELATIVE COORDINATE (x2) OF NODE 2 ||
| RELATIVE COORDINATE (y2) OF NODE 2 ||
| ⋮ ||
| NODE NUMBER pn ||
| RELATIVE COORDINATE (xn) OF NODE n ||
| RELATIVE COORDINATE (yn) OF NODE n ||

FIG. 47

SHAPE VECTOR

| |
|---|
| SHAPE VECTOR STREAM IDENTIFICATION NUMBER = 1 |
| VECTOR DATA SORT (= ROAD) |
| BELONGING HIERARCHICAL LAYER (UPPER, MIDDLE, LOWER) |
| TOTAL NODE NUMBER |
| NODE NUMBER p1 |
| X DIRECTION ABSOLUTE COORDINATE (LONGITUDE) OF NODE 1 |
| Y DIRECTION ABSOLUTE COORDINATE (LONGITUDE) OF NODE 1 |
| ABSOLUTE AZIMUTH OF NODE 1 |
| ⋮ |
| NODE NUMBER pN |
| RELATIVE COORDINATE (xn) OF NODE N |
| RELATIVE COORDINATE (yn) OF NODE N |
| RELATIVE AZIMUTH OF NODE N |
| ⋮ ⋮ |
| SHAPE VECTOR STREAM IDENTIFICATION NUMBER = 56 |
| ⋮ ⋮ |
| SHAPE VECTOR STREAM IDENTIFICATION NUMBER = 100 |
| ⋮ |

MAP MATCHING METHOD, MAP MATCHING DEVICE, DATABASE FOR SHAPE MATCHING, AND SHAPE MATCHING DEVICE

TECHNICAL FIELD

The present invention is related to a map matching method, an device for executing the map matching method, and a computer program. More specifically, the present invention is directed to a map matching method, a map matching device, and a computer program, capable of a performing map matching operation in a high speed. Also, the present invention relates to an information transferring method for transferring positional information as to a traffic jam, a traffic accident, and the like in a traffic information providing system, or the like, and relates to an device for performing an information exchanging operation as to a position by using this information transferring method. In particular, the present invention is directed to a shape matching-purpose database and a shape matching device, capable of firmly and rapidly transferring a position on a digital map.

BACKGROUND ART

Conventionally, for instance, as described in the below-mentioned patent publication 1, while a car navigation device holds map data, the car navigation device executes a map matching operation in a time interval of, for example, 1 second in order to identify a position of a traveling vehicle on the map data. In this map data, all of roads whose widths are wider than, or equal to 3.3 m have been stored. The car navigation device executes a map matching operation while map data of an area (normally, square of approximately several hundreds meters) which is limited to an area around the own vehicle position is employed as an object area, and thus, acquires such a point on the map, which corresponds to the own vehicle position.

As map matching methods, several sorts of map matching methods are known. For instance, an algorithm of a macro map matching operation is defined as follows:

(1) As shown in FIG. 35(a), while a vehicle position acquired by a GPS receiver is used as a WP (way point) corresponding to a point which is formed on a shape vector, links located in a peripheral area of the WP are searched so as to detect a link having such azimuth within a square made of A meters (on the order of 250 meters) where a first way point WP1 is set to a center thereof. The azimuth of this link is defined by that a difference between this azimuth and traveling azimuth of the vehicle is limited in +B degrees to −B degrees (for example, B is nearly equal to 45 degrees). Then, this detected link is set to a candidate point (symbol "X"). It is so assumed that a total link number (n) of the candidate points is selected to be 5 to 8 pieces. In FIG. 35(b), candidate points of the first way point WP1 are set to 1-1, 1-2, 1-3.

(2) As indicated in FIG. 35(b), a link having such azimuth is detected within the square made of A meters where a next WP2 is set to a center thereof. The azimuth of this link is defined by that a difference between this azimuth and traveling azimuth of the vehicle is limited in +B degrees to −B degrees. "n" pieces of links are set as candidate points (2-1, 2-2, 2-3).

(3) This process operation is repeatedly carried out until the matching operation is reached to a final WP.

(4) The respective candidate points are connected to each other along the road links so as to form a shape pattern. In such a case that candidate points are not connected along a road (for instance, candidate points 3-3 and 3-2 of WP3 cannot be connected to candidate point of next WP4 along road), a shape pattern is not formed.

(5) While the respective shape patterns are compared with the shapes of WP1, WP2, - - - , one shape pattern is selected which is mostly resembled to the shapes of the way points. Namely, this shape pattern is located near the way points, and owns a small fluctuation with respect to the shapes of WP1, WP2, - - - , which are evaluated by standard deviation, or the like.

Assuming now that a total number of WPs is equal to "M" pieces and "N" pieces of candidate points per each of WPs are obtained as an average value, the shape patterns which are acquired in the item (4) are combinations of N M pieces, normally become several thousands through several ten-thousands of shape patterns.

On the other hand, the Inventor of the present invention has proposed the traffic information transfer system using the map matching operation (Japanese Patent Application No. 2002-89069). In this system, while a status amount (travel time, and traffic jam degree etc.) of traffic information which is changed along a road is expressed by a function of a distance measured from a reference node of a shape vector which indicates the road, both data of this traffic information and data of a shape vector indicative of a road shape are provided to a user terminal. The user terminal executes a map matching operation by using the shape vector so as to identify a objective road of the traffic information, and reproduces the traffic information on this road from the data of the traffic information.

FIG. 36(b) shows data of traffic information which is transferred in this system, and FIG. 36(a) represents shape vector data of roads which are transferred in combination with this traffic information data. Alternatively, these data may be coded so as to compress data amounts. FIG. 37(a) and FIG. 37(b) shows both shape vector data which have been coded, and traffic information data. After the user terminal which has received these data decodes both shape vector data and traffic information data, the user terminal similarly performs a map matching operation while the respective nodes contained in the shape vector data are defined as WPs so as to identify a objective road of the traffic information, and reproduces the traffic information on the objective road from the traffic information data.

In the presently available traffic information, while unified numbers are applied to nodes and links, a objective road is identified by this number. In this case, in connection with newly constructing operations of reads and route changes, updating operations as to node numbers and link numbers are required. Since newly constructing operations of roads and route changes are not stopped in future, the method for using the unified numbers necessarily requires work loads of maintenance. To the contrary, since the road position is identified by the map matching operation in this traffic information transfer system, such unified numbers need not be applied to the nodes and the links, and thus, the work loads can be reduced.

[Patent Publication 1]

Japanese Laid-open Patent Application No. HEI-7-260499

However, in this traffic information transfer system, the reception-sided device (decoder: navigation device etc.) must execute the map matching operation with respect to the long subject section within the wide range (for example, entire area of wards in TOKYO, or square made of 10 Km) which is contained in the traffic information.

Also, in the process operation of the map matching operation, in such a case that the above-described WPs are used which are employed so as to identify the vehicle position, when a large number of candidate points are formed around the WPs, a very long time is necessarily required to execute the retrieving process operations (namely, process operations (1) and (2) of above-described macro map matching operations) for the candidate points. This process time is increased directly proportional to a total number of WPs. Also, combinations among the respective candidates points are exponentially increased in response to a total number of the candidate points and a total number of the WPs, and thus, the forming process operation (above-described process operation (4)) of the shape pattern and the comparing process operation (above-described process operation (5)) require a plenty of time.

As a result, there is an object to shorten the processing time for the map matching operation.

Also, in such a probe acquisition system that drive data of vehicles (probes) which are driven in various places are acquired by a center so as to be utilized to form traffic information, positional data indicative of drive loci are collected from a large number of probes to one center. Then, this center identifies roads along which the respective probes are driven by executing map matching operations based upon the positional data. As a consequence, a high-speed map matching operation is required in order that the data collected from a large number of probes can be quickly processed.

Also, vehicles which mount car navigation machines are rapidly increased. In an on-vehicle navigation system which is used by this car navigation machine, while a digital map database is held, maps around the own vehicle position can be displayed on a screen, and in addition, travel loci and route searching results up to a destination place can be displayed on the maps based upon latitude/longitude data received by a GPS receiver.

It should be noted that digital map databases may contain errors due to a fatal aspect of reduced scale maps. While degrees of errors are different from each other depending upon digital map databases, there are, for instance, commercially-available digital map databases having a reduced scale of 1/25000 which contain an error of approximately 50 meters in accordance with places.

Also, in this on-vehicle navigation machine, such traffic information as traffic jam information and traffic accident information is received which is provided from a traffic information providing system, and then, a traffic jam place and a traffic accident position may be displayed on a map, and/or a route searching operation is carried out by adding these traffic jam/accident information to a condition.

In the above-described traffic information providing system, as represented in FIG. 57, traffic information is supplied from a control center 71 which controls a regional area to a traffic information distribution center 72, and then, traffic information which has been edited for purposes of various media (FM broadcast, on-road beacon, portable telephones, and the like) is transmitted via these various media. It should also be understood that the control center 71 communicates the traffic information with a control center 78 of another regional area, and thus, acquires traffic information within a wide zone which contains a peripheral area.

As to the traffic information supplied by the above-explained traffic information providing system, for example, in such a case that latitude/longitude data as to a traffic jam position and a traffic accident position is solely provided in order to inform the traffic jam position and the traffic accident position, there is a risk that if both a traffic information providing source and a traffic information provided destination employ different sorts of digital map databases, then the on-vehicle navigation machine identifies a different position on a road as the traffic accident position. This is because, as previously explained, digital map databases held by on-vehicle navigation machines own errors which are different from each other, depending upon sorts of these digital map databases.

In order to improve an incorrectness of such information transfer operations, or information display operations, on-vehicle navigation systems employ such map information shown in FIG. 58. As indicated as one example in FIG. 58(a), assuming now that intersections "a" and "b" of a road network correspond to nodes and a road "c" between the nodes corresponds to a link, node numbers (a=1111, b=3333) are set to the respective nodes, which exclusively represent these nodes, whereas a link number (c =11113333) is set to the respective links, which exclusively represents this link. Then, the node numbers and the link numbers which have been set with respect to the respective intersections and the respective roads have been stored in digital map databases marketed by various firms in correspondence with both the node numbers and the link numbers.

Also, as to traffic information indicative of traffic jam positions, traffic accident positions, and the like, a link number is identified in order to represent a position on a road, and then, a point on the road is indicated by such an expression that this point is separated by a certain meter from a head portion of the road which is indicated by this link number. For example, in such a case that traffic information contains [position separated by 200 m from head portion of road of link number ="11113333"], even when on-vehicle navigation machines use any types of digital map databases, a position on the same road, namely a location indicated by the traffic information may be acquired by tracing such a location separated by 200 m from a node having a node number "1111" of the road defined by the link number "11113333."

However, as shown in FIG. 58(b), as to node numbers and link numbers which have been defined in a road network, if a road "d" is newly constructed and the road is changed, then these numbers must be replaced by new numbers. When the node numbers and the link numbers are changed, digital map data of various firms must be updated.

Since constructions of roads and changes of roads are continuously carried out for the future, a plenty of work amounts and a great expense must be permanently required in order to perform maintenance operations of digital map databases as far as the conventional road position display method realized by the node numbers and the link numbers is utilized. Thus, there is such a problem that this maintenance operation is increased and causes heavy loads.

There is another method for identifying roads by way of shape matching system (will also be referred to as "map matching system") based upon traffic information provided by the traffic information providing center 72. This shape matching system may largely depend upon processing performance of on-vehicle navigation machines provided on the reception side. As to a map matching operation executed in a conventional on-vehicle navigation machine, a matching process operation may be carried out one time every 1 second since only a map matching operation as to one place within a limited area (normally, square of several hundreds meters) around the own vehicle position is required. On the other hand, with respect to route lines (roads) which are to be processed in a traffic information providing system, normally, there are many roads such as speedways, national roads, and major local roads. Furthermore, in city areas, general roads belonging to the administrative divisions of Japan and a portion of city roads are involved in these route lines. Also, there are some possibilities that information acquiring route lines other than the existing links are increased.

As a consequence, the information processing capability of the conventional on-vehicle navigation machines owns such a problem that a plenty of time is required until a road is identified by executing a shape matching operation based upon received traffic information and then traffic information is displayed.

The present invention has been made to solve these problems, and has an object to provide a map matching method capable of realizing a high-speed process operation, and also, to provide an device and a computer program, which realize this map matching method. Furthermore, another object of the present invention is to provide a shape matching-purpose database and a shape matching device capable of providing positional information on a map while excessive maintenance operation for a map database is not performed. Also, another object of the present invention is to provide a shape matching-purpose database and a shape matching device, capable of quickly displaying, or representing information related to roads such as traffic information.

DISCLOSURE OF THE INVENTION

To this end, in accordance with a map matching method of the present invention, with respect to road networks having an unequal condition in frequencies corresponding to a objective road of a map matching operation, priority orders are set in response to the frequencies; a road network which is matched with the objective road is restricted based upon the priority order; and when a candidate road which is matched with a shape vector of the objective road cannot be obtained, the restriction made based upon the priority order is relaxed so as to broaden a range of road networks which are matched with the objective road.

Also, while employing one sheet of map road network data including a set of road networks to which different weights have been applied, such a road network whose weight is relatively large is matched with a shape vector indicative of a shape of a objective road in a beginning stage; and when such a candidate road which is matched with the shape vector cannot be obtained in the road network whose weight is relatively large, since such a road network that a road network whose weight is relatively small has been added to the road network is matched with the shape vector, the objective road is identified.

Also, while employing road network data in which road networks are formed in a plurality of hierarchical layers, and a road network of an upper-grade hierarchical layer is established by such a road network which is extracted from a road network having a lower-grade hierarchical layer lower than the road network having the upper-grade hierarchical layer, a road network of a relatively upper-grade hierarchical layer is matched with a shape vector indicative of a shape of a objective road in a beginning stage; and when such a candidate road which is matched with the shape vector cannot be obtained in the road network of the relatively upper-grade hierarchical layer, since such a road network having a further lower-grade hierarchical layer is matched with the shape vector, the objective road is identified.

With employment of these arrangements, in the most cases, in map matching operations using roads having higher priority orders, roads having large weights, or a road network having an uppermost-grade hierarchical layer, a objective road can be identified, and thus, the map matching operation can be carried out in a high speed.

Also, in accordance with the present invention, a receiving device is comprised of: a digital map; map matching-purpose road network data established by road networks which have been formed from the digital map, and are formed in a plurality of hierarchical layers, and in which a road network having an upper-grade hierarchical layer has been extracted from a road network having a lower-grade hierarchical layer; a data receiving unit for receiving data which contains a shape vector indicative of a shape of a objective road; and a map matching unit for executing a map matching operation of the shape vector by using the road network data so as to identify the objective road; in which the map matching unit matches the shape vector with a road network having the uppermost-grade hierarchical layer of the road network data in a beginning stage; and when a candidate road which is matched with the shape vector cannot be obtained in the road network having the uppermost-grade hierarchical layer, since the map matching unit matches the shape vector with a road network having another hierarchical layer, the objective road is identified.

With employment of this arrangement, the objective road contained in the reception information can be rapidly identified by executing the map matching operation.

Also, in accordance with the present invention, an event information providing device is comprised of: a digital map; map matching-purpose road network data established by road networks which have been formed from the digital map, and are formed in a plurality of hierarchical layers, and in which a road network having an upper-grade hierarchical layer has been extracted from a road network having a lower-grade hierarchical layer; a map data information transmitting unit for distributing both the digital map and the road network data; a shape vector data producing unit for producing a shape vector indicative of a shape of a objective road of event information by using the data of the digital map; a shape vector deforming unit for performing an adding process operation of information for designating a hierarchical layer of the road network data to the shape vector produced by the shape vector data producing unit; and an event information transmitting unit for transmitting event information containing the shape vector which is processed by the shape vector deforming unit.

With employment of this arrangement, since the reception-sided device executes the map matching operation by using the road network having the designated hierarchical layer of the map matching-purpose road network data distributed from the event information providing device, the objective road of the event information can be quickly and correctly identified.

Also, in accordance with the present invention, an event information providing device is comprised of: a digital map; a parallel-traveling resembling shape calculating unit for calculating a parallel-traveling resembling shape link which is traveled in parallel to a link and has a shape resembled to the link from the data of the digital map; a shape vector data producing unit for producing a shape vector indicative of a shape of a objective road of event information by using the data of the digital map; a shape vector deforming unit for executing a deforming process operation of the shape vector in such a manner that the shape vector deforming unit identifies as to whether or not the parallel-traveling resembling shaped link is present in the link of the objective road by using the calculation result of the parallel-traveling resembling shape calculating unit; and when the parallel-traveling resembling shape link is present, the shape vector deforming unit extends the objective road up to such a position that the shape of the parallel-traveling resembling shaped link can be discriminated from the shape of the objective road; and an event information transmitting unit for transmitting event information containing the shape vector which is processed by the shape vector deforming unit.

With employment of this arrangement, in the reception-sided device which has received the event information, when the candidate road is identified by executing the map matching operation using the road network having the upper-grade hierarchical layer, even if the parallel-traveling resembling shaped road which is resembled to the candidate road is present in the road network having the lower hierarchical layer, the decision of the employment of the candidate road can be clearly made by comparing these shapes with each other.

Also, in accordance with a computer program of the present invention, the program causes a computer to execute: a sequence in which while employing road network data established by road networks which are formed in a plurality of hierarchical layers and in which a road network having an upper-grade hierarchical layer has been extracted from a road network having a lower-grade hierarchical layer, a matching operation is carried out between a road network having an uppermost-grade hierarchical layer and a shape vector indicative of a shape of a objective road; and when a candidate road which is matched with the shape vector cannot be obtained in the road network having the uppermost-grade hierarchical layer, since the shape vector is matched with a road network having another hierarchical layer, a candidate road of the objective road is obtained; a sequence in which when a candidate road matched with the shaped vector can be obtained, a judgment is made as to whether or not a parallel-travelling resembling shaped road which is traveled in parallel to the objective road and has a resembling shape thereto is present in a road network having a lower hierarchical layer than the hierarchical layer of the road network where the candidate road could be obtained; a sequence in which when the parallel-traveling resembling shaped road is present, a shape of the shape vector, a shape of the candidate road, and a shape of the parallel-traveling resembling shaped road are compared with each other in order to judge as to whether or not an employment of the candidate road is acceptable; and a sequence in which when it cannot be judged that the employment of the candidate road is acceptable, a matching operation with respect to the shape vector is newly carried out by using a road network having a lower hierarchical layer than the hierarchical layer of the road network from which the candidate road has been acquired.

With employment of such an arrangement, the objective road can be quickly and correctly identified by executing the map matching operation.

In a shape matching database according to the present invention, in such a case that a road position on a digital map is informed, such a shape matching-purpose database having a plurality of hierarchical layers and in which a road network is expressed by a node and a link in each of the hierarchical layers, which is comprised of: the uppermost-grade hierarchical layer having a node and a link, which represent the most important road; and respective layers which are sequentially subdivided from the uppermost-grade hierarchical layer to a lower-grade hierarchical layer based upon important characteristics of the node and the link, which represent a road; in which both a node and a link which should be shape-matched from the road network are restricted by using the respective layers. As a result, the node and the link which should be processed by the shape matching operation can be grasped, so that the overall processing speed can be increased.

Also, in a shape matching device according to the present invention, such a shape matching device for executing a shape matching operation by using both the shape matching-purpose map database and the shape vector, recited in Claim 26, is arranged by that the shape matching device executes a shape matching operation from the uppermost-grade hierarchical layer; in the case that the shape matching operation can succeed in the uppermost-grade hierarchical layer and both a node and a link can be identified, the process operation is accomplished; in the case that both a node and a link, which correspond to the shape vector, cannot be identified, the shape matching operation is transferred to a lower-grade hierarchical layer and a shape matching operation is carried out; and an object for a shape matching operation is sequentially transferred to a next hierarchical layer so as to perform a shape matching operation. As a consequence, the shape matching operation can be carried out with respect also to such a node and a link which indicate a very narrow road.

Also, in a shape matching device according to the present invention, while a common node is provided during the plurality of hierarchical layers, the object of the shape matching operation is transferred from the common node to the next hierarchical layer, and results of shape matching operations in the respective hierarchical layers are coupled to each other by the common node so as to perform a shape matching operation. As a consequence, the transferring operation between the hierarchical layers can be easily carried out, and the data can be readily coupled to each other.

Also, in a shape matching device according to the present invention, if such a road identifying method is realized in such a manner that while an identifier is applied to a link which is defined also in an upper-grade layer, the shape matching operation is transferred to the upper-grade layer by using the identifier so as to perform a shape matching operation, then the shape matching operation can be rapidly carried out in a layer where links and nodes are arranged under coarse condition.

Also, in a shape matching device according to the present invention, in the case that the shape matching operation fails in the predetermined hierarchical layer, while an absolute position indicative of the place is utilized, if the shape matching operation is sequentially transferred to a lower-grade layer so as to execute a shape matching operation, then the matching operations executed in the respective hierarchical layers can be coupled to each other in an easy manner. Also, while such a map database is stored, if such a server is employed which transmits either a portion or all of the map data in response to a predetermined signal, then a large number of persons can readily use the map database.

Also, in the shape matching-purpose database, the higher the upper-grade layer becomes, the coarser a total node number of the shape vector is made.

Also, in a shape vector transmitting server, the shape vector transmitting server stores thereinto the shape vector-purpose database recited in claim 26, or claim 31, and transmits either a portion or all of the shape vectors in response to a predetermined signal.

Also, in a shape matching device according to the present invention, when a shape matching operation is carried out in an upper-grade layer, a node is thinned from a node string to be a shape vector by using information as to a link length; and a shape matching operation is carried out by using a thinned node string. As a result, a higher-speed process operation can be realized.

Furthermore, in a shape matching device according to the present invention, while such an additional information as a road sort and a toll road code is added to a shape vector, if such a hierarchical layer which is firstly shape-matched is selected by using the additional information, then such a useless process operation that the shape matching operations are carried out for all of the hierarchical layers from the uppermost-grade hierarchical layer can be avoided.

BRIEF DESCRIPTION OF THE DRAWINGS

FIG. 1 is a diagram for indicating a data structure of digital map data in accordance with a first embodiment mode of the present invention.

FIG. 3 is a diagram for indicating a data structure of the map matching-purpose road network data having the hierarchical structure in accordance with the first embodiment mode of the present invention.

FIG. 9 is a diagram for representing a parallel-traveling resembling shaped road which is cut in a half way thereof.

FIG. 10 is a diagram for showing a data structure of map matching-purpose road network data to which parallel-traveling resembling shaped road present/absent information has been added in accordance with the first embodiment mode of the present invention.

FIG. 12 is a diagram for showing map matching-purpose road network data to which parallel-traveling resembling shaped road present/absent information has been added in accordance with the first embodiment mode of the present invention.

FIG. 21 is a diagram for indicating map matching-purpose road network data in accordance with a fourth embodiment mode of the present invention.

FIG. 24 is a diagram for showing shape vector data which is received in accordance with a fifth embodiment mode of the present invention.

FIG. 28 is a diagram for representing a data structure of the data of the cache layer utilized in the map matching operation in accordance with the seventh embodiment mode of the present invention.

FIG. 31 is a diagram for representing a data structure of shape vector data which is transmitted by the transmission-sided device in accordance with the eighth embodiment mode of the present invention.

FIG. 36 is a diagram for showing the data structure of the traffic information which is provided with the shape vector for the objective road.

FIG. 37 is a diagram for indicating the data structure of the traffic information which has been encoded in connection with the shape vector of the objective road to be provided.

FIG. 44 is an example for indicating a structure of event information.

FIG. 45 is a diagram for indicating an information format of a link.

FIG. 46 is a diagram for showing information of a node.

FIG. 47 is a diagram for representing shape vector data.

Figure 2:
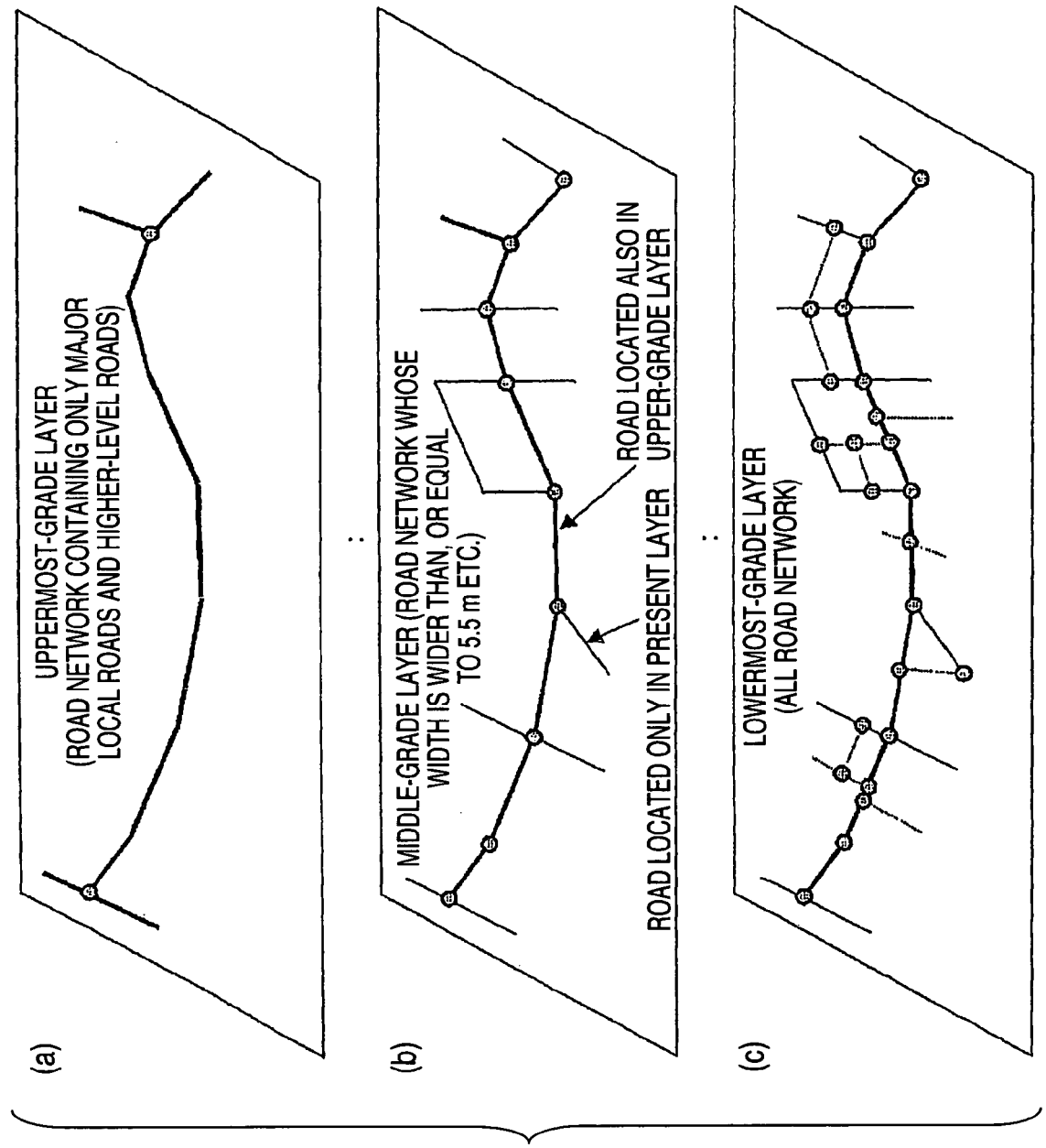
FIG. 2 is a diagram for schematically showing a map matching-purpose road network having a hierarchical structure in accordance with the first embodiment mode of the present invention.

It should be noted that reference numerals shown in the drawings are described as follows:

10 reception-sided device;
11 data receiving unit;
12 shape vector expressing event information database;
14 map matching unit;
15 display unit/event information utilizing unit;
16 digital map B database;
17 map data information receiving unit;
30 transmission-sided device;
31 data transmitting unit;
32 shape vector expressing event information database;
33 feature node extracting/shape vector deforming unit;
34 shape vector data expressing information producing unit;
35 digital map A database;
36 event information database;
37 map data information transmuting unit;
38 hierarchical layer structure road network data;
39 parallel-traveling resembling shape calculating unit;
40 parallel-traveling resembling shape database;
113 hierarchical layer structure road network data;
116 digital map data A;
Ps start link;
Pe end link;
Pc common link;
Ps start link;
81 data transmitting unit;
82 shape vector expressing event information data;
83 feature node extracting/shape vector deforming unit;
84 shape vector expressing information producing unit;
85 event information data;
86 map database;
87 transmitting device;
88 receiving device;
241 upper-grade hierarchical layer;
242 middle-grade hierarchical layer;
261 upper-grade layer;
262 middle-grade layer;
263 link;
264 link;
265 link;

BEST MODE FOR CARRYING OUT THE INVENTION

First Embodiment Mode

In a first embodiment mode of the present invention, a description is made of a basic conceptional idea as to a map matching method of the present invention.

A reception-sided device which executes a map matching operation owns such a digital data as shown in FIG. 1. In this map data, information as to nodes and links are described which are located within sections defined by a header. The node information contains a total number of the nodes, node numbers of the respective nodes, node attribute information of the respective nodes, latitude and longitude of the respective nodes, and also, information as to connection nodes and connection links, which are connected to the respective nodes. Also, the link information contains a total number of the links, link numbers, attribute information indicative of road sorts of the links, a total number of interpolation points which define shapes of the links, and information as to latitude and longitude of the respective interpolation points.

It should be understood that the node numbers, the link numbers, and the interpolation numbers have been independently set by a producer of this map data, but have no common characteristics with respect to those of map data formed by another map data producer.

The reception-sided device forms road network data having a hierarchical layer structure used for a map matching operation based on this map data.

FIG. 2 indicates a conceptional idea of the road network data of this hierarchical layer structure. In this drawing, an example of a three-layer hierarchical structure is represented. Also, FIG. 3 indicates an example of road network data of each of the hierarchical layers. FIG. 2(c) corresponds to road network data of the lowermost layer of the hierarchical layer structure, to which data as to all of road networks are contained. An example of this road network data of this lowermost layer is represented in FIG. 3(c). This road network data corresponds to such a map data similar to FIG. 1. FIG. 2(b) corresponds to road network data of a middle-grade layer which contains only such roads, the road widths of which are larger than, or equal to 5.5 m. This road network data is indicated in FIG. 3(b). FIG. 2(a) corresponds to road network data containing only main route roads which are greater than, or equal to major local roads. This road network data is shown in FIG. 3(a).

Data formats of the road network data of the upper-grade layer, the middle-grade layer, and the lower-grade layer are identical to each other. It should also be noted that node numbers, link numbers, and interpolation point numbers are thinned as large as being permitted as to the upper-grade layer. As to a node number, such a number applied in the lowermost layer is directly used as a number of the corresponding node in the upper-grade layer. As to link numbers, it is preferable to apply such numbers which are unique to links of the respective layers in order that these unique link numbers are not repeated over all of the layers.

It should also be noted that although the 3-layer hierarchical structure has been exemplified in this example, a total number of hierarchies may be selected to be larger than, or equal to 3.

Figure 6:
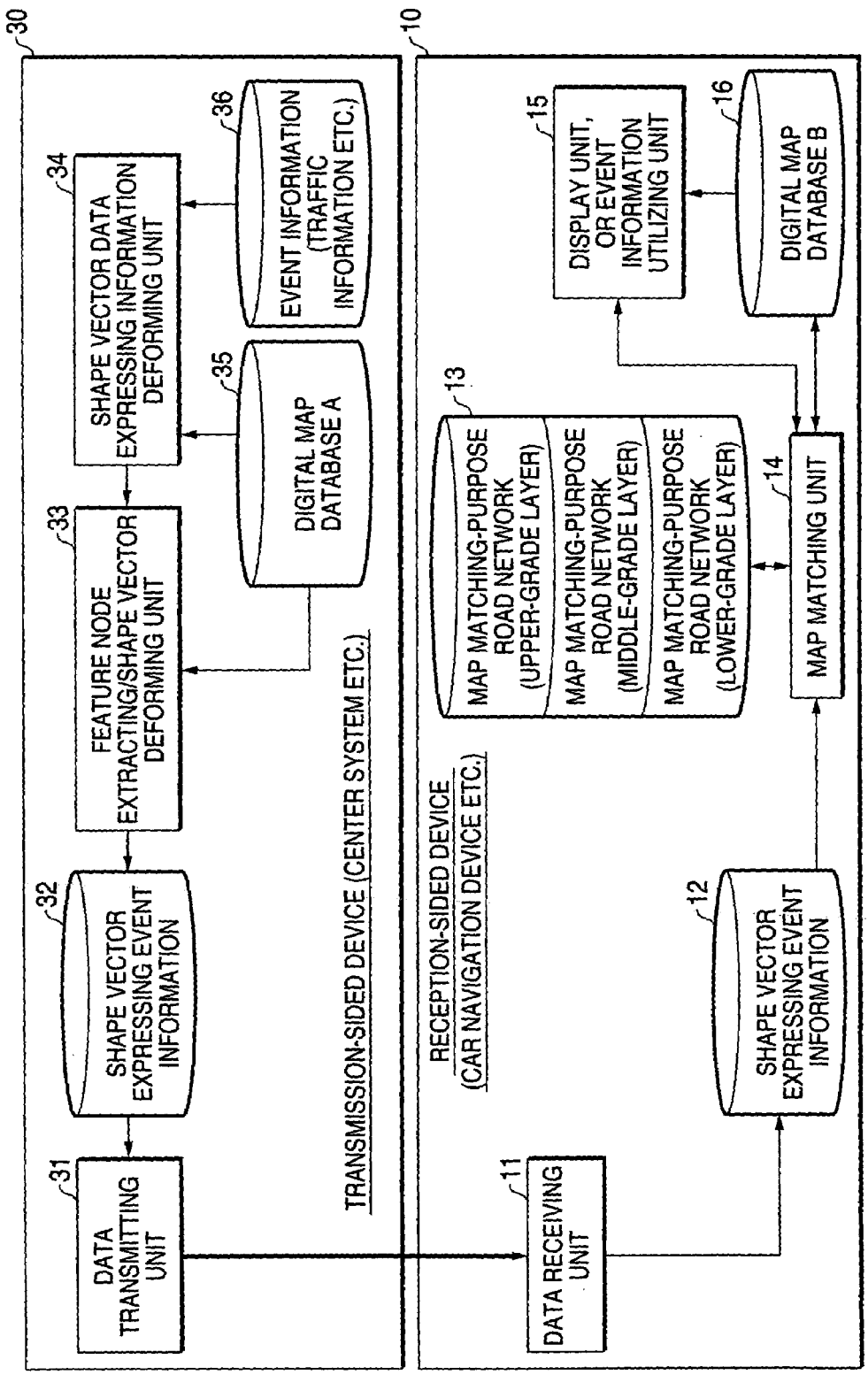
FIG. 6 is a block diagram for representing both an arrangement of a transmission-sided device and an arrangement of a reception-sided device in accordance with the first embodiment mode of the present invention.

FIG. 6 shows an arrangement of the reception-sided device 10 and an arrangement of a transmission-sided device 30. The reception-sided device 10 holds the road network data having this hierarchical structure. The transmission-sided device 30 provides both traffic information and shape vector data of road shapes to the reception-sided device 10.

The transmission-sided device 30 is provided with a database 36, another database 35, a shape vector data expressing information producing unit 34, a feature node extracting/shape vector deforming unit 33, a shape vector expressing event information database 32, and a data transmitting unit 31. The database 36 stores thereinto event information such as traffic information. The database 35 stores thereinto digital map A. The shape vector data expressing information producing unit 34 produces event information in which a objective road is expressed by shape vector data by using the data of the databases 35 and 36. The feature node extracting/shape vector deforming unit 33 adds a portion of a shape of an intersecting road to shape vector data at a featured node position in order to prevent an error matching operation and to correct a relative distance. The shape vector expressing event information database 32 stores thereinto both the shape vector data and the event information data, which have been produced. The data transmitting unit 31 transmits these data. Either data shown in FIG. 36 or data shown in FIG. 37 is transmitted from the data transmitting unit 31.

On the other hand, the reception-sided device 10 is equipped with a data receiving unit 11, a shape vector expressing event information database 12, a map matching unit 14, a data base 16, and a display unit/event information utilizing unit 15. The data receiving unit 11 receives data. The shape vector expressing event information database 12 stores thereinto the received data. The map matching unit 14 identifies a objective road by performing a map matching operation by using the road network data 13 having the hierarchical layer structure. The database 16 stores thereinto digital map B. The display unit/event information utilizing unit 15 displays and utilizes event information.

It should also be noted that the map matching unit 14 may be realized by causing a computer of this reception-sided device 10 to execute a process operation defined by a computer program.

The road network data 13 of the hierarchical layer structure is previously produced by using the digital map B of the database 16 (producing sequential operation thereof will be explained later). Also, a producer of the digital map B held in the database 16 of the reception-sided device 10 is different from a producer of the digital map A held in the database 35 of the transmission-sided device 30.

Also, the display unit/event information utilizing unit 15 displays a traffic jam place on a map, and searches a route by considering a traffic jam while traffic information of a objective road is employed.

Figure 5:
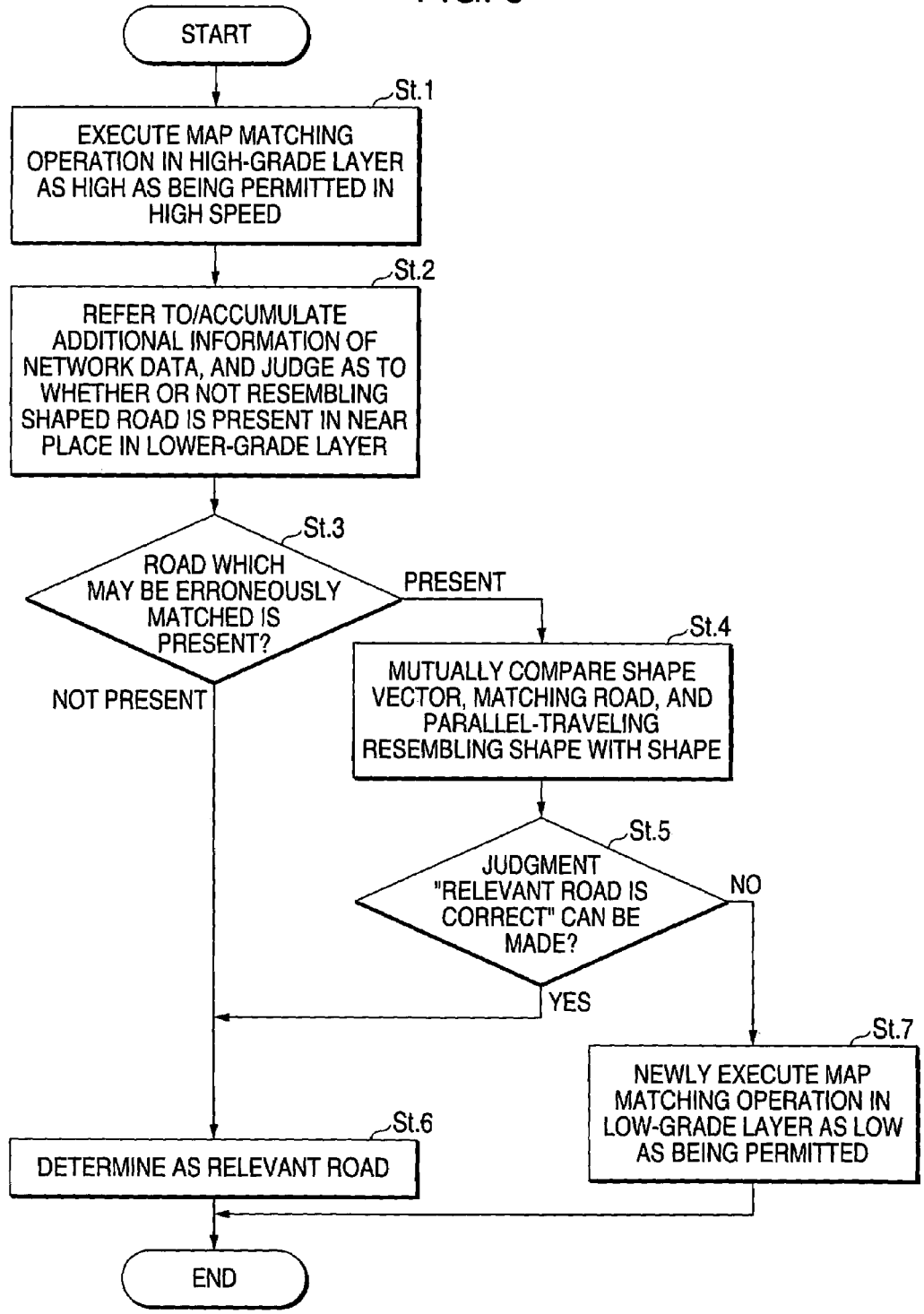
FIG. 5 is a flow chart for describing a sequential operation of a map matching operation in accordance with the first embodiment mode of the present invention.

A flow chart of FIG. 5 indicates a process sequential operation of a map matching operation in the case that the reception-sided device 10 which holds the road network data 13 of this hierarchical layer structure receives shape vector data of a objective road from the transmission-sided device 30.

When the reception-sided device 10 receives the shape vector data of the objective road, the reception-sided device 10 executes a map matching operation while the road network data of the upper-grade layer is employed as high as being permitted, and nodes contained in the shape vector data are used as WP (step 1). A concrete sequential operation thereof will be explained later. As the process operation itself of the map matching operation, the method such as the macro map matching method is used which has been conventionally known.

The higher the layer becomes, the coarser the road network becomes, so that a total number of candidate points located around WP is small, and a processing operation of the map matching process operation can be carried out in a higher speed.

On the other hand, normally, subject routes of traffic information correspond to speedways (expressways), national roads, and major local roads (noted that important general-purpose roads belonging to the administrative divisions of Japan, and traffic information as to a portion of city roads are also provided in city area). The probability at which a objective road can be identified in a map matching operation by using road network data of an upper-grade layer is very high.

If such a case occurs in which the objective road cannot be identified by using the road network data of the upper-grade layer (for instance, in the case that candidate point cannot be set), a map matching operation is newly carried out by using road network data of a lower grade.

Also, even in such a case that the objective road can be identified by performing the map matching operation with employment of the road network data of the upper-grade layer, when such a road is present which is traveled in parallel thereto, there are some possibilities that an erroneous matching operation is carried out.

Figure 4:
FIG. 4 shows a printed digital map indicative of road shapes.

For instance, in FIG. 4, assuming now that a wide solid line and a wide chained lines correspond to major local roads; a dotted line corresponds to a road belonging to the administrative divisions of Japan; and roads which are located between the above-described lines correspond to living roads, the widths of which are shorter than, or equal to 5.5 m; the road network data of the uppermost-grade layer contains only both the wide solid line and the wide chained line, whereas the dotted line is contained in the road network data of the middle-grade layer and the road network data of the lowermost layer, and the living roads are contained only in the road network data of the lowermost-grade layer.

In the case that the wide chained line can be identified by a map matching operation with employment of this road network data of the uppermost-grade layer, even when a map matching operation is carried out by using both the road network data of the middle-grade layer and the road network data of the lowermost-grade layer, such a road which is replaced by the wide chained line cannot be identified.

However, in such a case that the wide solid line can be identified in a map matching operation with employment of the road network data of the uppermost-grade layer, there are some possibilities. That is, if a map matching operation is carried out by using the road network data of the middle-grade layer, then the dotted line is identified. Also, if a map matching operation is carried out by using the road network data of the lowermost-grade layer, living roads are identified which are traveled in parallel to the wide solid line and the dotted line. In other words, there is a certain possibility that such a condition that the wide solid line is determined as the objective road, which has been defined in the map matching operation using the road network data of the uppermost-grade layer, may cause an occurrence of an erroneous matching operation.

As a consequence, a judgement is made as to whether or not such a road which may be erroneously map-matched at a peripheral area of the identified road is present in the road network data of the lower-grade layer (step 2). A concrete sequential operation of this judgement will be discussed later.

In the case that such a road which may be erroneously map-matched is present, the road which has been defined by using the road network data of the upper-grade layer is determined as the objective road (step 6).

Also, in such a case that such a road is present which may be erroneously map-matched at the peripheral area of the identified road, a shape comparing operation is carried out with respect to shape vector data in order to check as to whether or not the identified road correctly corresponds to the objective road (step 4). A concrete method of this shape comparing operation will be explained later.

Based upon a result of this shape comparing operation, a judgement is made as to whether or not the road which has been identified based upon the road network data of the upper-grade layer is correct as the objective road (step 5). If this identified road is correct, then the identified road is determined as the objective road (step 6). On the other hand, when it cannot be judged that the identified road is corrected as the objective road, a map matching operation is newly carried out by using the road network data of the lower-grade layer (step 7).

As previously explained, such a condition that the map matching operation is newly carried out by using the road network data of the lower-grade layer after the map matching operation has been carried out by using the road network data of the upper-grade layer may cause the process operation executed in the upper-grade layer to become useless, and may cause a processing efficiency to be lowered, as compared with a processing efficiency achieved in such a case that a map matching process operation is carried out in the lower-grade layer from the beginning stage. However, in the case that a map matching operation in the upper-grade layer can succeed, and further, a parallel-traveling road which may be erroneously map-matched is not present, a process operation may be finished in an instant. As a consequence, in total performance obtained in several tens to several hundreds of map matching process operations, such a sequential operation owns a merit, in which the map matching operation of the road network data of the upper-grade layer is commenced in accordance with the sequential operation of FIG. 5.

Figure 7:
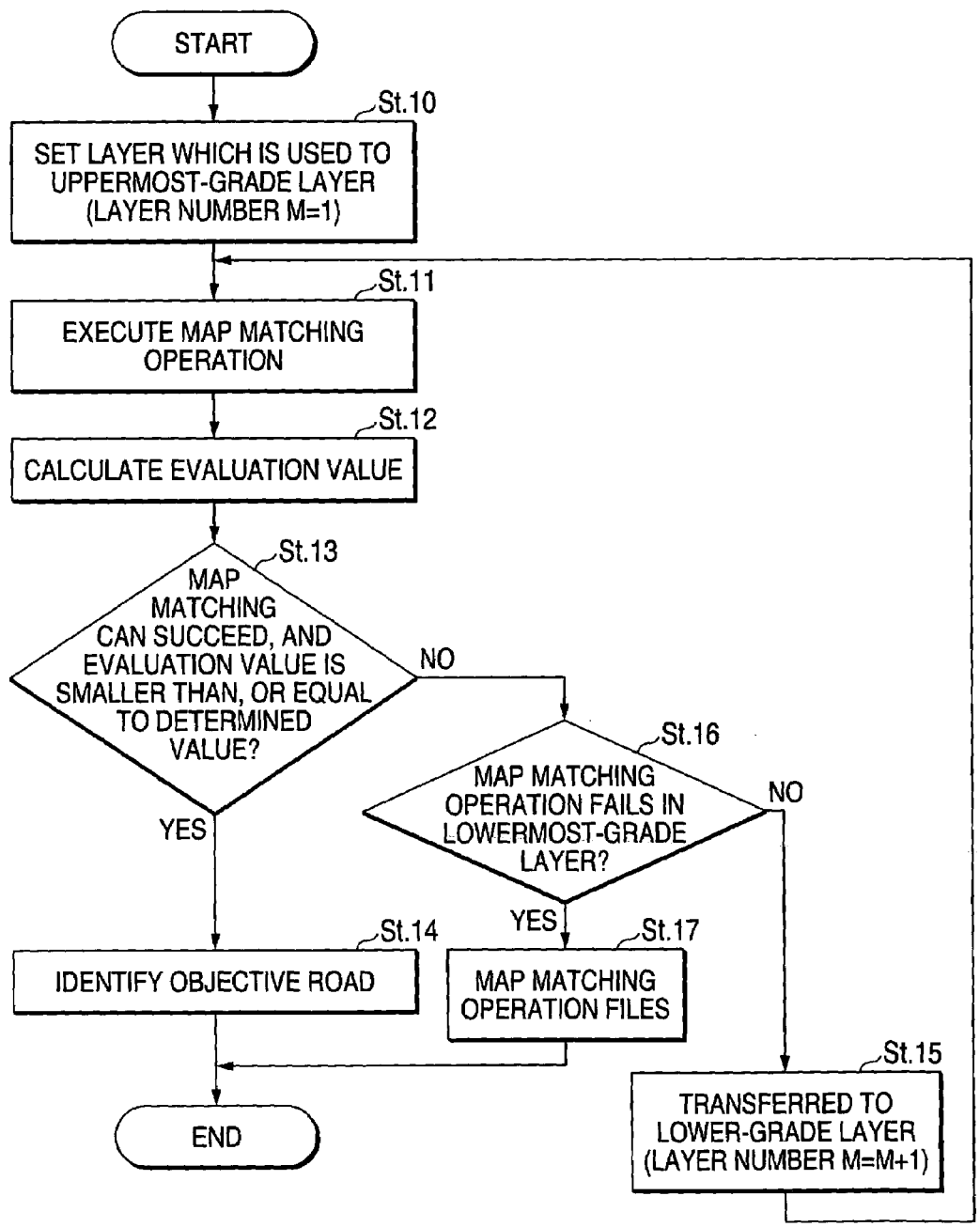
FIG. 7 is a flow chart for indicating a sequential operation in which a map matching operation is carried out in an upper-grade layer as high as being permitted in accordance with the first embodiment mode of the present invention.

FIG. 7 shows an example of the process sequential operation defined in the step 1 of FIG. 5, namely, a process sequential operation in which a map matching operation is carried out as high as being permitted in high-grade layers.

The hierarchical layer of the road network data which is used in the map matching operation is set to the highest grade (layer number=1) (step 10). While a node of shape vector data of a objective road is set as a WP, a map matching operation is carried out (step 11).

An evaluation value is calculated based upon a distance error and an azimuth error between the WP and a candidate point of the selected shape pattern (step 12). The evaluation value is calculated in accordance with, for example, the below-mentioned formula:

$$\text{evaluation value } \Phi = \{\Sigma(\alpha \cdot Lj + \beta|\theta j - \theta j'|)\}/S$$

In this formula, symbol "Lj" indicates a distance between WP(j) and the candidate point (j); symbol "θj" represents an absolute angle of WP(j); symbol "θj'" indicates an absolute angle of the candidate point (j); symbol "S" shows a distance of a shape pattern; and symbols "α" and "β" are coefficients.

Setting of the candidate point can succeed, and a judgment is made as to whether or not the evaluation value of the candidate point is defined within a defined value (step 13). When the evaluation value of the candidate point is defined within the defined value, a objective road is defined based upon the selected shape pattern (step 14).

Also, in the step 13, when setting of the candidate point cannot succeed, or the evaluation value of the candidate point exceeds the defined value, a discrimination is made as to whether or not a hierarchical layer of the used road network data corresponds to the lowermost layer (step 16). When the hierarchical layer corresponds to the lowermost layer, it is so assumed that the map matching operation fails, and then, the process operation is accomplished (step 17).

Also, in such a case that the hierarchical layer of the used road network data does not correspond to the lowermost layer in the step 16, the sequential operations defined from the step 11 are repeatedly carried out by using such a road network data, the layer number of which is decreased by 1.

Since such a sequential operation is carried out, the map matching operation can be carried out in a high-grade layer as high as being permitted.

Next, a description is made of the judging process operation of the step 2 of FIG. 5.

Figure 8:
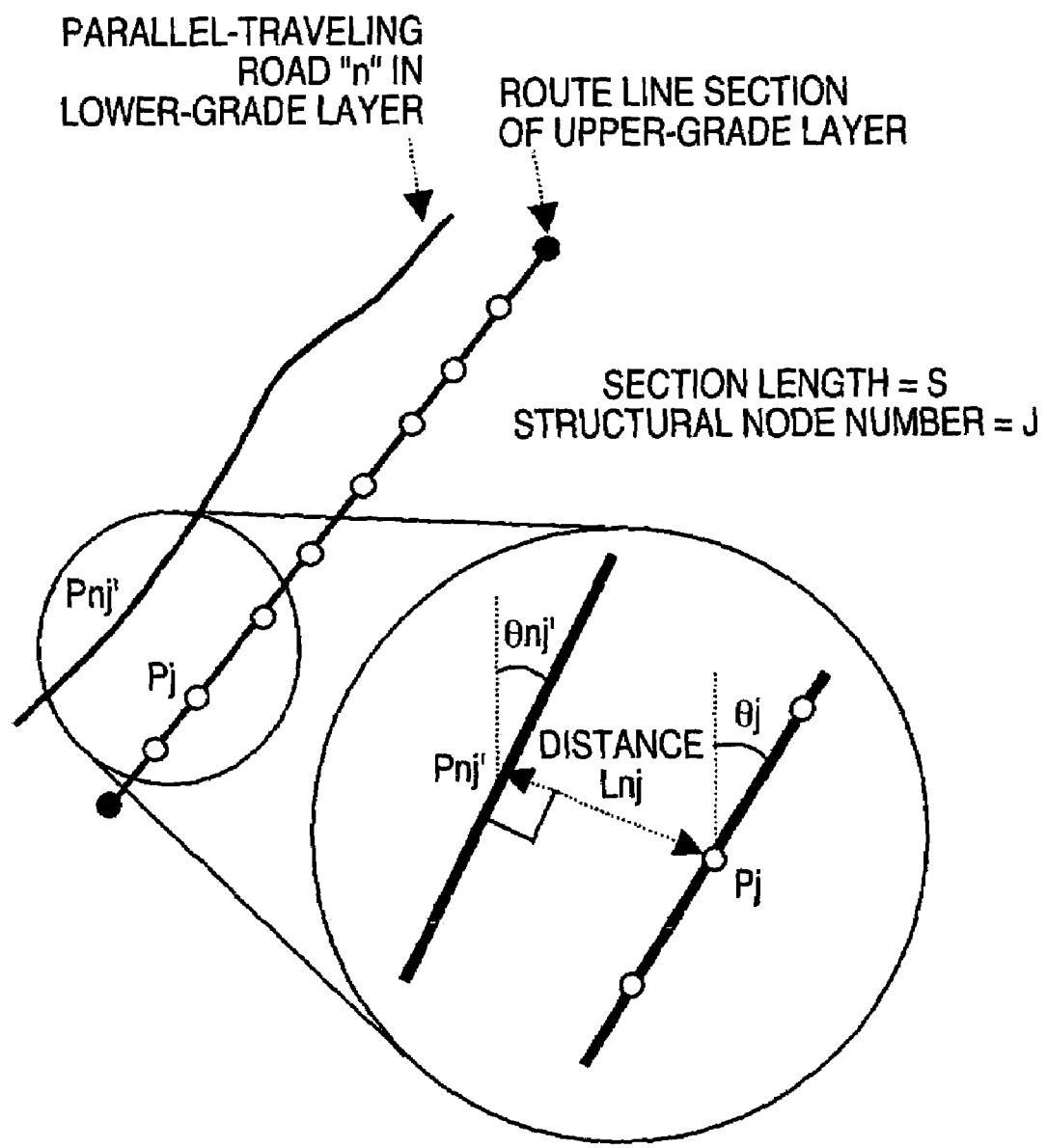
FIG. 8 is a diagram for indicating parallel-traveling resembling shaped roads.

In order that a judgment can be made as to whether or not such a road which may be erroneously map-matched and is located at a peripheral area of the objective road identified in the upper-grade layer is present in the road network data of the lower grade, attribute information (parallel-traveling resembling shape attribute) is previously added as link information to the road network data of the upper-grade hierarchical layer. The attribute information indicates as to whether or not a parallel-traveling shaped road is present. A road which is parallel-traveled implies a resembling shaped road, the angle difference of which is smaller than a predetermined angle, in this specification. Generally speaking, information as to a parallel-traveling resembling shape attribute may be produced by using one, or more items of a plurality of WPs which have been set on the relevant road of the upper-grade layer, distances and azimuth differences between the plural WPs and corresponding proximate points on the adjoining roads, connection characteristics between the proximate points, and routed distances. A detailed explanation is given as follows:

In order to evaluate as to whether or not a parallel-traveling resembling shaped road is present in each of links of an upper-grade layer, (1) as shown in FIG. 8, "WP(Pj)" are properly set along the link of the upper-grade layer (center points among interpolation points and in unit of fixed length).

(2) A vertical line is drawn from each of WP(Pj) onto "n" pieces of peripheral roads which are contained in the lower-grade layer so as to set candidate points Pnj' are set on the respective peripheral roads, and then, an evaluation value with respect to each of the peripheral roads is calculated in accordance with the below-mentioned formula:

evaluation value $\Phi = \{\Sigma(\alpha \cdot Lnj + \beta|\theta j - \theta nj'|)\}/S$ In this formula, symbol "Lnj" shows a distance between WP(Pj) and the candidate point (Pnj'); symbol "θj" represents an absolute angle of WP(Pj); symbol "S" shows a link length; and symbols "α" and "β" denote coefficients.

In order to evaluate that the parallel-traveling resembling shaped road is present with respect to the link of the upper-grade layer, such a condition that this evaluation value with respect to the peripheral road is smaller than, or equal to a constant value is a necessary condition.

(3) In order to evaluate that the parallel-traveling resembling shaped road is present with respect to the link of the upper-grade layer, such a condition that a candidate position (Pnj–1') on the peripheral road and the candidate position (Pnj') are connected as to all of "j" is a necessary condition. As indicated in FIG. 9, in such a case that a portion of a peripheral road corresponding to a link of an upper-grade layer is cut, since an error matching operation does not occur, this peripheral road is derived from an object for the parallel-traveling resembling shaped road.

(4) In order to evaluate that the parallel-traveling resembling shaped road is present with respect to the link of the upper-grade layer, such a condition that as to all of "j" on the peripheral road, an accumulated value of declination absolute values with respect to the shortest route between the candidate position (Pnj–1') and the candidate position (Pnj) is smaller than, or equal to a constant value, and further, routed distances WP(Pj–1) to WP(Pj) between the two points are substantially equal to each other is a necessary condition. Otherwise, such a condition that a fluctuation of the distances (Lnj) is smaller than, or equal to a constant value.

It is so assumed that if the above-described conditions (2), (3), (4) are processed by way of AND-gating condition and all of these conditions can be satisfied, the parallel-traveling resembling shaped road is present with respect to the link of the upper-grade layer.

As indicated in FIG. 10(a), as the attribute information of the respective links, the parallel-traveling resembling shape attributes of the links are added to the road network data, and as represented in FIG. 10(b), presence/absence of a parallel-traveling resembling shaped road is described in the road network data (namely, presence/presence of partial section/absence).

Figure 11:
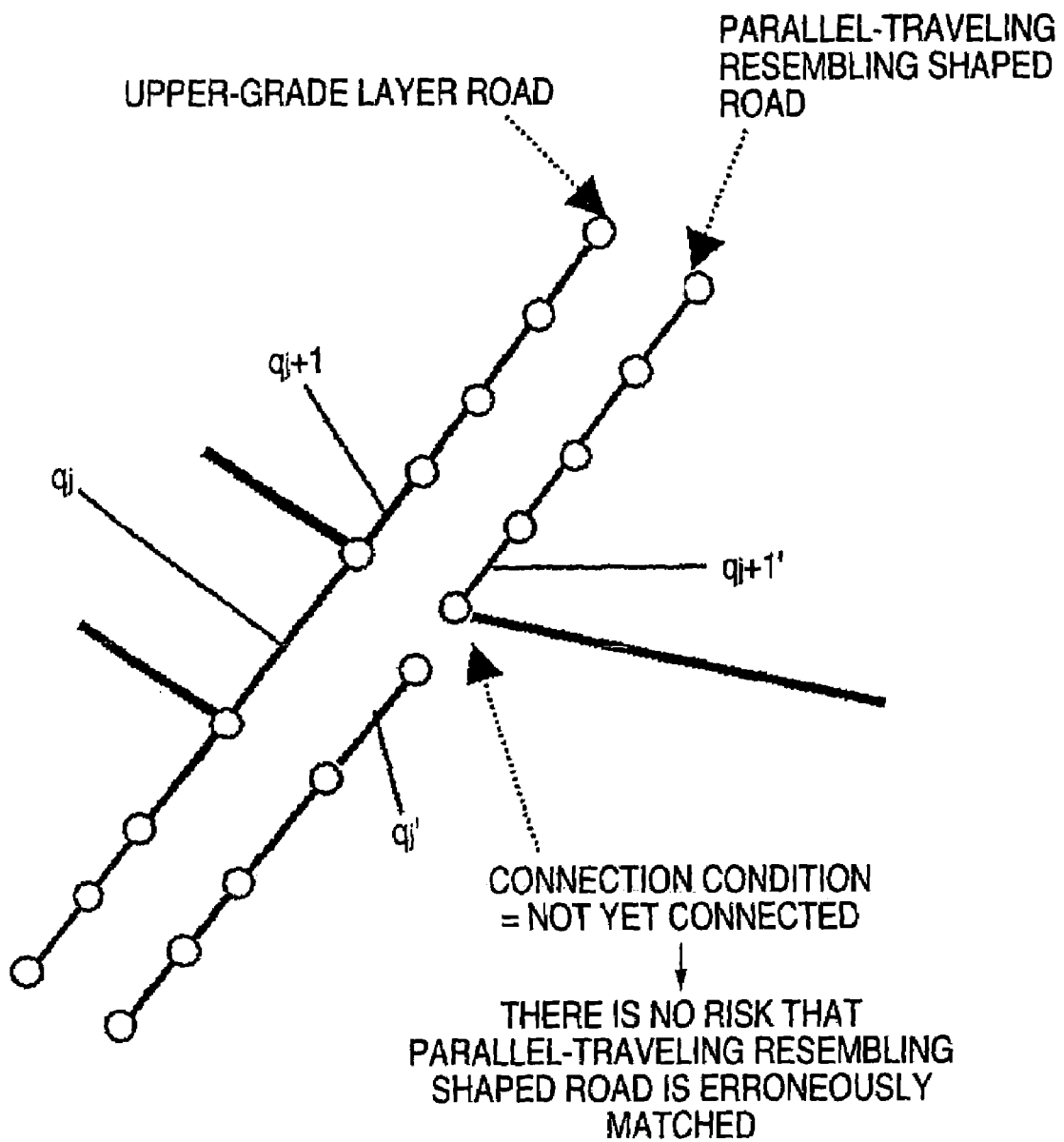
FIG. 11 is a diagram for representing parallel-traveling resembling shaped roads which are not link-connected to each other at a crossing point.

Also, such an information "connection (presence/absence) at up-stream/down-stream sided intersections) is added to the parallel-traveling resembling shape attribute. This information indicates as to whether or not this parallel-traveling resembling shaped road is connected to parallel-traveling resembling shaped roads at intersections, which are located adjacent to each other and in the links of the up stream and the down stream. From this information, it can be grasped as to whether or not the parallel-traveling resembling shaped roads which are present with respect to the respective links of the upper-grade layer are connected to each other. If the parallel-traveling resembling shaped roads are not connected to each other, then such a judgement can be made that there is no risk as to an occurrence of an erroneous matching operation. For example, as shown in FIG. 11, in such a case that a resembling shaped link (qj+1') corresponding to an adjoining link (qj+1) of a down-stream side of the own link (qj) is not connected to a resembling shaped link (qj') of the own link (qj) at an intersection, there is no risk that a road of an upper-grade layer is erroneously matched with a parallel-traveling resembling shaped road of a lower-grade layer.

Since such a parallel-traveling resembling shape attribute of the link is previously added to the road network data, the process operation defined in the step 2 of FIG. 5 may be carried out as follows:

That is to say, a reference is made of the parallel-traveling resembling shape attributes of the respective links included in the identified road section from the road network data which has been employed so as to define the objective road in the step 1.

Then, in such a case that the parallel-traveling resembling shapes are present within sections larger than, or equal to a portion of this road section, and furthermore, a connection of intersection portions is also present, such a judgment is made of "there are some possibilities that resembling shaped road is present in the vicinity thereof in lower-grade layer." In other cases, it is so judged as "NO."

It should be noted that this judgment may be alternatively carried out by considering an occurrence ratio of erroneous matching operations and the evaluation value "Φ" calculated in the above-described item (2).

It should also be noted that the evaluation value "Φ" used to evaluate the presence of the parallel-traveling resembling shaped road may also be calculated from another formula.

Alternatively, when the presence of the parallel-traveling resembling shaped road is evaluated, an algorithm of a pattern matching operation may be applied.

Next, the description is made of an example of the shape comparing operation defined in the step 4 of FIG. 5.

In order to readily perform this shape comparing operation, both a shape of the relevant link and a representative value indicative of a shape of a parallel-traveling resembling shaped road, namely "shape representative value" are contained in the parallel-traveling resembling shape attribute of the link which is added to the road network data.

As this shape representative value, the below-mentioned values are employed:

"declination accumulated value": As indicated in FIG. 8, assuming now that positions on the parallel-traveling resembling shaped road are equal to Pj' (j=1 to N), which correspond to WP(pj) (j=1 to N) arranged in an equidistance on the link of the upper-grade layer, a declination accumulated value of the link is obtained by adding declinations to each other at WP(Pj) (j=1 to N), and also, a declination accumulated value of the parallel-traveling resembling shaped road is obtained by declinations to each other at the positions Pj' (j=1 to N).

"declination absolute value accumulated value": A declination absolute value accumulated value of the link is obtained by adding declination absolute values to each other at WP(Pj) (j=1 to N), and a declination absolute value accumulated value of the parallel-traveling resembling shaped road is obtained by adding declination absolute values to each other at the positions Pj' (j=1 to N).

"fluctuation with respect to relevant road (parallel-traveling road) of upper-grade layer": This fluctuation is expressed by standard deviation of distances Lj (j=1 to N) between WP(Pj) and the positions Pj'.

In addition, a frequency spectrum and the like may be employed.

FIG. 12 shows road network data in which such information has been added to a parallel-traveling resembling shape attribute, and furthermore, as to each of parallel-traveling resembling shaped roads, the below-mentioned items have been added thereto. That is, declination accumulated values of links, declination absoluted value accumulated values of the links, and a total number of parallel-traveling resembling shapes have been added to the parallel-traveling resembling shape attribute. Furthermore, these items correspond to a resembling shape evaluation value (evaluation value "Φ" of (2)); a hierarchical layer; a road attribute; an entire/partial discrimination for indicating as to whether or not this parallel-traveling resembling shape is present in a portion of the link, or an entire portion of the link; a declination accumulated value; a declination absolute value accumulated value; a fluctuation (standard deviation) with respect to the link; a connection/non-connection at an up-stream sided intersection; and a declination absolution value accumulated value (minimum value) of a connection portion as to each of the parallel-traveling resembling shaped roads.

Figure 13:
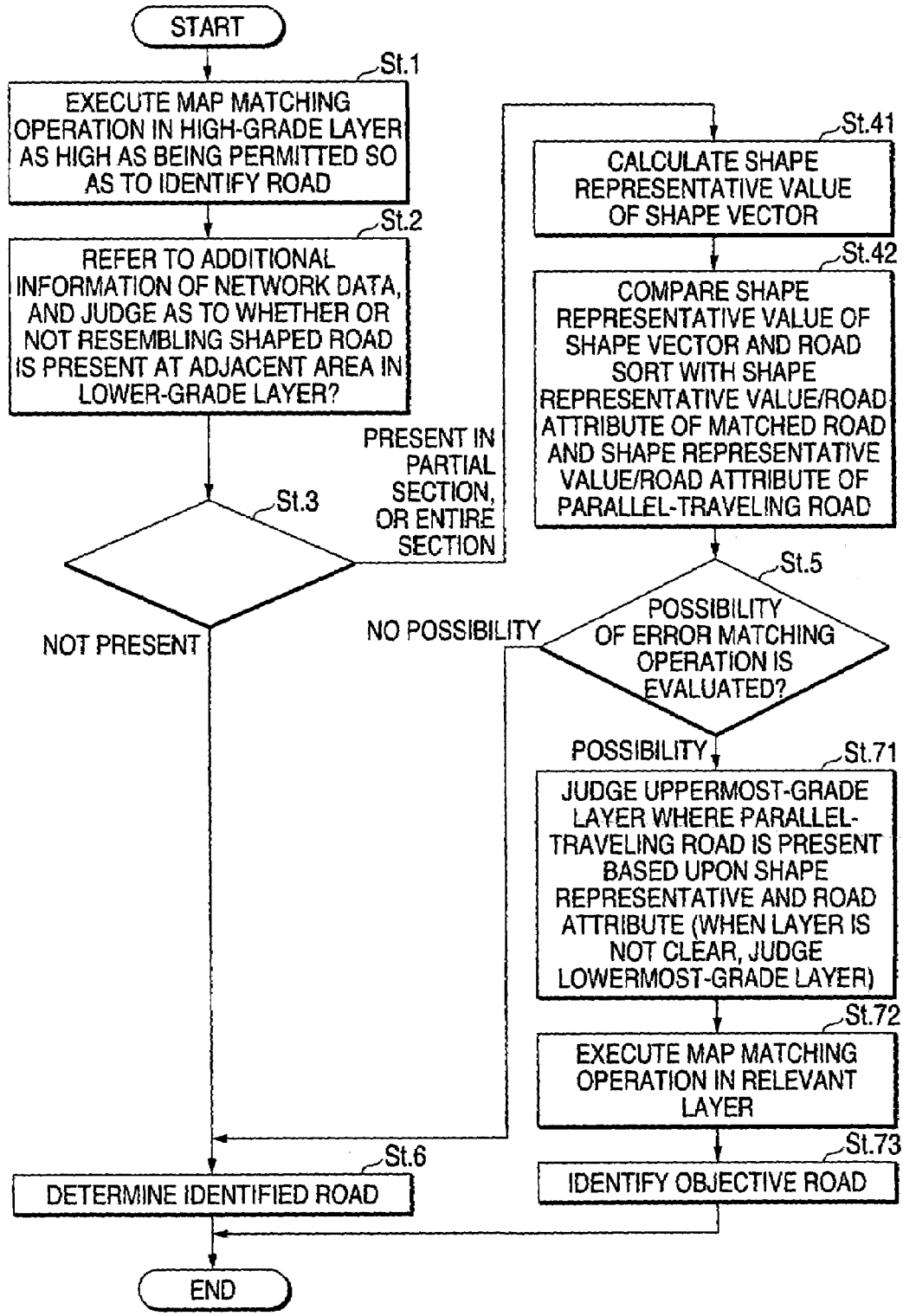
FIG. 13 is a flow chart for showing a possibility judging sequence of erroneous matching operation by comparing shapes with each other in accordance with the first embodiment mode of the present invention.

FIG. 13 indicates a detailed sequential operation in the case that the process operations defined in the step 4 and the step 7 of FIG. 5 are carried out by using this road network data.

While referring to the parallel-traveling resembling shape attributes of the respective links from the road network data which has been employed so as to identify the objective road in the step 1, in such a case that a parallel-traveling resembling shaped road is present in either a portion of the identified road section or an entire section thereof, a shape representative value of a shape vector is calculated (step 41). These links are included in the identified road section.

Next, both a shape representative value of the road section identified in the map matching operation and a road sort contained in the link road attribute information are read out from the road network data. Also, a shape representative value and a road sort of a parallel-traveling resembling shape road are read out from the road network data, and then, these read shape representative values and road sorts are compared with the shape representative value and the road sort of the shape vector (step 42).

In this comparing operation, when the road sort of the shape vector is made coincident with the road sort of the road section identified in the map matching operation, and is different from the road sort of the parallel-traveling resembling shaped road, it is so evaluated that there is no possibility as to an occurrence of an error matching operation (step 5). Also, if the evaluation cannot be made only based upon the road sorts, then the shape representative values are compared. In such a case that the road section identified by the map matching operation owns a small shape difference with respect to the shape vector, as compared with the parallel-traveling resembling shaped road, it is so evaluated that there is no possibility as to an occurrence of an error matching operation (step 5).

Also, either when the road sort of the shape vector is not made coincident with the road sort of the road section identified in the map matching operation, or in such a case that although the road sort is made coincident with the road sort of the shape vector, the parallel-traveling resembling shape road owns a small shape difference with respect to the shape vector, it is so judged that there is a possibility as to an occurrence of an error matching operation. The uppermost layer where the relevant parallel-traveling resembling shaped road is present is judged from this road sort and the shape representative value, and then, this uppermost layer is selected. When the layer where this parallel-traveling resembling shaped road is present is not clear, the lowermost layer is selected (step 71).

While the road network data of the selected layer is employed, a map matching operation of the shape vector is newly carried out (step 72) so as to identify a objective road (step 73).

As previously explained, since this method can directly identify "if error map matching occurs, then road belonging to which hierarchical layer is relevant", the matching operation can be again carried out by using the road network data of the directly identified hierarchical layer without always using the lowermost layer which requires a lengthy process time. Thus, the re-calculation can be carried out in a higher efficiency.

Figure 14:
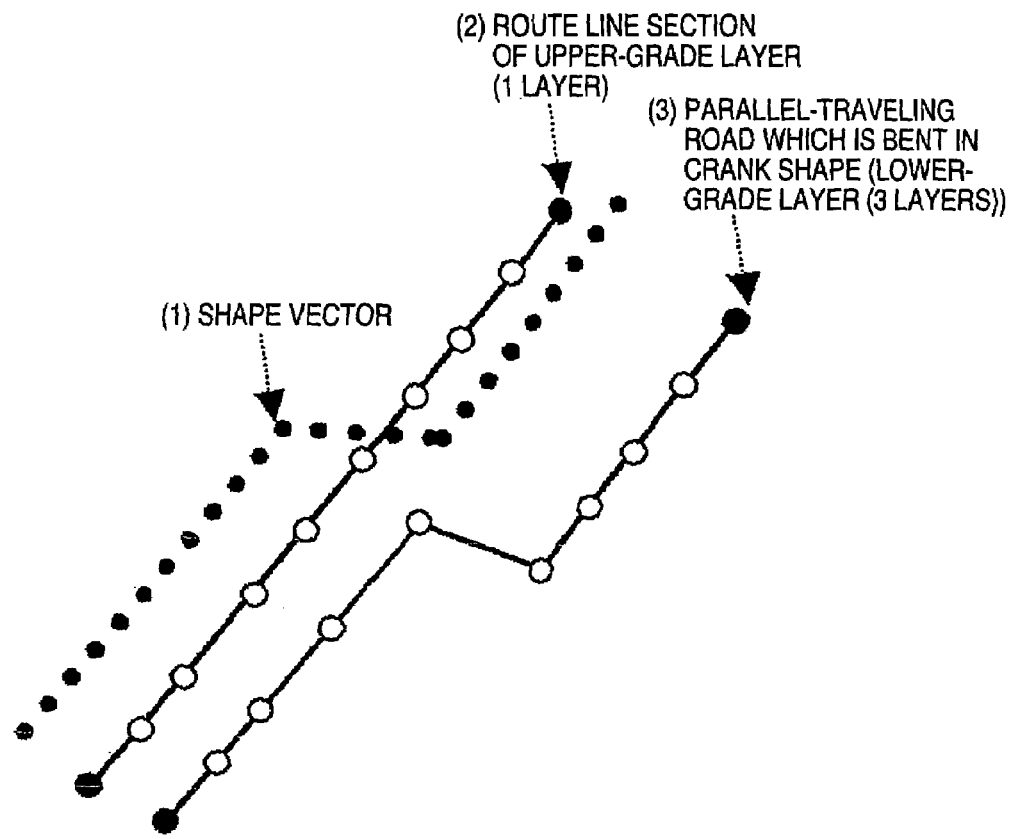
FIG. 14 is a diagram for comparing a shape of a road which is identified by a shape vector and a map matching operation with a parallel-traveling resembling shaped road.

For instance, in an example of FIG. 14, assuming now that a shape vector is (1); a route section of an upper-grade layer identified in a map matching operation is (2); and a parallel-traveling resembling shaped road present in a lower-grade layer is (3), when a calculation is made of both declination accumulated values and declination absolute value accumulated values as to (1), (2), (3), and also, when a fluctuation between the shape (1) and the shape (2), and a fluctuation between the shape (1) and the shape (3) are calculated, the following results are made:

declination accumulated values (1) nearly equal to (2) nearly equal to (3) nearly equal to 0 degree.

declination absolute value accumulated values 180 degrees nearly equal to (1) nearly equal to (3) not equal to (2) nearly equal to 0 degree.

fluctuation between shape (1) and shape (2) nearly equal to fluctuation between shape (1) and shape (3).

It can been seen that such a road which may be erroneously matched is located in the third layer by simply comparing these values with each other.

It should also be noted that as to the calculation of the shape representative value of the shape vector in the step 41, in such a case that when the shape vector is compressed, the shape vector is re-sampled in an equi-distance and the declination is coded in the variable length in the transmission-sided device, the reception-sided device can simply calculate both the declination accumulated value and the accumulated value of the declination absolute value for the received data.

Figure 15:
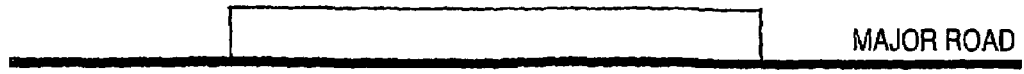
FIG. 15 is a diagram for showing such a condition that a parallel-traveling resembling shaped road is present within only a partial section.

Also, in such a case that a parallel-traveling resembling shaped road is present within a partial section, such a mode as shown in FIG. 15 is taken. In this case, it is so supposed that the parallel-traveling resembling shaped road must be merged into the relevant road at a certain intersection. In other words, it is so supposed that the parallel-traveling resembling shaped road must be curved at a certain place. As a result, in a step 42, the shape is investigated as to a detailed portion. Then, when it can be judged that the shape of the shape vector does not own such a curve as the parallel-traveling resembling shaped road, but owns shape approximated to a shape of a main road, a reexecution of a map matching operation is no longer required based upon road network data of a lower layer in the most cases.

On the other hand, in such a case that a parallel-traveling resembling shaped road is present in an entire section, it is practically difficult to define that a shape vector corresponds to a main road based upon only a shape in the most cases, and a reexecution of a map matching operation by using load network data of a lower layer is required.

To this end, when the transmission-sided device identifies a objective road of traffic information, a certain idea is made. In such a case that a parallel-traveling resembling shaped road is present, if a section of a objective road is selected in such a manner that this parallel-traveling resembling shaped road may become "a parallel-traveling resembling shaped road is present in a partial section", then the reception-sided device can deny a possibility of an error matching operation based upon the process operation of the step 42, and also, the reexecution of the map matching operation in the lower layer is not required in the most cases.

Also, in such a case that a judgment is made as to a road directed to an up stream being combined with a road directed to a down stream, a map matching operation is carried out only as to one-sided road, and a map matching operation for the other-sided road is omitted, a process operation can be carried out in a higher efficiency.

As previously described, in accordance with this map matching method, the objective road can be correctly identified in the high speed. In particular, similar to the objective road of the traffic information, this map matching method may achieve a large effect in such a case that an unequal condition appears in roads included in objective roads within a road network.

Also, with respect to travel locus transmitted from a probe (traveling vehicle) of a probe acquisition system, there is an unequal condition in roads included in objective roads within a road network in view of such a relationship "A main road owns a large traffic amount. If a traffic amount is large, then an up-link frequency is also high." As a result, since this map matching method is applied to the probe acquisition system, a great effect may be achieved.

Also, as shown in FIG. 10(*a*) or FIG. 12, while a frequency of selections by the user and statistical information (for instance, frequency at which either traffic jam or freezing occurs due to season, year, month, day, time, and weather factors) are added to the hierarchical number information contained in the header information, a change in probability at which a road may become a specific subject may be alternatively predicted by using this information in order to further shorten a processing time required for a map matching operation.

In this case, when the predicted road network is not selected, a map matching operations is carried out based upon the normal hierarchical information contained in the header information shown in FIG. 10(*a*).

Alternatively, the roads of the respective hierarchical layers of the hierarchical road network may be determined based upon the below-mentioned road attributes:

Road sort: speedway/national road/major local road/road belonging to the administration divisions of Japan/city road/narrow town road.

Road number: numbers applied to the respective road sorts, National road 246>246, Prefecture road 407 route>407.

Toll/free: discrimination as to whether or not road is toll road.

Road modes: main lane/side lane/communication road (IC portion etc.)/rotary and the like, which represent functions of roads.

Route for providing traffic information: route which has been previously recognized an traffic information providing subject route, VICS link objective road.

Second Embodiment Mode

In a second embodiment mode of the present invention, a description is made of an improvement in the process operation defined in the step 1 of FIG. 5, namely, an improvement in such a process operation that the map matching operation is carried out in the high-grade layer as high as being permitted.

Since the road network data having the hierarchical layer structure has been originally classified to be formed on account of the map data held by the reception-sided device, the transmission-sided device normally cannot grape such items that which road section is contained in the upper-grade layer of this hierarchical layer structure, and which road section is contained in the lower-grade layer thereof. As a consequence, there are some possibilities that a road section of the upper-grade layer is mixed with a road section of the lower-grade layer within a single shape vector transmitted from the transmission-sided device.

In such a case, for example, even when the reception-sided device commences a map matching operation by using the road network data of the upper-grade layer and hits candidate points in a half way under satisfactory condition, the reception-sided device cannot acquire candidate points at a time instant when the shape vector of the road section of the lower-grade layer appears, so that the reception-sided device restarts a map matching operation from the beginning portion by using the road network data of the lower-grade layer. More specifically, this problem may become conspicuous in such a case that the feature node extracting/shape vector deforming unit 33 of the transmission-sided device 30 (FIG. 6) adds a portion (called as "mustache") of a shape of an intersecting road to shape vector data in order to avoid an error matching operation and also to correct a relative distance.

Figure 16:
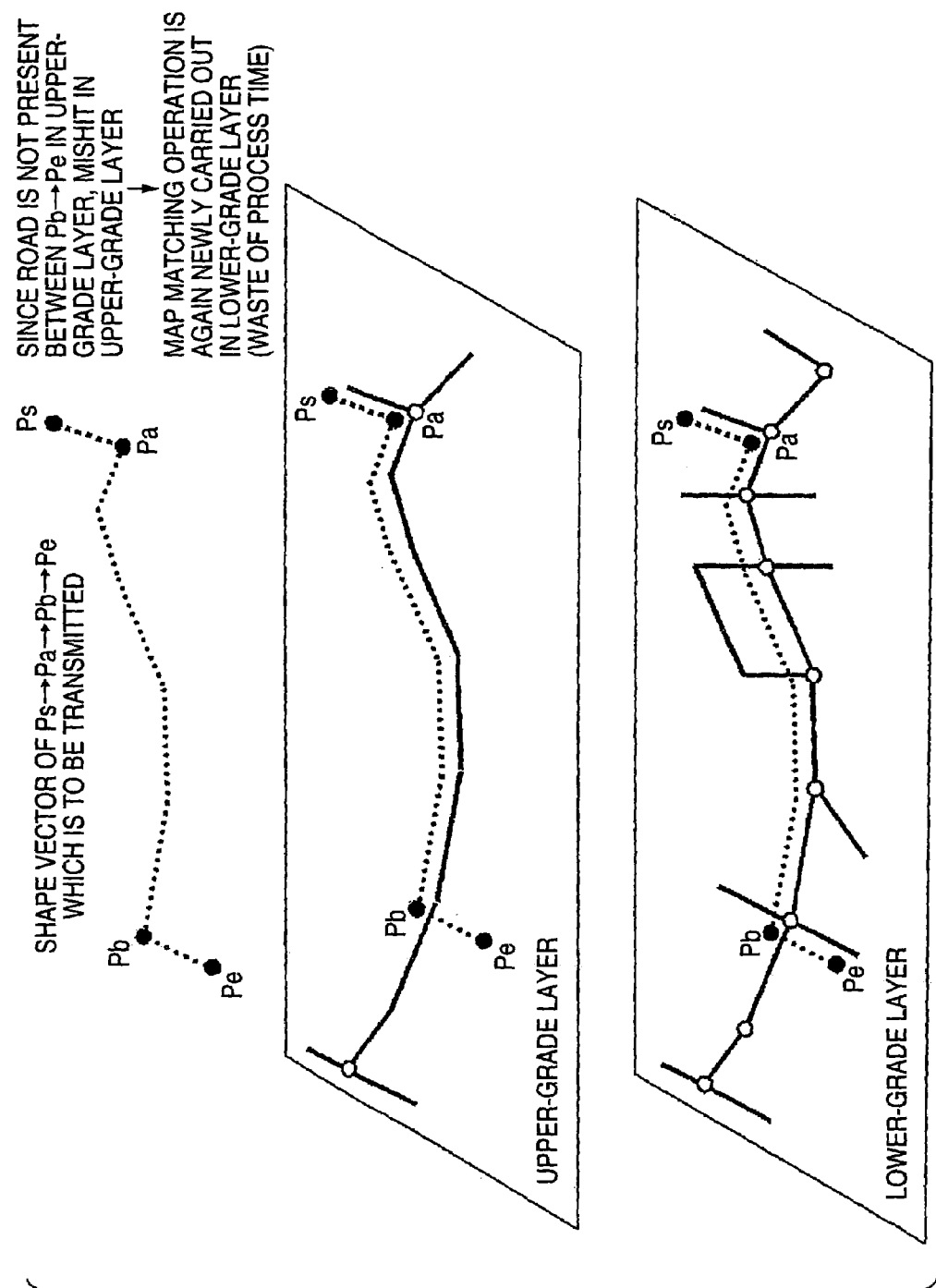
FIG. 16 is a diagram for representing a objective road which bridges a plurality of hierarchical layers which should be processed by a map matching method according to a second embodiment mode of the present invention.

This status is represented in FIG. 16. In the case that the transmission-sided device transmits shape vector data of Pa>Pb, this transmission-sided device adds thereto both Ps>Pa and Pb>Pe as the mustaches, and transmits such a shape vector data of Ps>Pa>Pb>Pe to the reception-sided device.

However, although a section of Ps>Pa>Pb is contained in the road network data of the upper-grade layer of the reception-sided device, another section of Pb>Pe is not contained in this road network data. As a result, when a map matching operation is commenced by using the road network data of the upper-grade layer, a candidate point is hit up to the section of Ps>Pb, but a candidate point cannot be obtained in the section between Pb>Pe, so that the map matching operation must be newly carried out by using the road network data of the lower-grade layer.

In order to improve such an inefficient aspect, in this embodiment mode, when the candidate point can be no longer hit in the upper-grade layer, the map matching operation is transferred to the lower-grade layer.

To realize this operation, the below-mentioned data are set to the road network data of the respective hierarchical layers.

Figure 17:
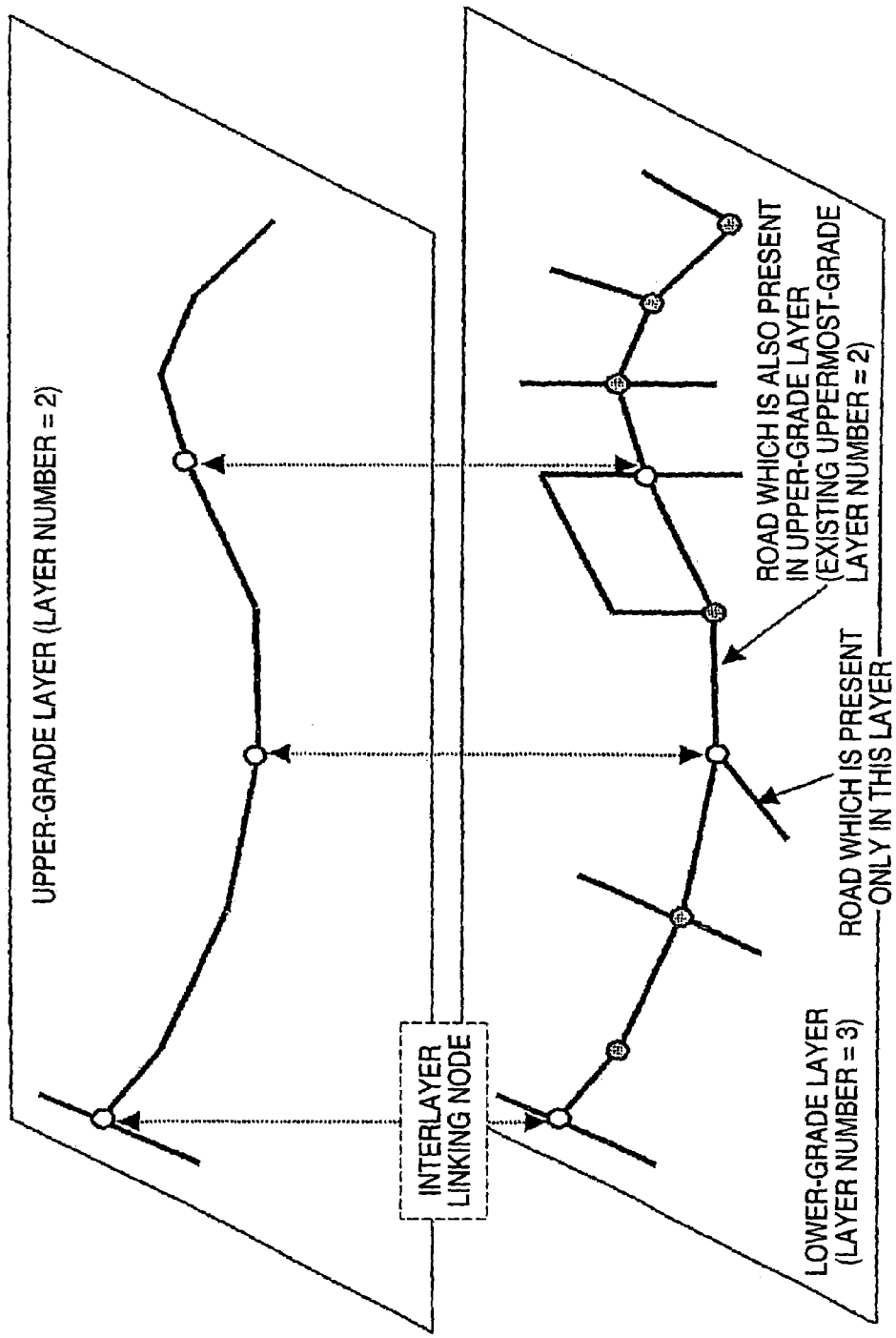
FIG. 17 is a diagram for showing interlayer linking nodes which are set in the map matching operation in accordance with the second embodiment mode of the present invention.

As shown in FIG. 17, an interlayer linking node used to be transferred to a one-lowered hierarchical layer is set to road network data of each of hierarchical layers except for the lowermost-grade layer, and a link is once segmented by this interlayer linking node. Since the interlayer linking node is not an intersection, a connection link is only one link. In FIG. 17, the interlayer linking node is set to such a position that an intersection is located in the one-lowered hierarchical layer. However, there is no necessity that this interlayer linking node is not always set on the intersection, but may be set to an arbitrary place.

It should be understood that since such a fact that the link is segmented causes the performance to be deteriorated, the interlayer linking nodes are set in such a manner that a distance between the interlayer linking nodes is longer than, or equal to a predetermined distance.

The uppermost layer number which is present (for example, as to general-purpose road belonging to the administrative divisions of Japan, "2" is set since uppermost layer number is present below 2 layers) is set as attribute information of each link to road network data of the respective layers which contain the lowermost grade layer.

While the reception-sided device commences a map matching operation by using the road network data of the upper-grade layer and candidate points are hit under satisfactory condition, this reception-sided device continuously uses the road network data of the upper-grade layer. When the reception-sided device fails to seek a candidate point, the map matching operation is returned back to such a position of the nearest interlayer linking node through which the map matching operation has already passed. Then, the road network data of the upper-grade layer is transferred to the road network data of the lower-grade layer, and a map matching operation from this position is continuously carried out by using the road network data of the lower-grade layer.

Since the above-explained interlayer linking node is set, the process operation does not become useless which has been carried out by using the road network data of the upper-graded layer, so that the map matching operation can be carried out in a higher efficiency.

Figure 18:
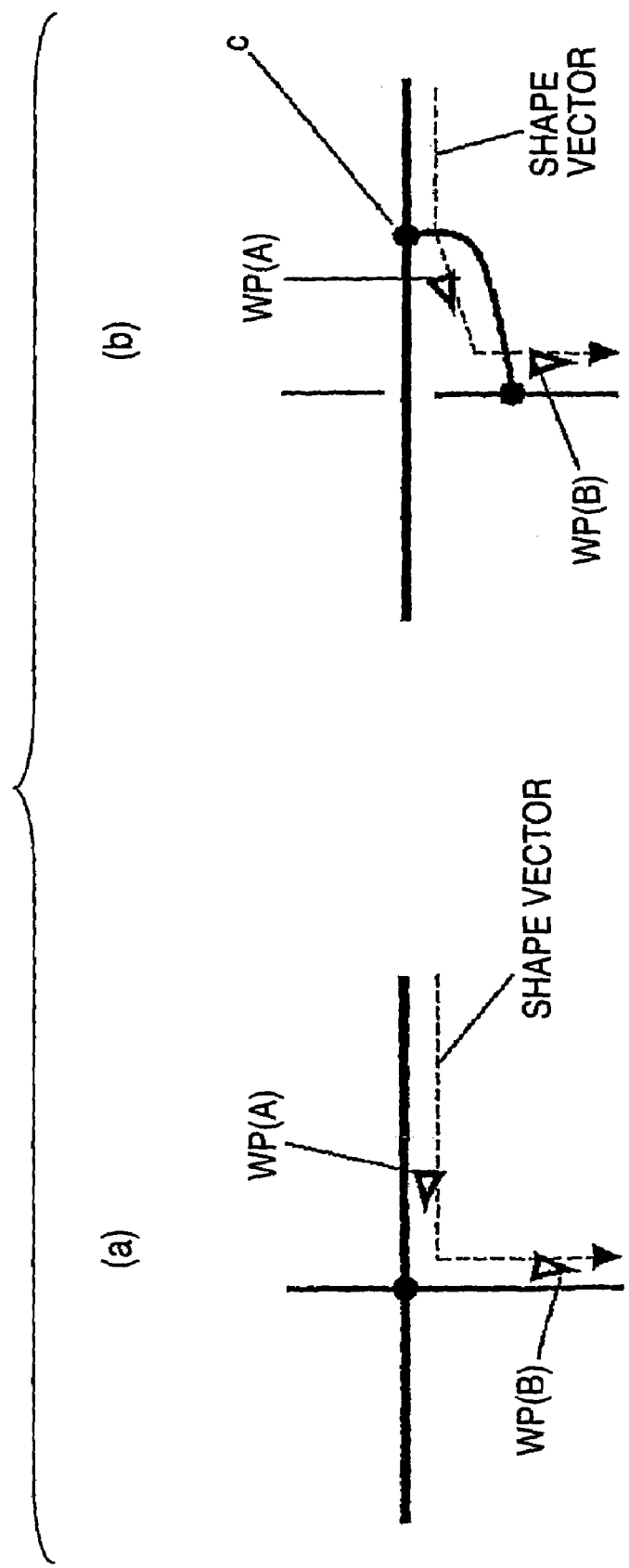
FIG. 18 is a diagram for explaining a definition of an interlayer linking node set in the map matching operation in accordance with the second embodiment mode of the present invention.

It should also be noted that as shown in FIG. 18(a), in the case of an intersection, "interlayer linking node" is not necessarily required under normal condition. Assuming now that in a map matching operation of an upper-grade layer containing only a wide solid line, a searching operation of a candidate point can succeed in WP(A) and a searching operation of a candidate point has failed in WP(B), if the map matching operation is finally returned to WP(A) where the searching operation of the candidate point could succeed and the map matching operation of the upper-grade layer is transferred to that of a lower-grade layer, then the map matching operation in the lower-grade layer can be continuously carried out.

However, in such a case as represented in FIG. 18(b), in a map matching operation of an upper-grade layer containing only a wide solid line, when a searching operation of a candidate point can succeed in WP(A) and a searching operation of a candidate point has failed in WP(B), even if the map matching operation is returned to WP(A) and the map matching operation of the upper-grade layer is transferred to that of a lower-grade layer, the road matched by the map matching operation in the upper-grade layer cannot be connected to a road matched by a map matching operation in the lower-grade layer. In such a case, it is required to clear "where is a point used to be connected to a road network of a lower-grade layer", and therefore, this may play a role of an interlayer linking node "C."

Also, in this case, if the map matching operation is returned up to a point separated from the interlayer linking node C along a right direction and the map matching operation of the upper-grade layer is transferred to that of the lower-grade layer, the road matched by the map matching operation of the lower-grade layer can be connected to a road network of the lower-grade layer. As a consequence, instead of setting of such an interlayer linking node C, a distance returned up to the point separated from the interlayer linking node C along the right direction may be set to each of links (links among interpolation points etc.) as "return distance when map matching operation is transferred to lower-grade layer."

Third Embodiment Mode

In a third embodiment mode of the present invention, a description is made of a method for performing a map matching operation in an upper-grade layer in a higher efficiency in the process operation defined in the step 1 of FIG. 5.

In such a case that a map matching operation is carried out by using road network data of an upper-grade layer, since an averaged link length is long, nodes may be set to WPs, which have been selected at intervals from a structural node column of shape vector.

Thus, in a first method, in such a case that the road network data of the upper grade layer is employed, a map matching operation is carried out by using such nodes as WPs. The nodes have been selected, for instance, every "N" pieces from the structural node column of the shape vector. As explained above, since the nodes are thinned (skipped) from the shape vector so as to be employed as WPs, a total number of WPs is decreased, and processing time of the map matching operation can be shortened. A ratio of thinning the nodes is set by considering an averaged link length and declination of a shape vector. Alternatively, one node may be extracted as WP in the unit of N nodes, or one node may be extracted in the unit of a fixed distance.

In other words, a node is thinned in correspondence with a characteristic of a hierarchical layer. As a concrete thinning method, a node is thinned one time every N nodes, otherwise, a node is thinned one time every fixed distance in a mechanical sense. Alternatively, "skip distance" may be set in hierarchical type data in a high-class thinning method.

Also, in a second method, a distance interval between WPs which are selected while nodes are thinned from a shape vector is previously set as a recommended skip distance in correspondence with a link of an upper-grade layer, and is defined as link information of the road network data of the upper-grade layer.

Figure 19:
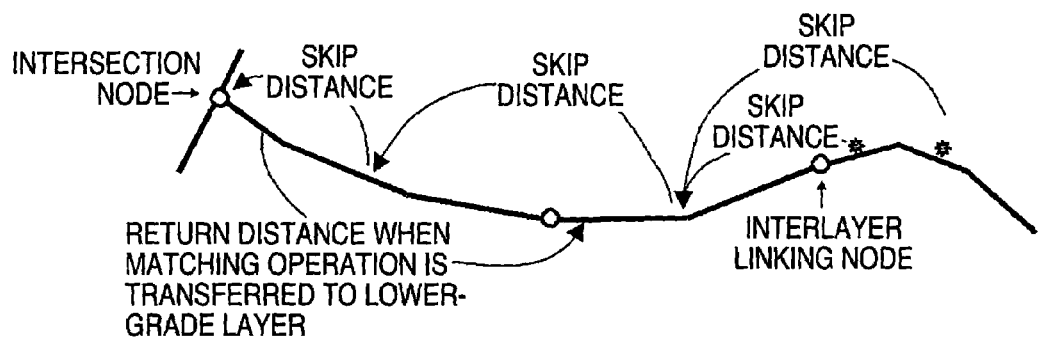
FIG. 19 is a diagram for explaining a recommended skip distance which is defined in a map matching operation in accordance with a third embodiment mode of the present invention.

As represented in FIG. 19, this recommended skip distance is set as follows: That is, viewing a map matching direction (namely, up stream direction in case that map matching operation is carried out from down stream side) from either each of interpolation point or a center point of a link, in such a case that the next node corresponds to an intersection node, this recommended skip distance is set based upon an approximated distance from either each of the interpolation points or the center point of the link up to this intersection node. Also, viewing the map matching direction from either each of the interpolation point or the center point of the link, in such a case that the next node corresponds to an interlayer linking node, this recommended skip distance is set based upon an approximated distance from either each of the interpolation points or the center point of the link up to a center point of the next link.

In the case that a map matching operation is carried out by using road network data of an upper-grade layer, nodes are thinned from the structural node column of the shape vector in accordance with the recommended skip distance defined in the link information, and such nodes used as WPs are selected.

As a result, since a total time of the candidate point searching operations is decreased and also a total number of pattern numbers is decreased, a processing time required for the map matching operation can be shortened.

It should also be understood that when such a method is employed in which nodes are re-sampled in an equi-distance during compression of shape vector and declination is coded in a variable length, since distances between the nodes of the shape vector become equi-distances, it is possible to simply execute that the nodes are skipped by a designated distance along the shape vector.

Also, in a third method, a recommended skip distance is designated in such a manner that WPs can be set before and after "a place where a feature of a shape is produced (=place which is better to be checked) of a link of the relevant layer.

Figure 20:
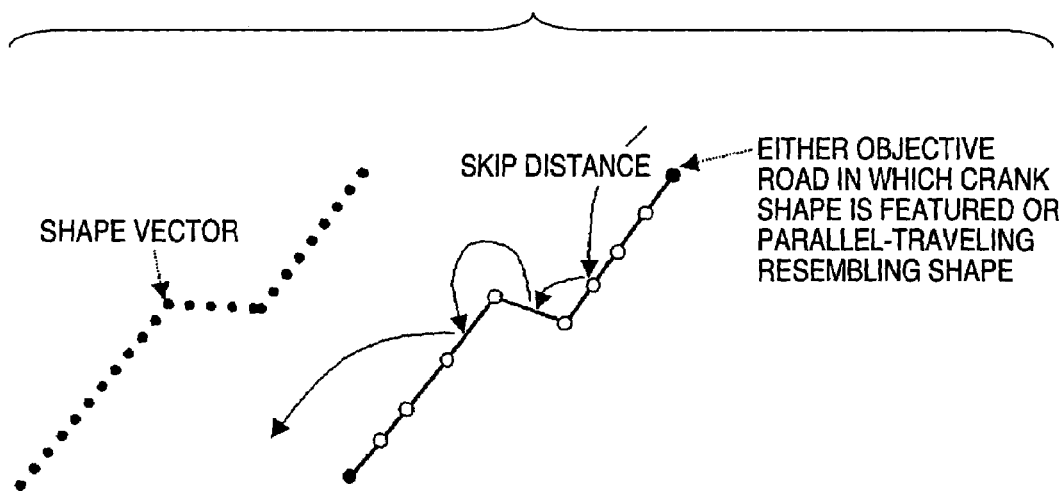
FIG. 20 is a diagram for explaining a recommended skip distance for designating a featured portion which is defined in the map matching operation in accordance with the third embodiment mode of the present invention.

As indicated in FIG. 20, in this third method, in such a case that a link shape expressed by the road network data of the upper-grade layer owns a featured crank shape, a recommended skip distance is designated based upon the link information of the road network data in such a manner that WPs are set to positions of this crank shape.

A featured portion in a link shape may be judged based upon both a dimension of a declination accumulated value per a unit section of a link and a dimension of a declination absolute value accumulated value per the unit section of the link.

As previously explained, since WPs are set to the place where the feature of the link shape is produced, even if WPs are thinned, the feature of the link can be grasped and the link can be identified in a correct manner by the map matching operation.

Also, even when the shape of the relevant link has no feature, such a place (=place which is better to be checked) that a parallel-traveling resembling shaped road owns a feature may be alternatively designated based upon the recommended skip distance. In this alternative case, if this link is selected as the candidate point by the map matching operation of the shape vector, then it is possible to judge that a parallel-traveling resembling shaped road of a lower-grade layer does not correspond to the objective road.

Fourth Embodiment Mode

In a fourth embodiment mode of the present invention, a description is made of a method for performing a map matching operation in an upper-grade layer in a higher efficiency in the process operation defined in the step 1 of FIG. 5 by combining the first embodiment mode and the second embodiment mode with the third embodiment mode.

FIG. 21 indicates road network data (portion of hierarchical layer structure) in this embodiment mode. In this road network data, as link information, the data as to "uppermost layer number of present road" and "return distance when map matching operation is transferred to lower-graded layer) explained in the second embodiment mode are contained, and also, the data as to "recommended skip distance" explained in the third embodiment mode is contained.

Figure 22:
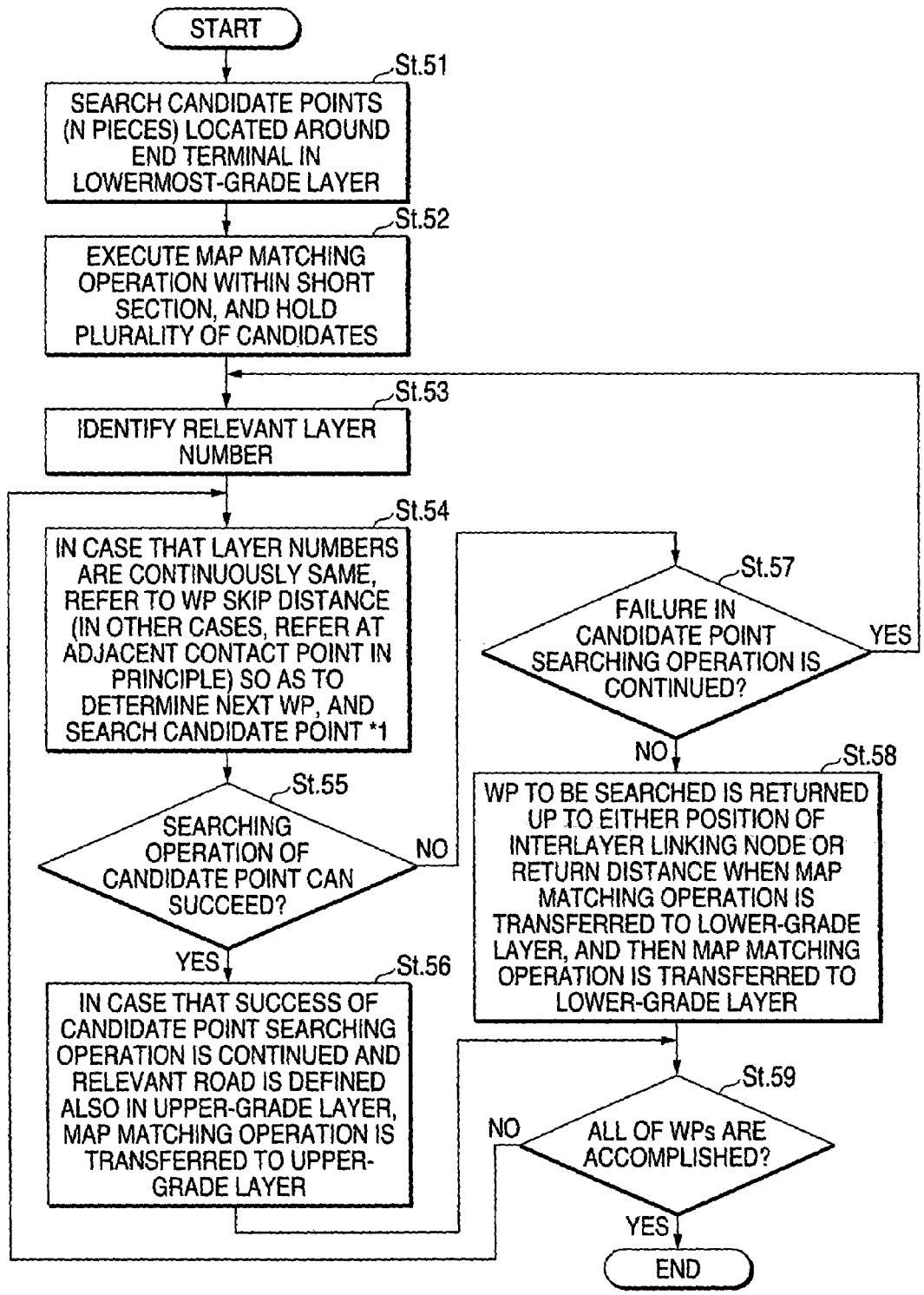
FIG. 22 is a flow chart for describing a process sequence of the map matching operation in accordance with the fourth embodiment mode of the present invention.
Figure 23:
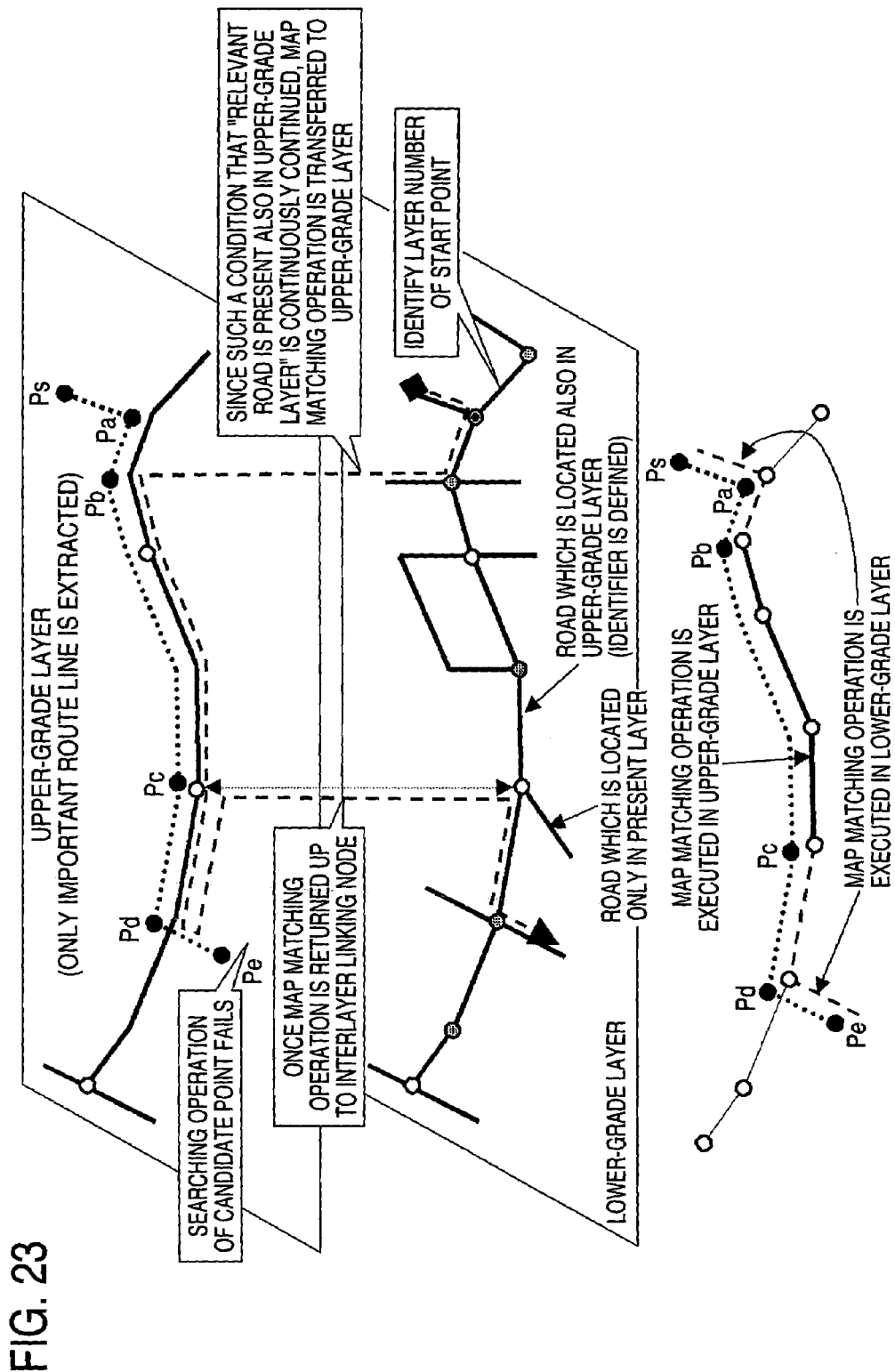
FIG. 23 is a diagram for schematically showing a map matching process operation in accordance with the fourth embodiment mode of the present invention.

Also, a flow chart of FIG. 22 indicates a map matching method in this embodiment mode. FIG. 23 schematically shows this map matching method. In this case, the flow chart indicates that a hierarchical layer structure of road network data corresponds to 2 layers, and a shape vector is map-matched from a down stream toward an up stream in this order of Ps>Pa>Pb>Pa>Pd>Pe.

In this method, first of all, a searching operation is started as to candidate points located at a peripheral portion of a terminal WP(Ps) in the lowermost-grade layer (step 51). A map matching operation is carried out within a short section in the lowermost-grade layer so as to acquire a plurality of candidate points (step 52), and then this layer number is identified (step 53). As previously explained, the reason why the map matching operation is commenced from the lowermost-grade layer is to avoid a fatal erroneous matching operation at the starting point.

A next WP is determined, and a candidate point is searched (step 54). At the starting stage of the map matching operation, an adjoining point is selected to the next WP. When the candidate point searching operation is repeatedly carried out, and then the candidate point searching operation is continued at the same layer number, the next WP is determined with reference to the recommended skip distance.

A check is made as to whether or not a candidate point searching operation in the next WP can succeed (step 55). In such a case that the candidate point searching operation continuously can succeed, and further, the relevant road is also defined in the upper-grade layer, the map matching operation is transferred to the upper-grade layer (step 56). If all of WPs are not yet accomplished (in case of "NO" in step 59), the sequential operation defined from the step 54 is repeatedly carried out. Also, when all of WPs are ended (in case of "YES" in step 59), the process operation is accomplished.

Also, in such a case that the candidate point searching operation fails (in case of "NO" in step 55), a check is made as to whether or not the candidate point searching operation continuously fails (step 57). If the candidate point searching operation does not continuously fail, then WP which is to be searched is returned up to a position of an interlayer linking node, or up to a return distance when the map matching operation is transferred to the lower-grade layer, and then, the map matching operation of the upper-grade layer is transferred to the lower-grade layer (step 58). Then, when all of WP are not ended (in case of "NO" in step 59), the sequential operation defined from the step 54 is repeatedly carried out.

Also, when the candidate point searching operation continuously fails (in case of "YES" in step 57), such a judgement is made that the hierarchical layer of the starting point is incorrect, and thus, the identified hierarchical layer is again acquired.

In the example of FIG. 23, since the map matching operation of Ps is commenced from the lower-grade layer, and also, the candidate point searching operation can continuously succeed, the map matching operation of the lower-grade layer is transferred to the upper-grade layer, and then, the map matching operation of Pc>Pd>Pe is carried out in the upper-grade layer. However, since the candidate point searching operation of Pe fails, the map matching operation is returned up to the position of the interlayer linking node Pc and the map matching operation is transferred to the lower-grade layer. Then, the map matching operation of Pd>Pe is carried out in the lower-grade layer.

As previously explained, since the map matching operations are carried out among the road network data of the plural layers having the hierarchical structure, the effective map matching operations based upon the upper-grade layer can be carried out many times, so that the processing time for the map matching operation can be shortened.

Fifth Embodiment Mode

In a fifth embodiment mode of the present invention, a description is made of a method for determining a range of a candidate point searching operation for a map matching operation in response to an error condition of a shape vector.

In a map matching operation, if an error of a shape vector for applying WP is small, then a range of a candidate point searching operation can be narrowed, whereas if an error of a shape vector is large, then a range of a candidate point searching operation can be widened. As previously explained, the range of the candidate point searching operation is variably set in response to an error of WP, rather than is set in a fixing manner, so that the searching range can be properly set. Also, a process operation in a map matching operation can be carried out in a higher efficiency.

Elements of errors of shape vector data contain precision of base map data which is used to form shape vector data by a transmission-sided device, a deformation amount at which map data is intentionally deformed in order to avoid an error matching operation (described in Japanese Laid-open Patent Application No. 2001-132610), a shape deformation allowable error when encoded shape vector data is compressed in a non-reversible manner (described in Japanese Laid-open Patent Application No. 2001-132611), and so on.

As indicated in FIG. 24, the transmission-sided device transmits the above-described information to the reception-sided device, while the above-explained information is contained in the shape vector data as "base map precision information of shape vector", "maximum deformation amount when deformation is made so as to avoid error matching operation", and "maximum allowable error during non-reversible compressing operation."

The reception-sided device can set a range of a candidate point searching operation in response to an error condition of a shape vector based upon the above-described information.

Figure 25:
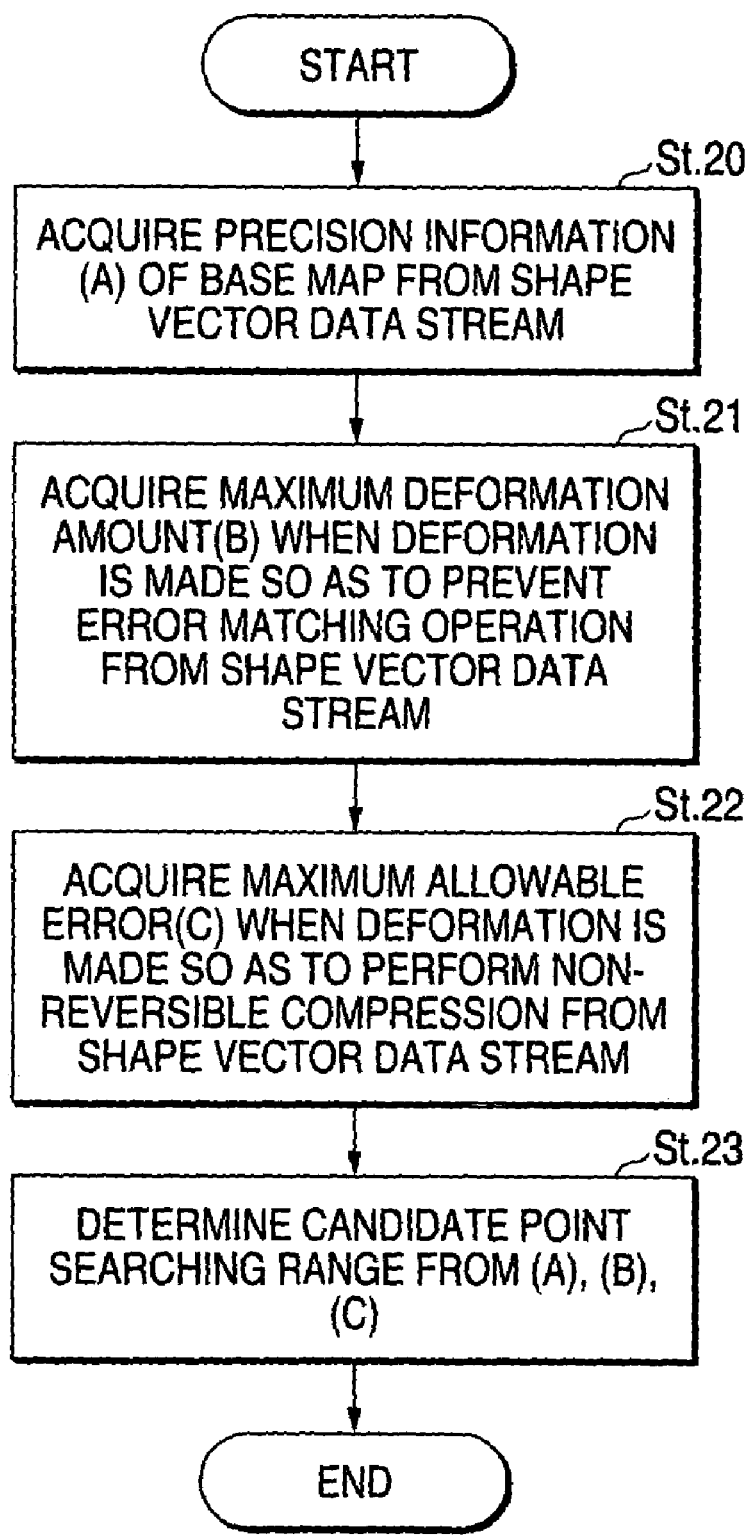
FIG. 25 is a flow chart for describing a sequential operation for determining a candidate point searching range in the map matching operation in the fifth embodiment mode of the present invention.

A flow chart of FIG. 25 indicates a setting sequential operation as to a candidate point searching range in response to an error condition of this shape vector.

The precision information (A) of the base map is acquired from a shape vector data stream (step 20). Next, a maximum deformation amount (B) when the deformation is made so as to avoid the error matching operation is acquired from the shape vector data stream (step 21). Next, a maximum allowable error (c) during the non-reversible compression operation is acquired from the shape vector data stream (step 22). A range of the candidate point searching operation is determined from these acquired (A), (B), (C) (step 23).

For instance, assuming now that such a base map precision information "base map of transmission side is 1/25,000" has been entered in the shape vector, and, on the other hand, precision of map data of the reception-sided device is equal to "1/2,500", there is a shift of approximately 70 m in maximum.

Also, if a shift of 10 m in maximum is present in the deformation for avoiding the erroneous matching operation, then such a shift of 80 m in maximum is produced by combining this shift with the error caused by the base map precision.

Also, assuming now that an allowable error of 10 m in maximum is set when the shape vector is compressed in the non-reversible manner, a shift of 90 m in maximum is produced by combining the error caused by the base map precision with the deformation used to avoid the error matching operation. As a consequence, a candidate point may be found out within such a range whose radius is 90 m. Thus, although the range of the candidate point searching operation has been conventionally fixed to approximately 250 m, the searching range of the present invention can be set in a more proper manner.

Sixth Embodiment Mode

In a sixth embodiment mode of the present invention, a description is made of a method for sequentially optimizing hierarchical layer structure of road network data based upon reception information.

Actually speaking, a road section for receiving traffic information is determined to some extent. As a consequence, road network data having a hierarchical layer structure, which has been set in a default setting operation is updated based upon a data reception time, a matching result, and the like, and thus, this road network data can be sequentially optimized as road network data having a hierarchical layer structure which is fitted to a reception environment.

For example, in such a case that a road section included in an upper-grade layer is appropriate to a objective road only 1 time to 2 times while traffic information has been received 10 times, the road section is deleted from the upper-grade layer. Since such a data rearranging operation is carried out, the road network data of the upper-grade layer becomes light, so that a map matching process operation can be carried out in a high speed.

Also, as to such a road section which has been involved only in the lower-grade layer in the beginning stage, if such a frequency is high at which this road section appears as the objective road, then this road section is contained in the upper-grade layer. Such a case that a sensor or the like are newly set to a road, and then, traffic information of this road is provided may correspond to the above-explained case. Since the optimizing process operation of the hierarchical layer structure is carried out, a hit ratio in the upper-grade layer is increased, and a map matching operation can be performed in a high speed.

Also, as previously explained in both the second embodiment mode and the fourth embodiment mode, in the case that a objective road within a single shape vector bridges a plurality of hierarchical layers, a objective road is identified in the above-described manner. When a frequency at which traffic information is provided is high, all of sections of this objective road can be involved in the upper-grade layer by sequentially optimizing the hierarchical layer structure.

A process sequential operation of this optimization will now be described.

First, appearing probability to traffic information with respect to reception times of the traffic information is defined as a target hit ratio to each of the layers of the hierarchical structure.

For instance, appearing probability with respect to reception times of past several tens of items is set as follows:

First layer: appearing probability higher than, or equal to 80% with respect to reception times, Second layer: appearing probability of 80 to 50% with respect to reception times, Third layer: appearing probability of 50 to 10% with respect to reception times, Fourth layer: appearing probability lower than 10% with respect to reception times.

Figure 26:
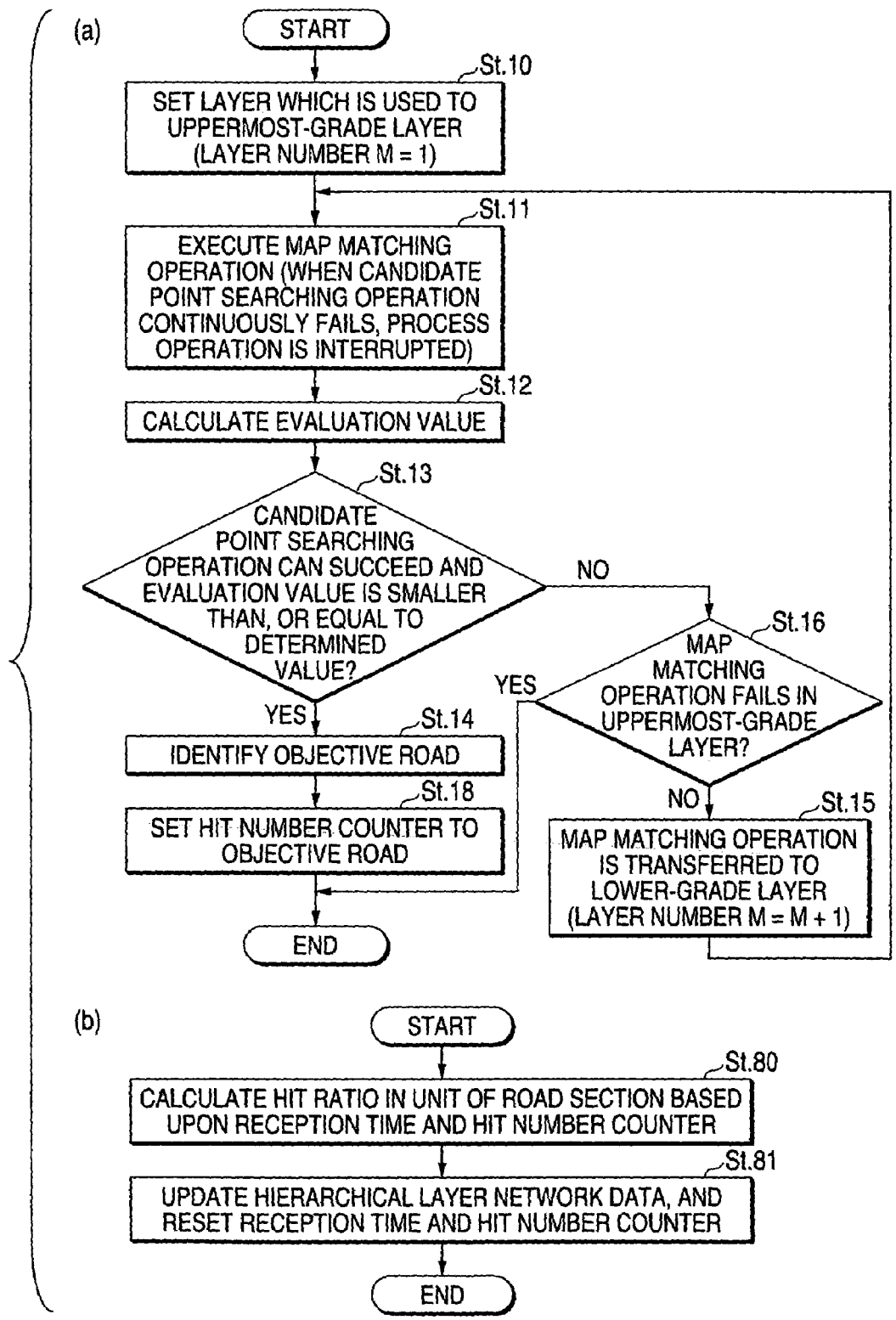
FIG. 26 is a flow chart for indicating an updating sequential operation of road network data having a hierarchical structure in accordance with a sixth embodiment mode of the present invention.

Next, in accordance with a sequential operation shown in FIG. 26($a$), a objective road is identified by executing a map matching process operation when traffic information is received (sequential operation until objective road is identified is identical to sequential operation of FIG. 7). While a hit number counter is set to the identified objective road (step 18), road sections which have be defined as the objective road are counted.

While this count value is employed, the optimizing operation of the hierarchical layer structure is sequentially carried out in an off-line process mode in accordance with a sequential operation shown in FIG. 26($b$).

A hit ratio in the unit of the road section is calculated based upon both the reception times and the count value of the hit number counter (step 80).

In the case that the reception time is reached to a predetermined time, the respective road sections are rearranged as such hierarchical layers that hit ratios thereof are made coincident with target hit ratios, and the roads of the respective hierarchical layers are recombined with each other, and thus, the road network data having the hierarchical structure is updated. Next, both the reception time and the hit number counter are set (step 81).

Alternatively, in this case, while a map matching process-purpose file and an updating operation-purpose file are prepared, data used to execute the map matching process operation and data to be updated in the background may be separately utilized. When the updating process operation is accomplished, separate using of these files may be switched.

Since these process operations are carried out, the road networks of the respective layers can be optimized in correspondence with the reception environment.

It should also be noted that when a network is added/deleted, a hysteresis may be applied in order that a hunting phenomenon does not occur in the vicinity of a boundary of a target hit ratio. For example, in the case that the appearing probability becomes smaller than, or equal to 75%, a network is deleted form the first layer, whereas in the case that the appearing probability exceeds 85%, a network is added in the first layer.

Since a sensor installed on a road is brought into a malfunction condition, there is a certain possibility that a provision of traffic information is temporarily stopped. As a result, even in such a case, as to speedways, national roads, and the like, such an identification flag "absolutely not be deleted" may be applied to the speedways, the national roads, and the like in order that the road network of these speedways and national roads is not deleted from the upper-grade layer.

Also, when a vehicle receives traffic information at a destination place, as to a road condition around this destination place, detailed traffic information is provided, whereas as to a road condition separated far from this destination place, coarse traffic information is provided. As a consequence, when the road networks of the respective layers are updated, a hierarchical layer may be alternatively lowered in such a manner that road density is increased within a road section near a position of the own vehicle, whereas the hierarchical layer may be alternatively increased in such a manner that road density is decreased within a road section separated far from the position of the own vehicle.

Alternatively, since a detailed content of traffic information transmitted from a beacon type transmitter is different from that transmitted from a broadcasting type transmitter, the road network data having the hierarchical structures which are different from each other, depending upon traffic information transmitting media, may be alternatively managed.

Alternatively, the road network data having the different hierarchical layer structures may be managed based upon transmission source ID (broadcasting station number <TOKYO.KANAGAWA Prefecture etc.>) of traffic information, and information source ID (National Police Office.Metropolitan Highway Institute etc.).

Also, in the case of the probe information acquisition system, the road network data having the hierarchical layer structure which is held by the center is updated, while a hit number per unit time and hit probability within all of received locus data are employed as a parameter.

Also, in this case, since features are varied in accordance with a sort of day (week day/holiday/5-th day, 10-th day/Saturday) and a time range, the road network data having the hierarchical layer structures may be alternatively managed, depending to the sort of day and the time range.

As previously explained, the map matching device learns that which road section owns the higher hit ratio based upon the actual match's results obtained from several times of the past map matching operations, and then, the road network data having the hierarchical layer structure is sequentially updated based upon this learning result. As a consequence, the map matching device can reduce such a waste process operation that the map matching operation is newly carried out while the hierarchical layers are changed, and/or the hierarchical layers are switched in a half way while the map matching operation is carried out.

Seventh Embodiment Mode

In a seventh embodiment mode of the present invention, a description is made of a method for utilizing a cache area as the uppermost-grade layer of the road network data having the hierarchical layer structure.

Figure 27:
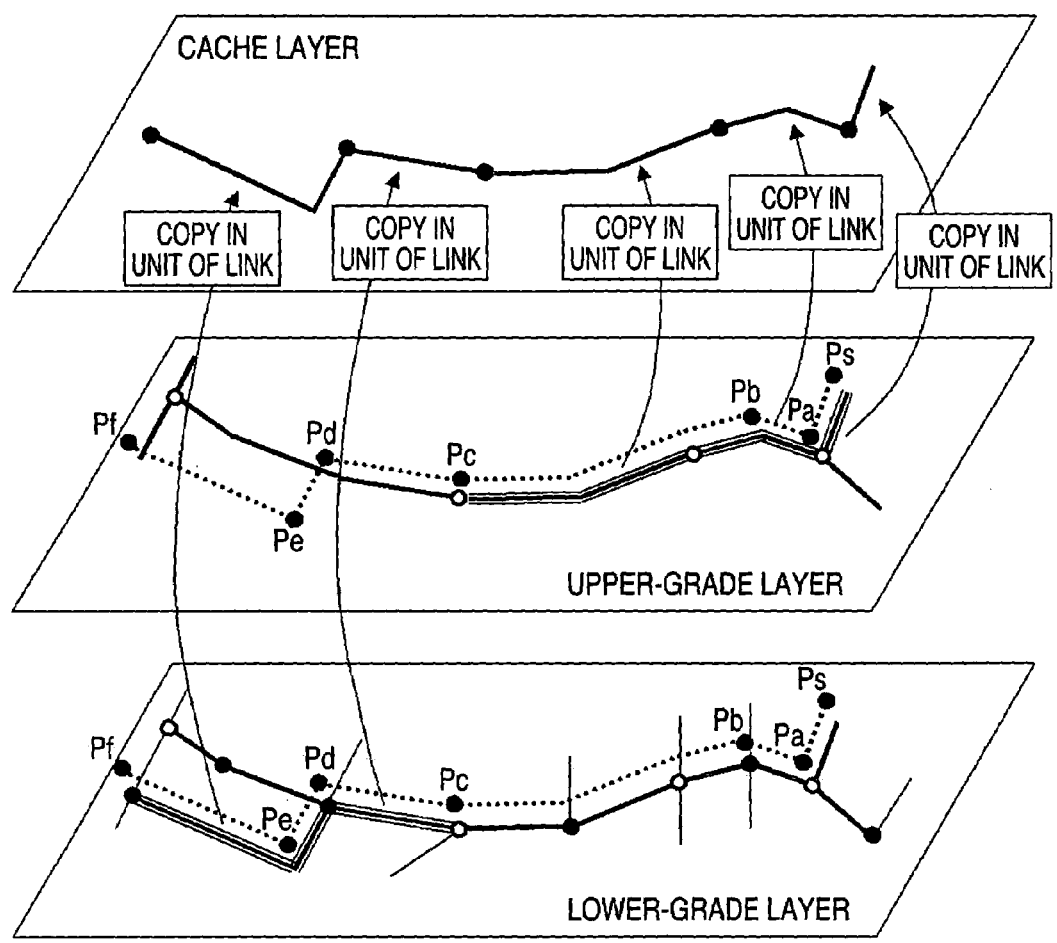
FIG. 27 is a diagram for schematically showing a sequential operation for producing data of a cache layer utilized in a map matching operation according to a seventh embodiment mode of the present invention.

In this method, as schematically shown in FIG. 27, links (links among interlayer linking nodes) which have been hit in the respective layers are copied in a cache area, and then, a road network of this cache area is employed as the uppermost layer.

FIG. 28 indicates road network data having a hierarchical layer structure at this time. FIG. 28(*a*) shows road network data of an upper-grade layer, FIG. 28(*b*) represents road network data of a lower-grade layer, and FIG. 28(*c*) indicates road network data of a cache layer.

Figure 29:
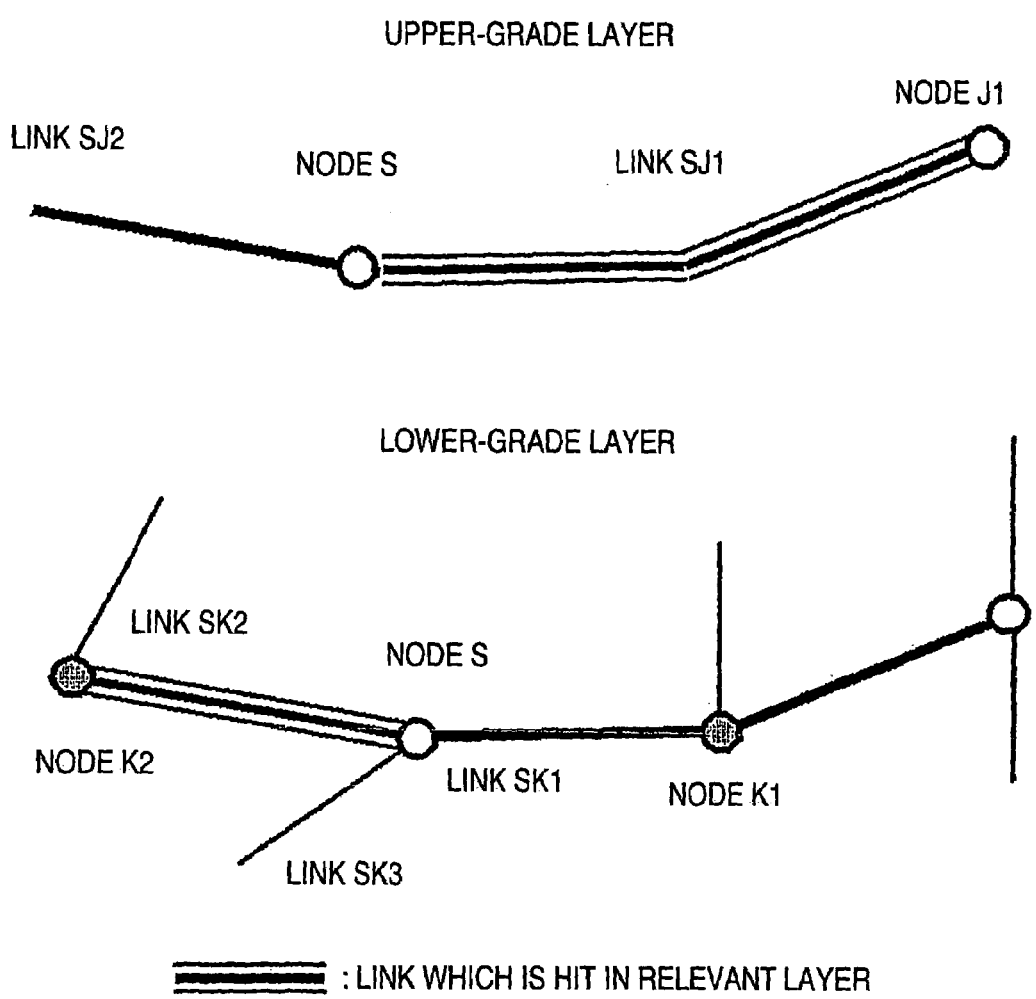
FIG. 29 is a diagram for indicating a link which is hit in the map matching operation.

Now, as shown in FIG. 29, when a link SK2 is hit which is defined by that a map matching operation is commenced from a node K2 of a lower-grade layer and is reached up to a node S, both a link number and link information as to the link SK2; node numbers, attribute information, latitude/longitude of the node K2 and the node S; and connection information among these nodes of the road network data (FIG. 28(*b*)) of the lower-grade layer are copied to the road network data (FIG. 28(*c*)) of the cache layer. If such information as a shape representative value and a parallel-traveling resembling shaped road shape attribute is contained in the link information, then all of the above-described information is copied to the cache layer. It should also be noted that a recommended skip distance and the like must be again calculated.

Both a node number and a link number of the road network data of the cache layer (FIG. 28(*c*)) are calculated every time data is copied to the cache layer so as to be updated.

Also, when another link SJ1 refined from a node S up to another node J1 of the upper-grade layer shown in FIG. 29 is hit both a link number and link information as to the link SJ1; node numbers, attribute information, latitude/longitude of the node J1 and the node S; and connection information among these nodes of the road network data (FIG. 28(*a*)) of the upper-grade layer are copied to the road network data (FIG. 28(*c*)) of the cache layer.

Since information of traffic information is acquired by using sensors which are installed on roads, in an actual case, substantially same traffic information is provided within a objective road section every time. As a consequence, since the road network data of the cache layer which has been copied in the above-described manner is employed as the uppermost-grade layer, although the map matching process operation when the traffic information is received first time just after the system is initiated is slow, the second map matching process operation and the succeeding map matching process operations can be quickly carried out.

Eighth Embodiment Mode

In an eighth embodiment mode of the present invention, a description is made of a contribution of a transmission-sided device in order to execute a map matching operation in a high speed.

In the respective embodiment modes which have been so far described, while the road network data of the hierarchical layer structure is prepared on the reception side, the map matching operation is carried out by using this road network data. Alternatively, another mode may be realized in which a transmission-side device distributes road network data of a hierarchical layer structure to a reception-sided device.

Figure 30:
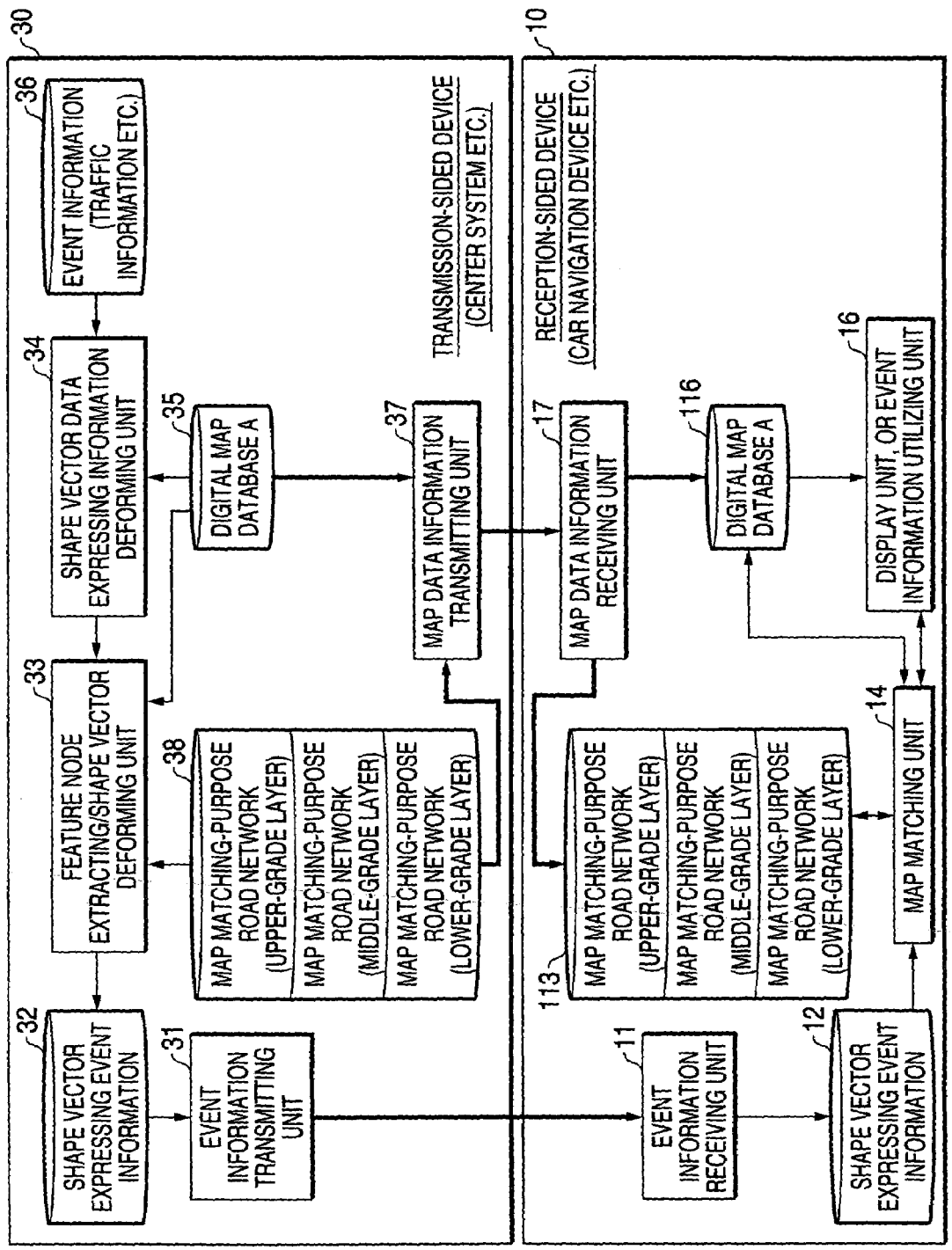
FIG. 30 is a block diagram for indicating a transmission-sided device for distributing road network data having a hierarchical structure according to an eighth embodiment mode of the present invention.

FIG. 30 indicates both an arrangement of this transmission-sided device 30 and an arrangement of this reception-sided device 10. The transmission-sided device 30 is equipped with a map data information transmitting unit 37. The map data information transmitting unit 37 distributes both road network data 38 of a hierarchical layer structure, and a digital map A which has been stored in a database 35 to the reception-sided device 10. Also, the reception-sided device 10 is equipped with a map data information receiving unit 17 which receives these map data information. The reception-sided device 10 executes a map matching operation and a utilization of event information by using both road network data 113 having a hierarchical layer structure and digital map data A 116, which are received from the transmission-sided device 30. Other arrangements are not changed from those of the first embodiment mode (FIG. 6).

This transmission-sided device 30 contains such an information in shape vector data which is transmitted through an event information transmitting unit 31 to the reception-sided device 10. This information is used to identify a hierarchical layer of road network data employed in a map matching operation.

FIG. 31(a) indicates shape vector data to which both a hierarchical layer number and road attribute information (road sort etc.) have been added as this hierarchical layer identifying information in the unit of a shape vector. FIG. 31(b) shows shape vector data to which both a hierarchical layer number and road attribute information (road sort etc.) have been added as this hierarchical layer identifying information in the unit of a node. Alternatively, only a hierarchical layer number may be merely indicated as the hierarchical layer identifying information. Also, when a road of each hierarchical layer of road network data is determined based upon a road attribute, only the road attribute may be merely indicated.

When the map matching unit 14 of the reception-sided device 10 executes a map matching operation of these shape vector data, the map matching unit 14 executes the map matching operation by using the road network data 113 of the hierarchical layer which is indicated in the hierarchical layer identifying information.

In this case, since the map matching unit 14 can execute the map matching operation by directly using the network data of the hierarchical layer into which the objective road expressed by the shape vector has been contained, completely no care should be taken with respect to a parallel-traveling road of another hierarchical layer, and thus, the map matching operation can be processed in a high speed.

Alternatively, it should be understood that "hierarchical layer information" and "road attribute information" may be entered to appending information of index header information.

Also, as explained in the first embodiment mode, even in such a case that a parallel-traveling resembling shaped road is present in a objective road, if a objective road section is selected in such a manner that this parallel-traveling resembling shaped road is parallel-traveled within a partial section, in most of the cases, a reception-sided device may reveal "there is no doubt as this objective road" in a shape checking operation (namely, curved point is checked, and comparing operation by shape representative values), and thus, need not again perform a matching operation in lower-grade layers. A description is made of such a transmission-sided device capable of selecting such a objective road section.

Figure 32:
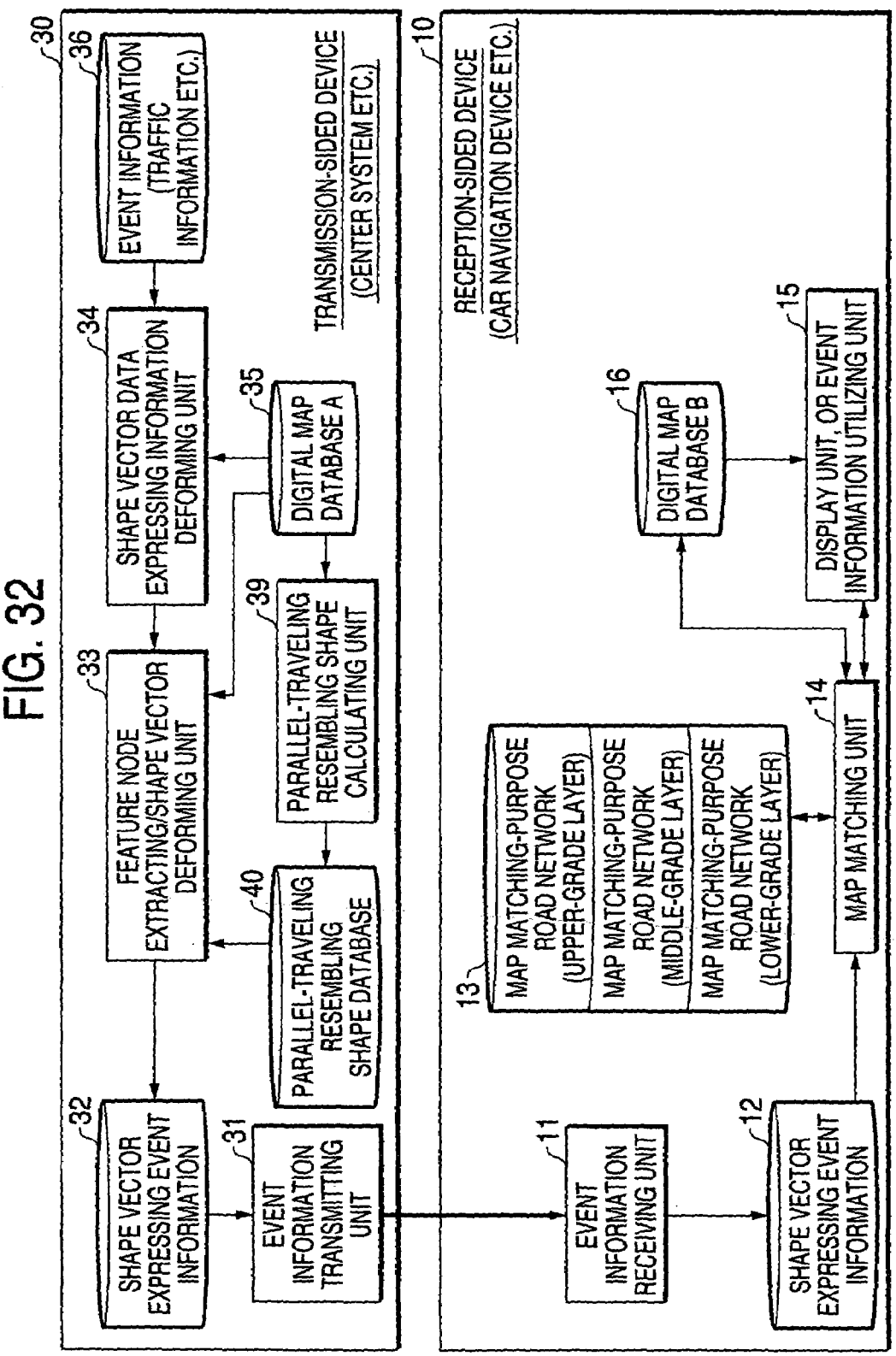
FIG. 32 is a block diagram for representing an arrangement of a transmission-sided device for adjusting a objective road section in accordance with the eighth embodiment mode of the present invention.

As shown in FIG. 32, this transmission-sided device is equipped with a parallel-traveling resembling shape calculating unit 39, and a parallel-traveling resembling shape database 40. The parallel-traveling resembling shape calculating unit 39 previously extracts a parallel-traveling shaped road by using the digital map data A which has been stored in the database 35. The parallel-traveling resembling shape database 40 stores thereinto the data of the parallel-traveling resembling shaped road which is extracted by the parallel-traveling resembling shape calculating unit 39. While a feature node extracting/shape vector deforming unit 33 employs the data of the parallel-traveling resembling shaped road stored in the parallel-traveling resembling shape database 40, this feature node extracting/shape vector deforming unit 33 deforms an object section of shape vector data produced in a shape vector data expressing information producing unit 34 in such a manner that the parallel-traveling resembling shaped road is parallel-traveled within a partial section. Other arrangements are not different from those of the first embodiment mode (FIG. 6).

Figure 33:
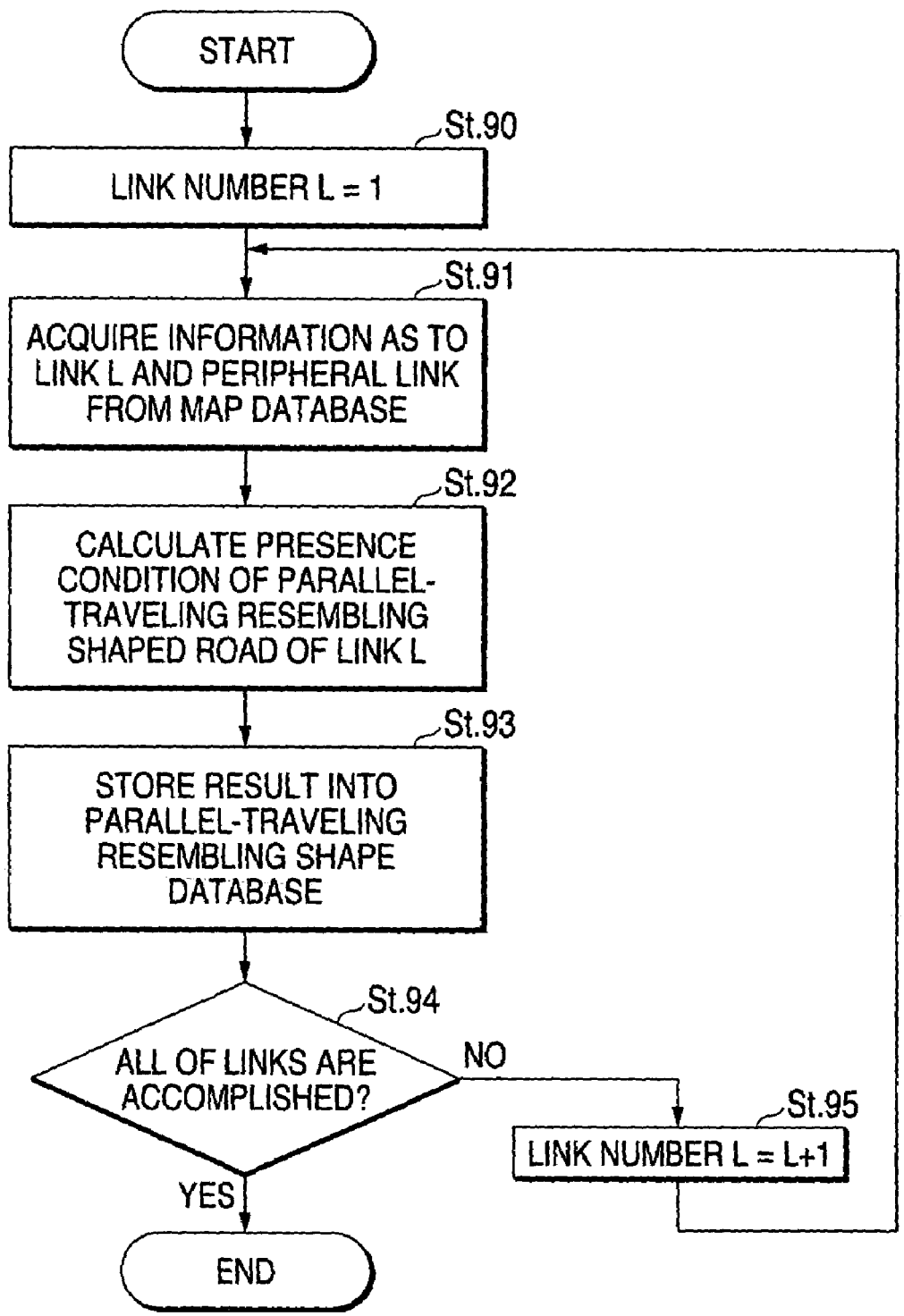
FIG. 33 is a flow chart for describing a sequential operation for extracting parallel-traveling resembling shapes, executed by the transmission-sided device in accordance with the eighth embodiment mode of the present invention.

A flow chart of FIG. 33 indicates a process sequential operation of the parallel-traveling resembling shape calculating unit 39.

While a link of a link number L=1 is employed as an object (step 90), information as to the link L and a peripheral link is acquired from the map database 35 (step 91), and a presence condition of a parallel-traveling resembling shaped road of the link L is calculated (step 92), and then, a calculation result is stored in the parallel-traveling resembling shape database 40 (step 93). Until the process operations as to all of links are accomplished (step 94), the link number is incremented (step 95), and the sequential operation defined from the step 91 is repeatedly carried out.

Figure 34:
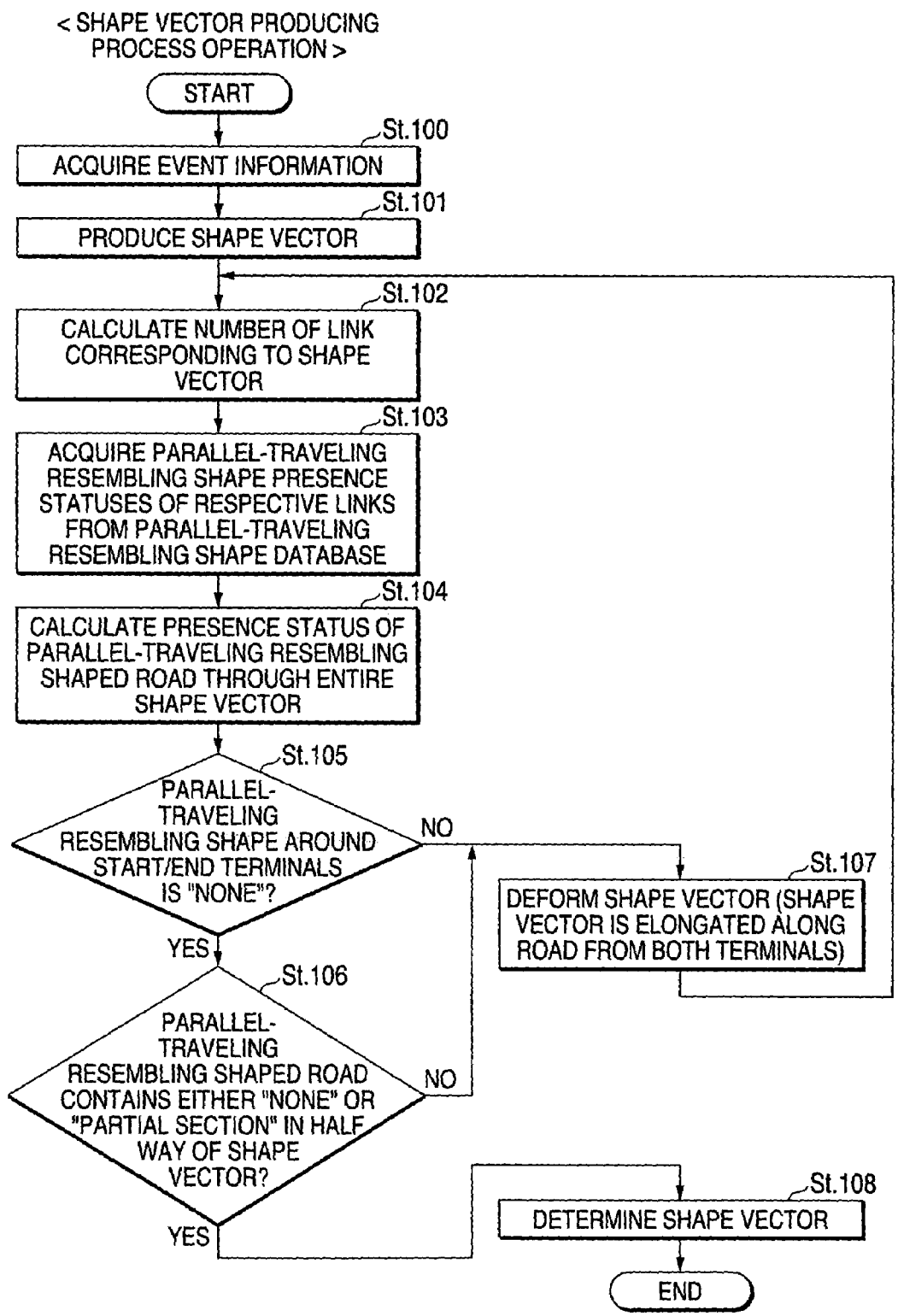
FIG. 34 is a flow chart for explaining a shape vector producing sequential operation of the transmission-sided device in accordance with the eighth embodiment mode of the present invention.
Figure 35:
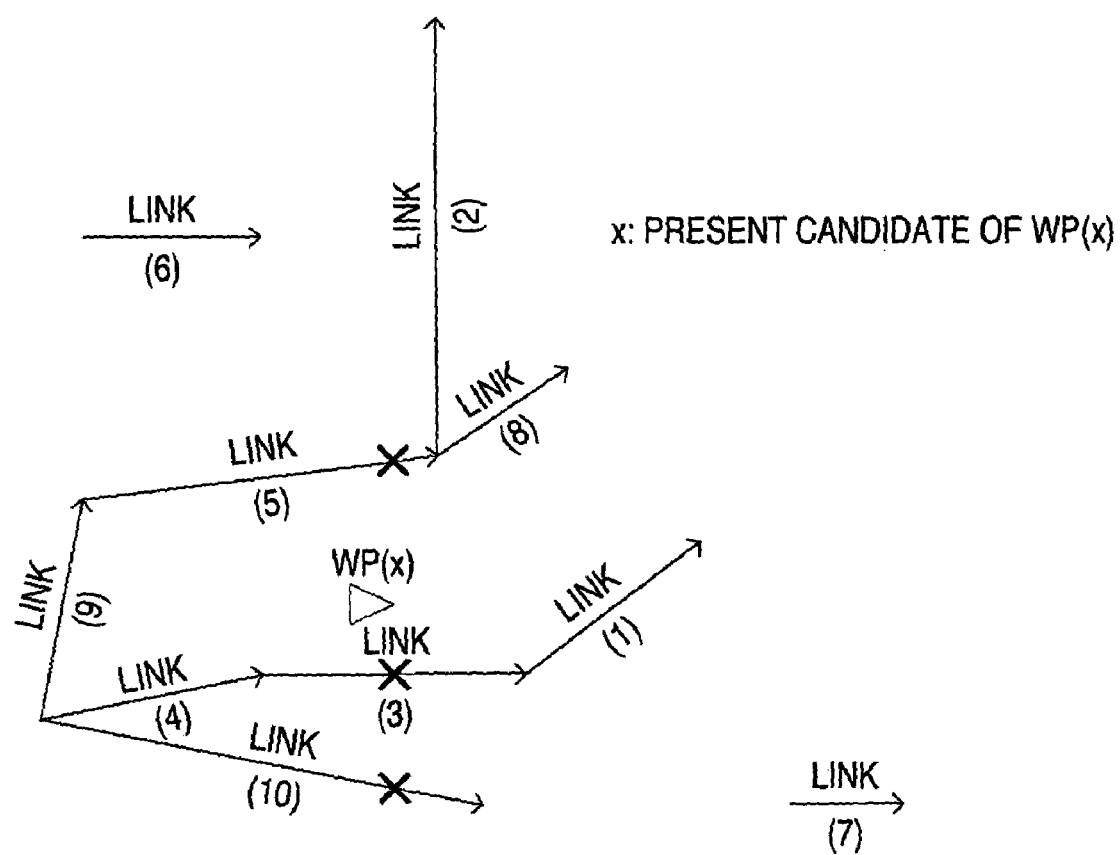
FIG. 35 is a diagram for indicating the process sequential operation of the conventional macro map matching operation.

Also, a flow chat of FIG. 34 indicates process sequential operations as to both the shape vector data expressing information producing unit 34 and the feature node extracting/shape vector deforming unit 33. The shape vector data expressing information producing unit 34 acquires event information 36 (step 100) and produces a shape vector (step 101).

The feature node extracting/shape vector deforming unit 33 calculates a link number corresponding to the shape vector (step 102), and acquires a presence condition of a parallel-traveling resembling shaped road of each of the links from the parallel-traveling resembling shape database 40 (step 103), and then, calculates presence conditions of the parallel-traveling resembling shaped roads through the overall shape vector (step 104).

The feature node extracting/shape vector deforming unit 33 discriminates as to whether or not a parallel-traveling resembling shaped road is present at peripheral areas of a stating terminal and an end terminal of the shape vector (step 105). When the parallel-traveling resembling shaped road is present, the feature node extracting/shape vector deforming unit 33 deforms the shape vector in such a manner that such a terminal of the shape vector at the present side is extended along a road (step 107), and repeatedly carries out the sequential operation defined from the step 102.

Also, in the case that the parallel-traveling resembling shaped road is not present (in case of "NO" in step 105), the feature node extracting/shape vector deforming unit 33 discriminates as to whether the parallel-traveling resembling shaped road is not present, is present in a partial section, or corresponds to any case in a half way of the shape vector (step 106). When the parallel-traveling resembling shaped road is not present, or is present in a partial section in a halfway of the shape vector, the feature node extracting/shape vector deforming unit 33 determines the shape vector under direct condition (step 108). When the parallel-traveling resembling shaped road corresponds to none of these cases (in case of NO in step 106), the feature node extracting/shape vector deforming unit 33 deforms the shape vector in such a manner that this shape vector is expanded from both terminals along the road (step 107), and then, repeatedly executes the sequential operation defined from the step 102.

Since such a sequential operation is carried out, even in such a case that the parallel-traveling resembling shaped road is present in the object section of the shaped vector data, the objective road can be deformed in such a manner that this parallel-traveling resembling shaped road is present only in a "partial section" of the objective road section. Also, in the map matching process operation, the objective road section can be set in such a manner that the parallel-traveling resembling shaped road is not present at the starting terminal and the end technical of the specifically important objective road.

Ninth Embodiment Mode

In a ninth embodiment mode, a description is made of a producing sequential operation of road network data having a hierarchical layer structure.

Figure 40:
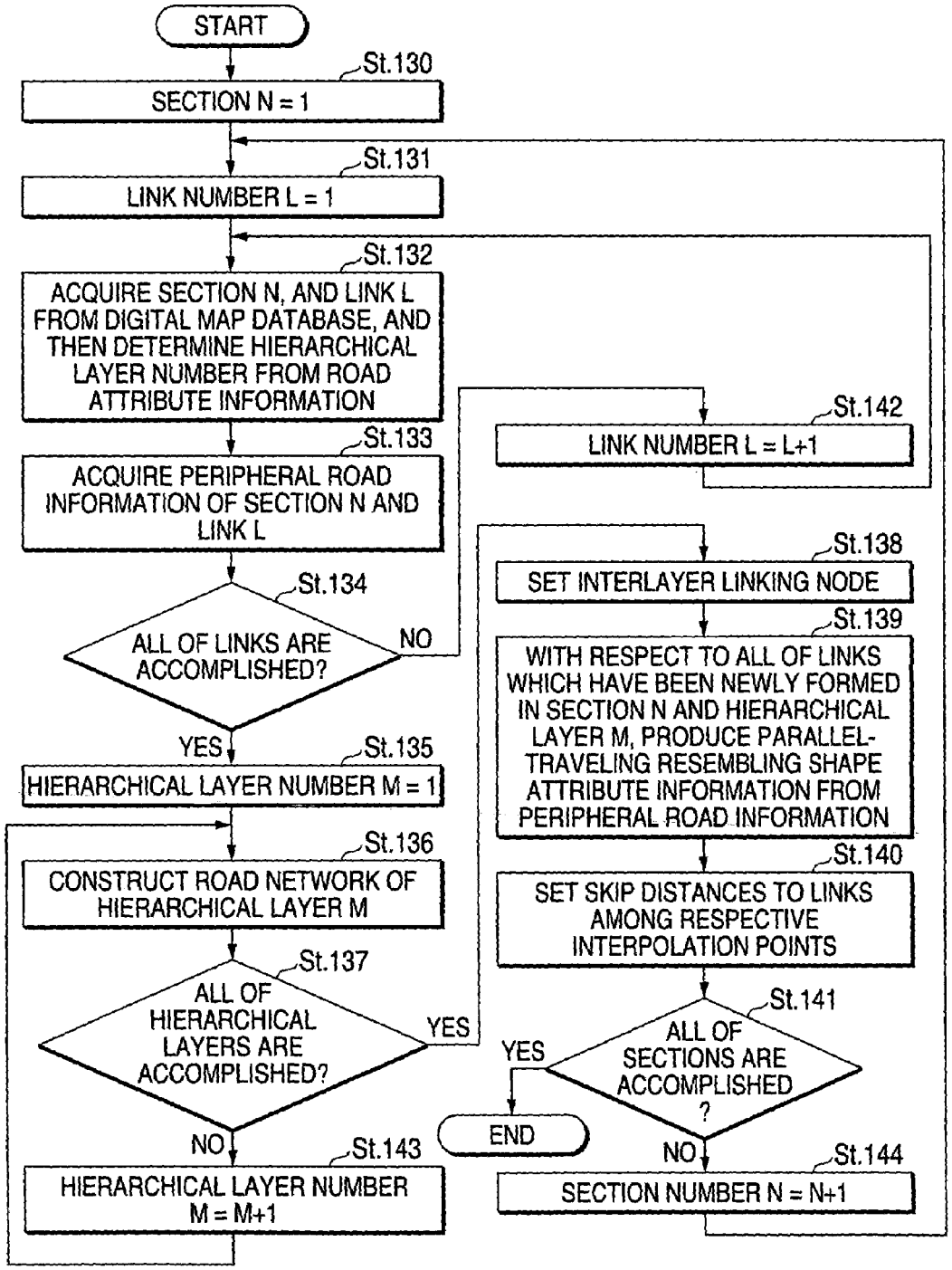
FIG. 40 is a flow chart for explaining a producing sequential operation of road network data having a hierarchical structure in accordance with a ninth embodiment mode of the present invention.
Figure 41:
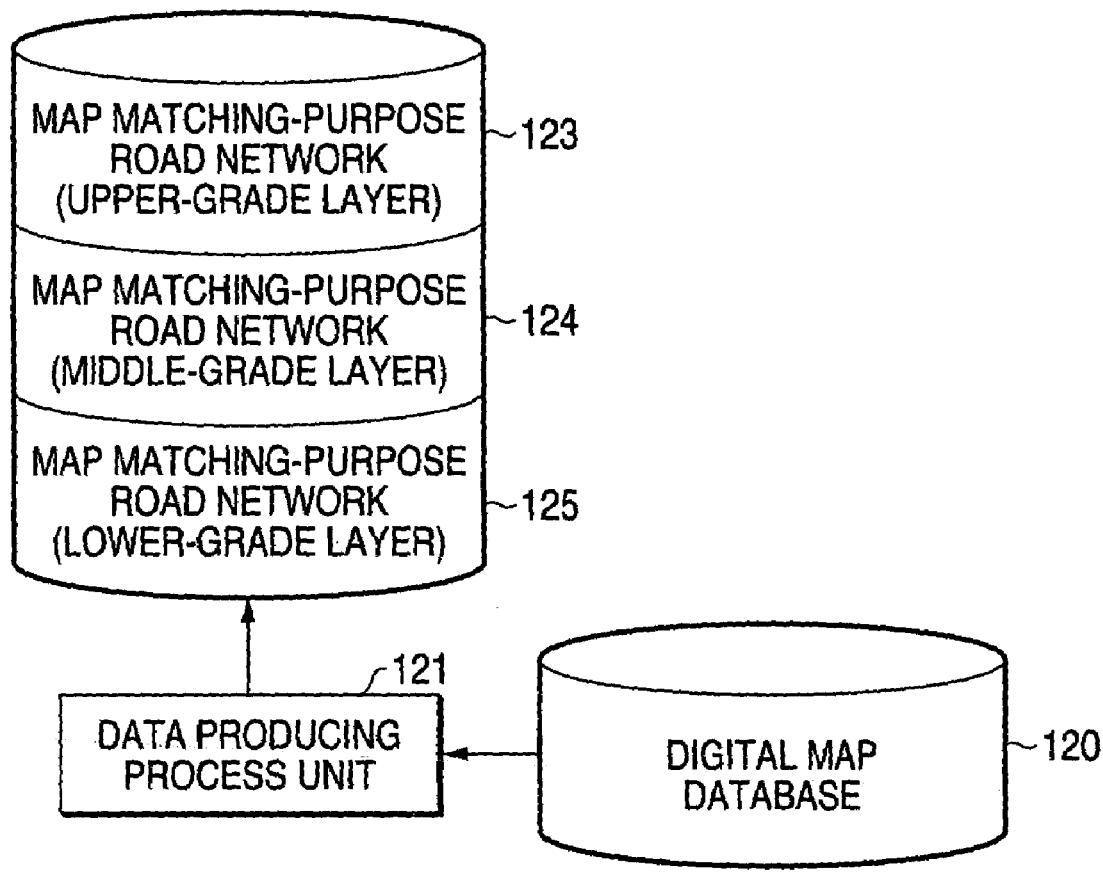
FIG. 41 is a diagram for indicating a producing mechanism of the road network data having the hierarchical structure in accordance with the ninth embodiment mode of the present invention.

As schematically shown in FIG. 41, as to this road network data, a data producing process unit 121 produces road network data 123, 124, 125 of the respective hierarchical layers from map data of a digital map database 120. FIG. 40 indicates this process sequence operation.

First, a section of interest as to digital map data is sequentially set from N=1 (step 130), and a link of interest within this section is sequentially set from a link number=1 (step 131). Data of the relevant link L of the relevant section N is acquired from the digital map database, and then, a hierarchical number of this link L is determined from road attribute information thereof (step 132). Also, peripheral road information of this link L is acquired (step 133). The above-explained process operation is carried out as to all of the links (step 134 and step 142). When the process operation with respect to all of these links is accomplished, the hierarchical layer number is set to M=1 (step 135), and then, a road network of a hierarchical layer M is constructed (step 136). This process operation is carried out as to all of the hierarchical layers (step 137 and step 143). When a construction of road networks having all of the hierarchical layers is accomplished, an interlayer linking node is set (step 138). Also, with respect to all of links which have been newly produced in the hierarchical layer M of the section N, parallel-traveling resembling shape attribute information is produced from the peripheral road information (step 139), and skip distances are set to links between the respective interpolation points (step 140). The above-explained process operation is carried out as to all of the sections (step 141 and step 144).

Since the above-explained process operation is carried out, such data shown in FIG. 3(*a*). FIG. 3(*b*), FIG. 3(*c*) are produced from the digital map data of FIG. 1. Also, in the case that the parallel-traveling resembling shape attribute information is produced, such a data of FIG. 10 is produced. In the case that the shape representative value is produced, such a data structure of FIG. 12 is obtained. Also, in the case that the skip distance is produced, such a data structure of FIG. 21 is obtained.

Tenth Embodiment Mode

In a tenth embodiment mode, a description is made of such a system that instead of employing a hierarchical layer structure, weights of an upper grade, a middle grade, and a lower grade are set with respect to one sheet of map data.

Figure 39:
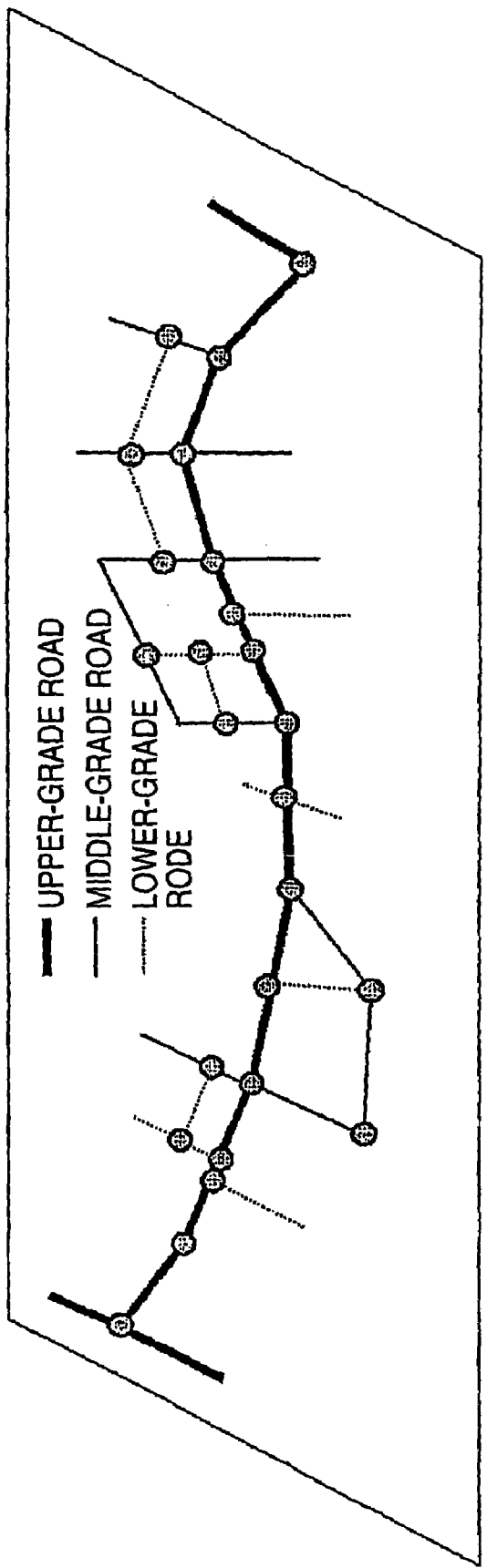
FIG. 39 is a diagram for indicating map data employed in the map matching operation in accordance with the tenth embodiment mode of the present invention.

As shown in FIG. 39, in this system, respective roads contained in one sheet of map data is subdivided into an upper-grade road, a middle-grade road, and a lower-grade road. In correspondence with a map matching operation in an upper-grade layer of a hierarchical layer structure, a map matching operation is carried out by using the upper-grade road. In correspondence with a map matching operation in a middle-grade layer of a hierarchical layer structure, a map matching operation is carried out by using the upper-grade road, and the middle-grade road. Also, in correspondence with a map matching operation in a lower-grade layer of a hierarchical layer structure, a map matching operation is carried out by using all of the upper-grade road, and the middle-grade road and the lower-grade road.

Figure 38:
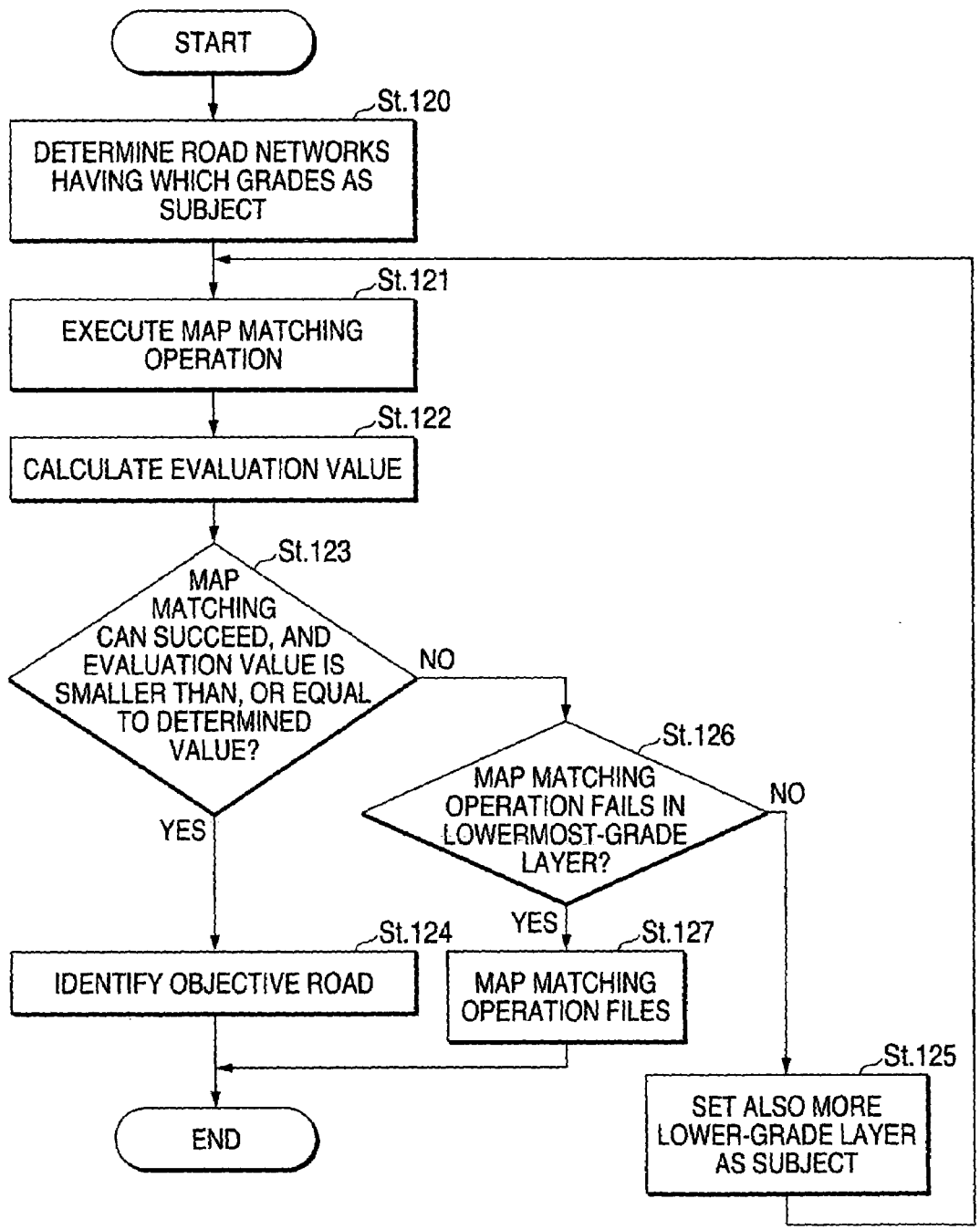
FIG. 38 is a flow chart for indicating a process sequential operation of a map matching operation in accordance with a tenth embodiment mode of the present invention.

FIG. 38 shows a flow chart for explaining this process operation.

A decision is made that which level of a road is used as a objective road in a map matching operation (step 120), and then, a map matching operation is carried out (step 121), and an evaluation value is calculated (step 122). A calculation of the evaluation value is identical to that of the case shown in FIG. 7.

A setting operation as to a candidate point can succeed, and further, a judgment is made as to whether or not an evaluation value of the candidate point is small than, or equal to a predetermined value (step 123). When the evaluation value of the candidate point is smaller than, or equal to the predetermined value, a objective road is identified based upon the selected shape pattern (step 124).

Also, in a step 13, when the setting operation of the candidate point cannot succeed, or the evaluation value of the candidate point exceeds the predetermined value, a check is made as to whether or not the used road corresponds to the lower-grade road (step 126). When the used road corresponds to the lowermost-grade road, it is so assumed that the map matching operation fails, and then, the process operation is ended (step 127). When the used road does not correspond to the lowermost-grade road, a rod which is lower than the presently used road is added to the objective road (step 125), and then, the process operation defined from the step 121 is repeatedly carried out.

As previously explained, while one sheet of the map is employed, the weights are given to the roads, and the road which is used in the map matching operation is selected, so that a total number of the candidate points when the candidate point searching operation is carried out can be reduced, and thus, the map matching operation can be carried out in a high speed.

Figure 42:
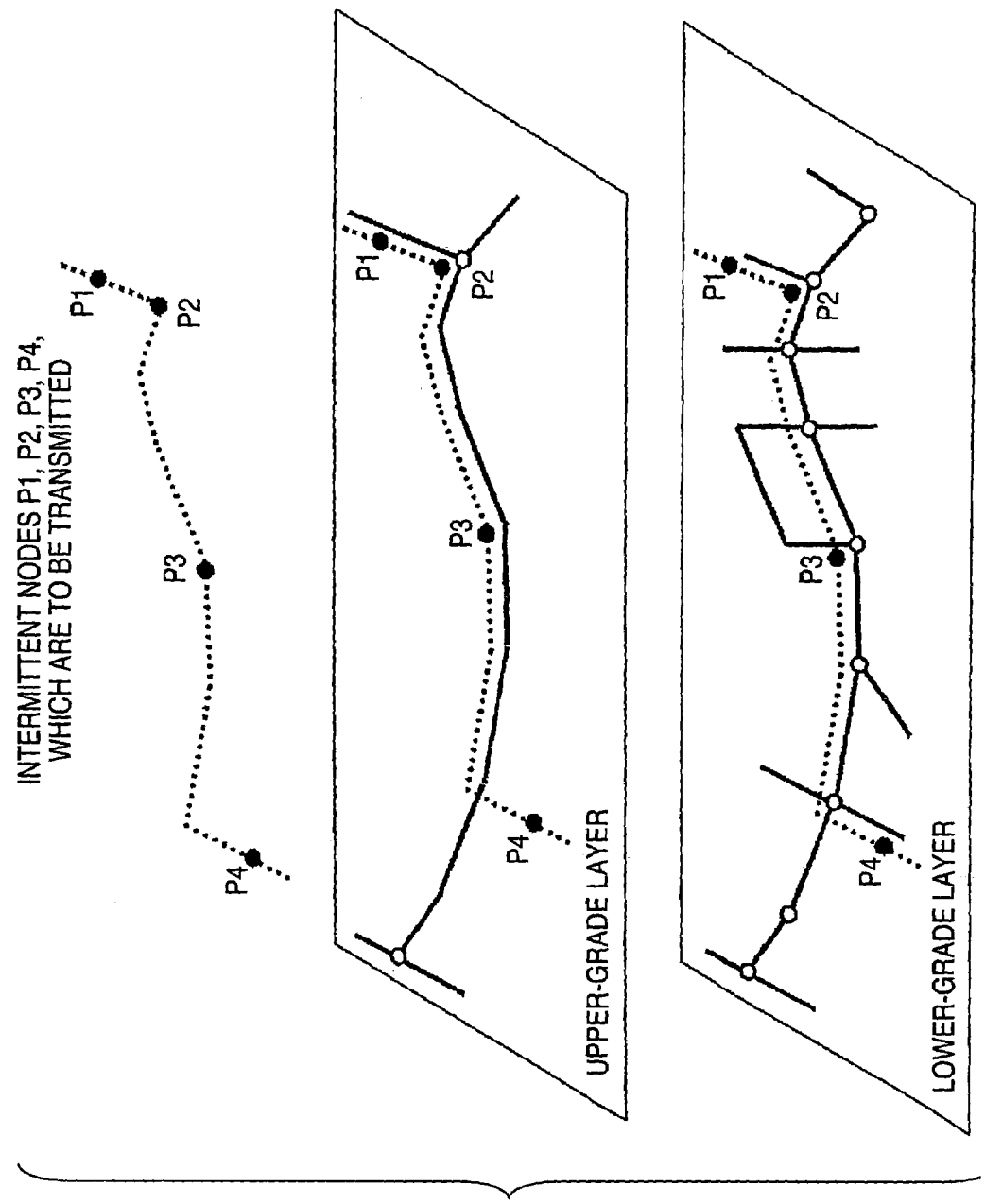
FIG. 42 is a diagram for representing such a condition that the hierarchical structure of the present invention is applied to the information exchanging system.

It should also be understood that the respective embodiment modes have so far described such methods that the map matching operations of the shape vectors are carried out so as to identify the roads. The hierarchical layer constructing idea may also be applied to an information exchanging system in which routes between nodes are calculated by way of a route calculation. In this information exchanging system, a node is intermittently selected in a half way of a link and/or an intersection, and then, a route between the nodes is obtained by way of the route calculation. FIG. 42 indicates a condition in such a case that the hierarchical layer constructing idea has been conducted to this system. A node P1 (=link center point), a node P2 (=intersection), a node P3 (=link center point), and a node P4 (=link center point) are selected in an intermittent manner. While referring to latitude/longitude data of these nodes, node positions in the upper-grade layer are detected. In this case, although detecting operations as to candidate points of the nodes P1, P2, P3 can succeed, a detecting operation as to a candidate point of the node P4 fails. As a result, P1 to P2 to P3 can identify a objective road section, but a route between P3 to P4 has not yet been identified.

As a consequence, the upper-grade layer is transferred to the lower-grade layer, candidate points of both the nodes P3 and P4 are detected, a route between the nodes P3 to P4 is calculated by way of the route searching operation, and then, all of the road sections among P1 to P2 to P3 to P4 are identified in combination with the identified points in the upper-grade layer.

As previously explained, the hierarchical layer constructing idea may be applied with respect to all of the position transfer methods for identifying the roads based upon the latitude/longitude information.

The present invention is featured as follows. That is, with respect to the road network having the unequal condition in the frequency, which corresponds to the objective road of the map matching operation, the priority order is basically set in response to the frequency; the road network which is map-matched with the above-described objective road is restricted based upon the priority order; and also, when the objective road which is matched with the shape vector of the objective road cannot be obtained, the restriction based upon the priority order is relaxed so as to broaden the range of the road network which is matched with the objective roads. As a result, the map matching operation can be carried out in the high speed.

Eleventh Embodiment Mode

Next, an embodiment mode of both a shape matching-purpose database and a shape matching device, according to the present invention, will now be explained in detail with reference to drawings.

It should be noted that in this embodiment mode, a node, a link, or an interpolation point of a node, which is directed to an auxiliary purpose, are used as information indicative of either a specific point or a specific road on a map. A node corresponds to such a point on a road, which has been set in correspondence with an intersection, an entrance and an exit of a tunnel, an entrance and an exit of a bridge, a boundary of an administrative section, and the like. An interpolation point corresponds to such a point used to reproduce a road shape between nodes. A link corresponds to a line section which connects a node to another node. The below-mentioned explanation is made by using a node and a link.

Figure 43:
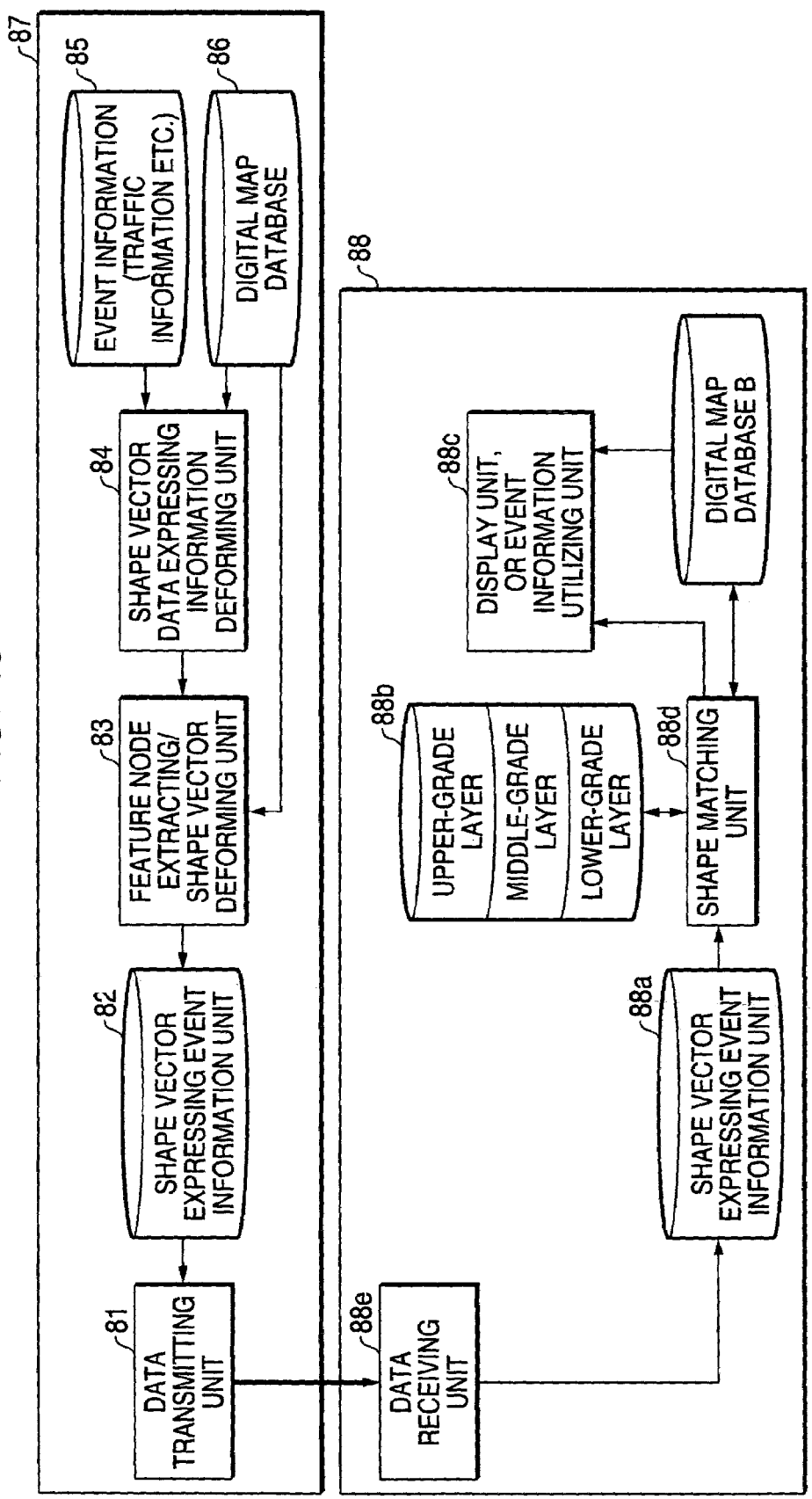
FIG. 43 is a diagram for indicating an arrangement of a system for transmitting/receiving event information based upon shape matching operation.

FIG. 43 indicates a road information providing system with employment of both the shape matching-purpose database and the shape matching device, according to this embodiment mode. In this drawing, event information such as a traffic accident, a road building, a traffic jam, raining, snowing, and a traffic control is stored in an event information database 85 in combination with a road to be identified, regional information, and the like. Also, such information indicative of roads, rivers, bridges, buildings, and the like has been stored in a map database 86 by way of "points" called as nodes and "line sections" called as links.

A data structures of the event information is shown in FIG. 44, a data structure of the link information is represented in FIG. 45, a data structure of the node information is denoted in FIG. 46, and a data structure of a shape vector is shown in FIG. 47. While both map data and shape matching (map matching)-purpose data are constructed by nodes and links, which have been stored in the map database 86 shown in FIG. 43, as shown in FIG. 47, the node is represented by either an absolute position or a relative position in a necessary point.

Figure 48:
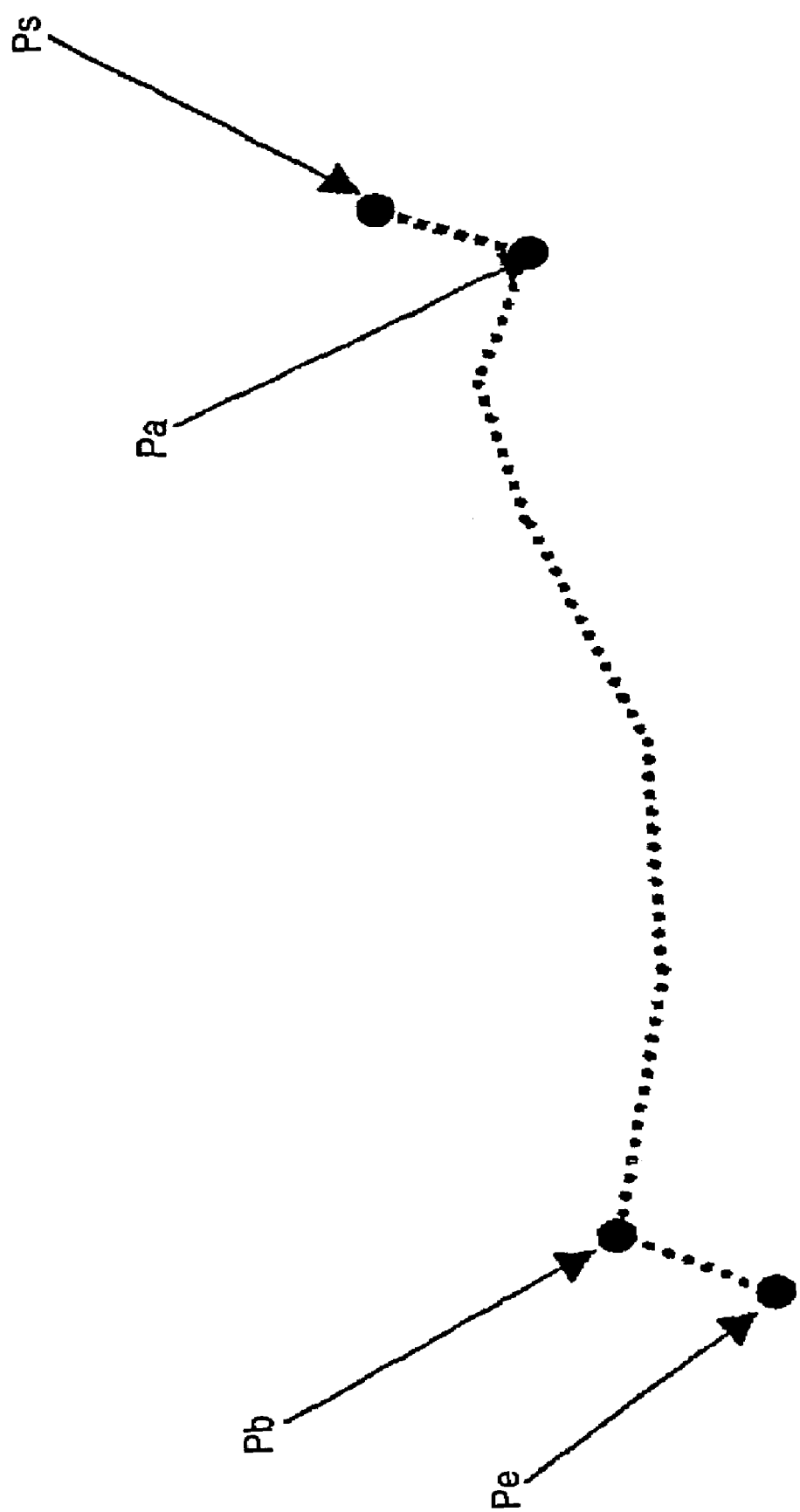
FIG. 48 is a diagram for showing a shape vector which is transmitted.

A shape vector data expressing information producing unit 84 owned by the road information providing system shown in FIG. 43 indicates an event occurring position denoted by the event information based upon such an absolute position as latitude and longitude, and a relative position from this absolute position, and produces a shape vector indicative of a objective road from the nodes and the links, which have been stored in the map database 86. In this embodiment mode, an example in which a shape vector of "Ps-Pa-Pb-Pe" shown in FIG. 48 is transmitted will now be described. It is so assumed that as to an expressing of a shape vector, a name of a point corresponding to a node is expressed from a starting point in a passing sequence.

In this case, in such a case that a shape vector to be transmitted has no feature and a map matching operation of the shape vector can be hardly carried out in a receiving device 88, a feature node extracting/shape vector deforming device 83 may alternatively add either a node or an interpolation point in such a manner of "Ps-Pa-Pm2-Pms2-Pm2-Pm3-Pm4-Pb-Pe", and thus may alternatively express this shape vector by a narrow link.

Figure 49:
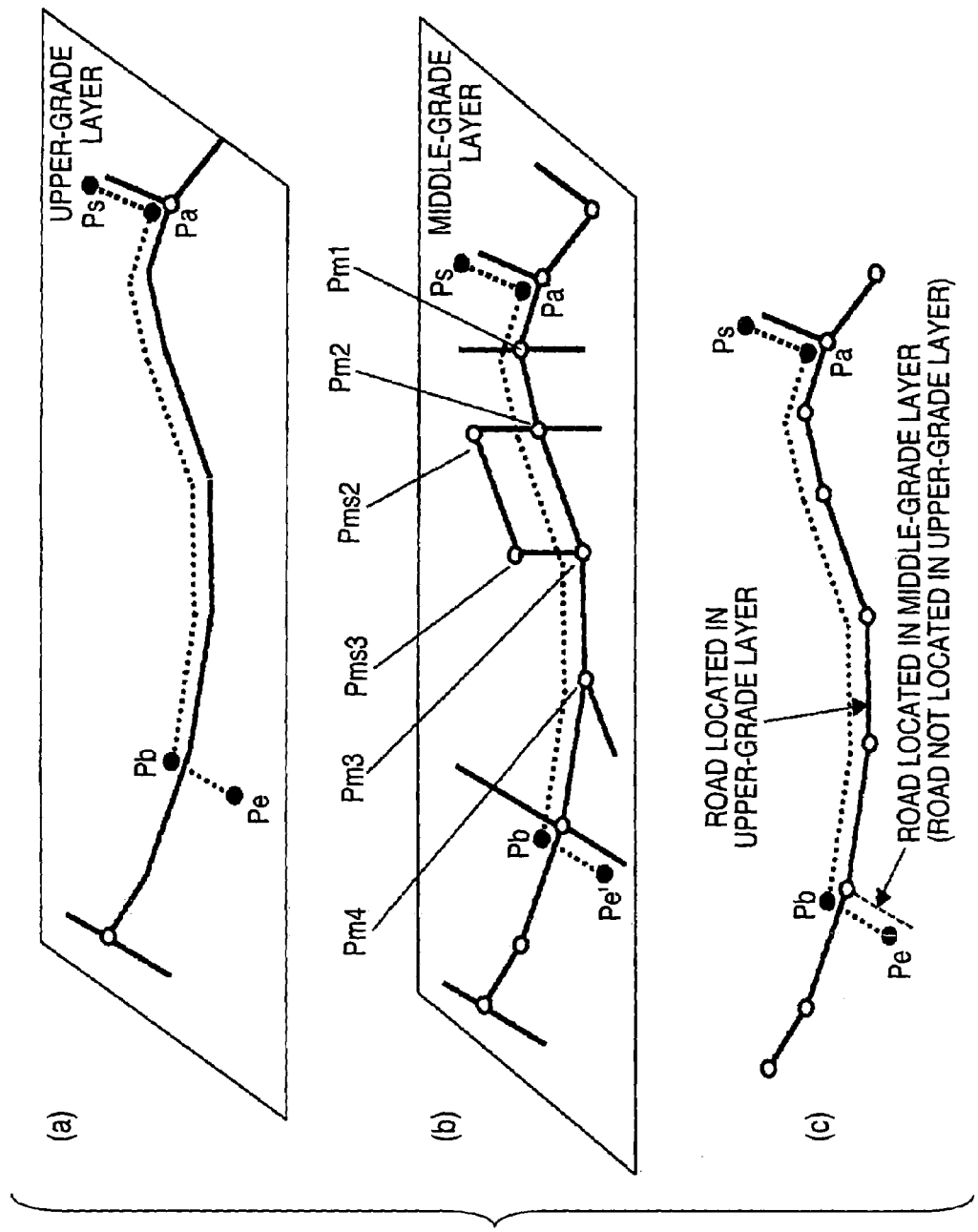
FIG. 49 is a conceptional view for representing a shape matching operation based upon a hierarchical layer.

FIG. 48 is an explanatory diagram for indicating a shape vector of "Ps-Pa-Pb-Pe" indicative of a road. FIG. 49 is an explanatory diagram for schematically indicating such a condition that the receiving device 88 which has received the shape vector of FIG. 48 performs a shape matching (map matching) operation.

Alternatively, in this embodiment mode, in addition to the information as to the coordinate streams of both the nodes and the interpolation points, detailed information such as road sorts, road numbers, toll road codes, or traffic intersection nodes, which have been previously present in a digital map database, or such a road sort as a speedway, a national road, and a major local road may be added to a node. Further, as the additional information, among others, in the case of an intersection node, a name of the intersection may be alternatively added. In such a case that a node indicates an entrance and an exit of a tunnel, an entrance and an exit of a bridge, a boundary of an administrative section, all of the above-explained information may be alternatively added. Moreover, as the additional information, in order to inform precision of transfer information, such an information representative of a precision level of a base map may be alternatively added, for instance, data acquired from map data drawn in a reduced scale of 1/25000, or data acquired from map data dream in a reduced scale of 1/10000.

In this case, in the receiving device 88 shown in FIG. 48 which has received data containing a shape vector, the data is restored by a data receiving unit 88e, and the shape vector is reproduced by a shape vector expressing event information unit 88b so as to separate the information which has been added to this shape vector. Next, a shape matching unit 88d identifies a position on the map, which is indicated by the shape vector, by using the shape matching-purpose database 88b used to identify an occurring place of an event.

The shape matching-purpose database 88b of this embodiment mode stores thereinto the data in such a manner that the data is subdivided into a three-layer construction (namely, upper-grade layer, middle-grade layer, and lower-grade layer). Nodes and links have been stored in the upper-grade layer, which represent national roads, major local roads, roads where optical beacon device have been installed, and other major roads. The optical beacon device correspond to road information receiving device which have been installed under main control of police office. Nodes and links have been stored in the middle-grade layer, which indicate roads such as prefecture roads and city/town/village roads, which are represented in a map drawn in a reduced scale of 1/100,000. Also, nodes and links, which show roads indicated in a map drawn in a reduced scale of 1/5,000, have been stored in the lower-grade layer.

In this embodiment mode, the shape matching unit 88d of the receiving device 88 sequentially performs a shape matching operation from the upper-grade layer with respect to the shape vector. When the shapes are made coincident with each other, the shape matching unit 88d accomplishes the matching operation, and then, judges such a road included in an object of the shape vector.

Figure 50:
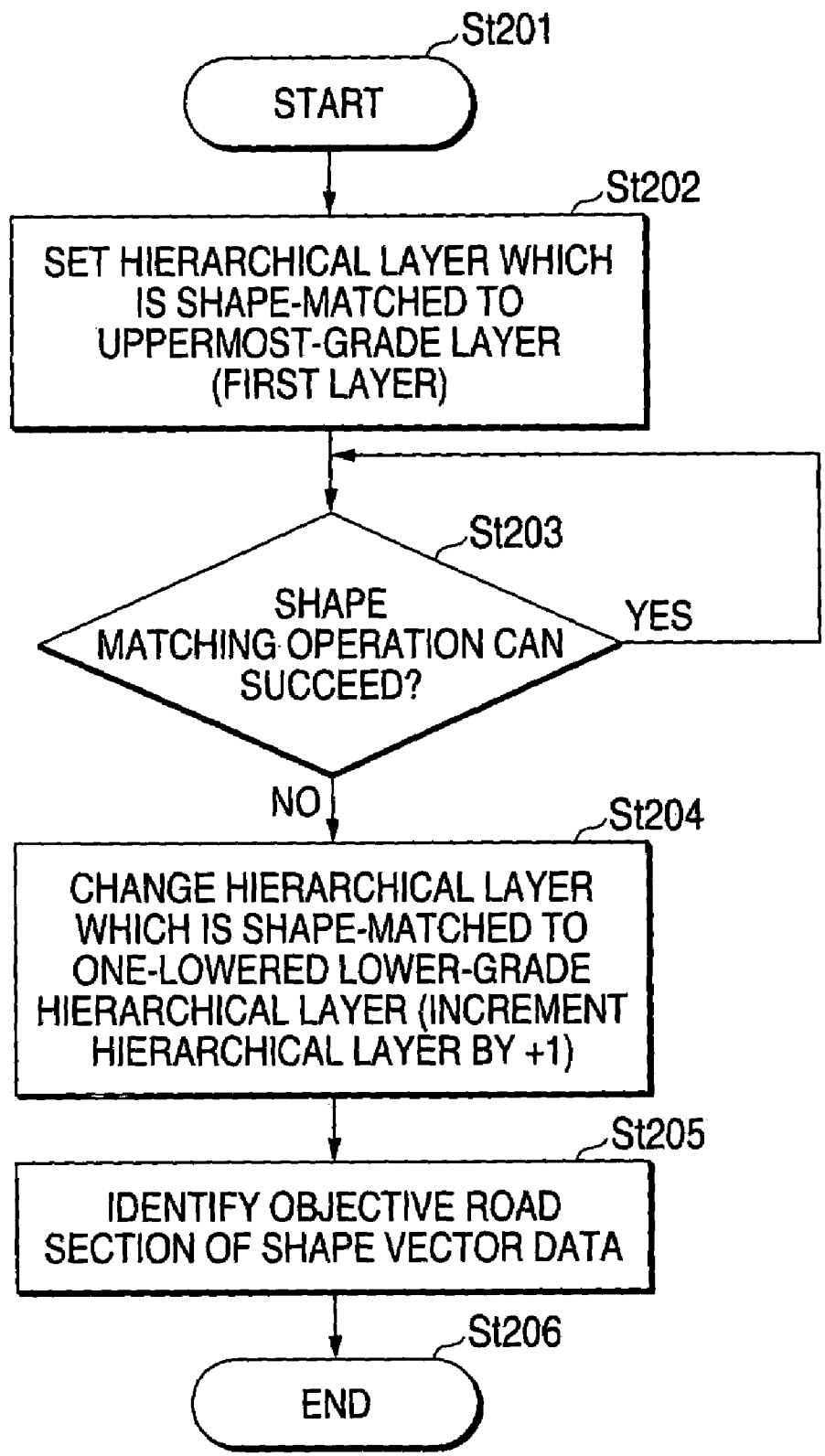
FIG. 50 is a diagram for showing a process flow operation for explaining the shape matching operation based upon the hierarchical layer.

FIG. 50 shows a flow chart for explaining this shape matching method according to this embodiment mode. As indicated in this drawing, in the case that the shape matching operation cannot succeed in the upper-grade layer (in example shown in FIG. 49, road between Pb to Pe is not present in upper-grade layer (a) as represented in FIG. 49(c)), the shape matching operation of the upper-grade layer is transferred to the middle-grade layer (b), in which a shape map operation is again carried out from a first point Ps. FIG. 49 is such an example that all of the shape matching operations have been completed in the middle-grade layer. In the case that the map matching operations are not accomplished even in the middle-grade layer, the shape matching operation is transferred to the lower-grade layer indicative of a more detailed road, and then, a shape matching operation is carried out.

Twelfth Embodiment Mode

Figure 51:
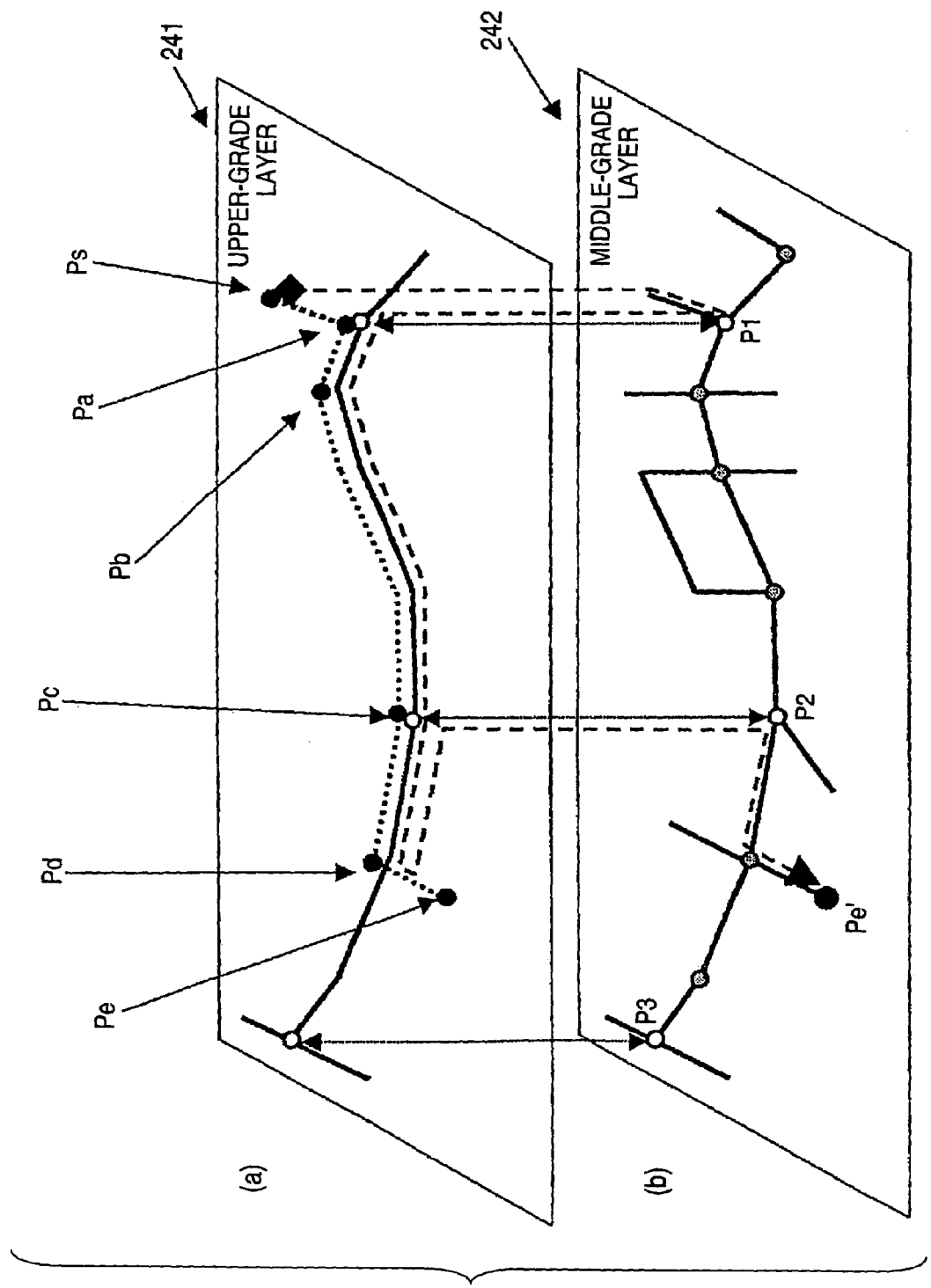
FIG. 51 is a conceptional view for indicating a shape matching operation based upon the hierarchical layer in the case that a hierarchy common node is employed.

Next, FIG. 51 indicates a shape matching operation executed in the case that a node commonly used in the respective layers has been set. As shown in this drawing, symbols "Pa" and "Pc" of an upper-grade layer are nodes which correspond to symbols "P1" and "P2" of a lower-grade layer respectively. Since such a shape matching-purpose database owns the same hardware structure as that of the transmitting device 87 and the receiving device 88 mounted on the navigation machine of the center system shown in FIG. 43, this shape matching-purpose database will now be explained in combination with FIG. 43. Also, in this case, a process operation itself is executed in accordance with the flow chart indicated in FIG. 50 in the respective portions.

Figure 52:
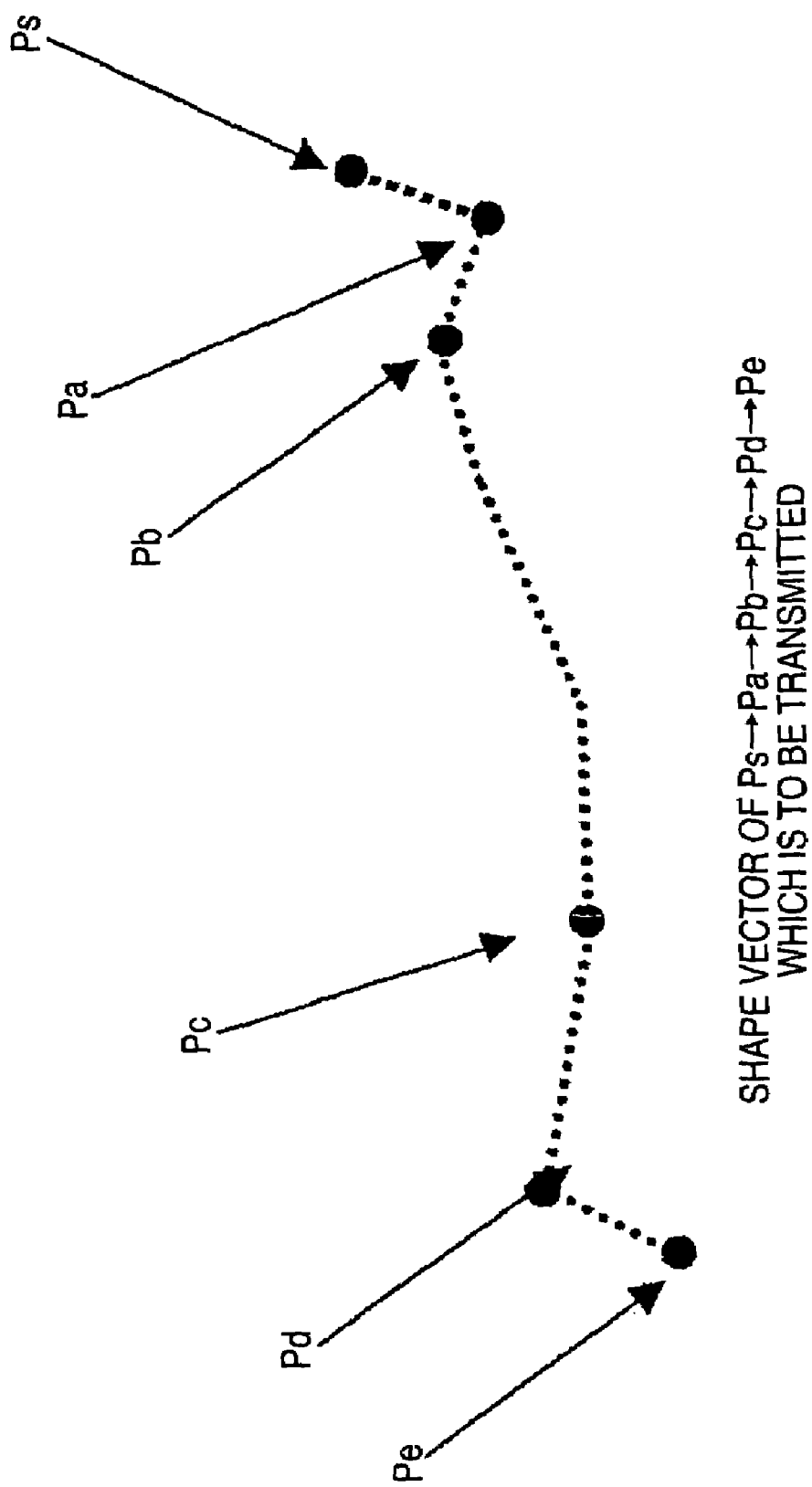
FIG. 52 is a diagram for indicating a shape vector which is transmitted in the case that the hierarchical layer common node is employed.
Figure 53:
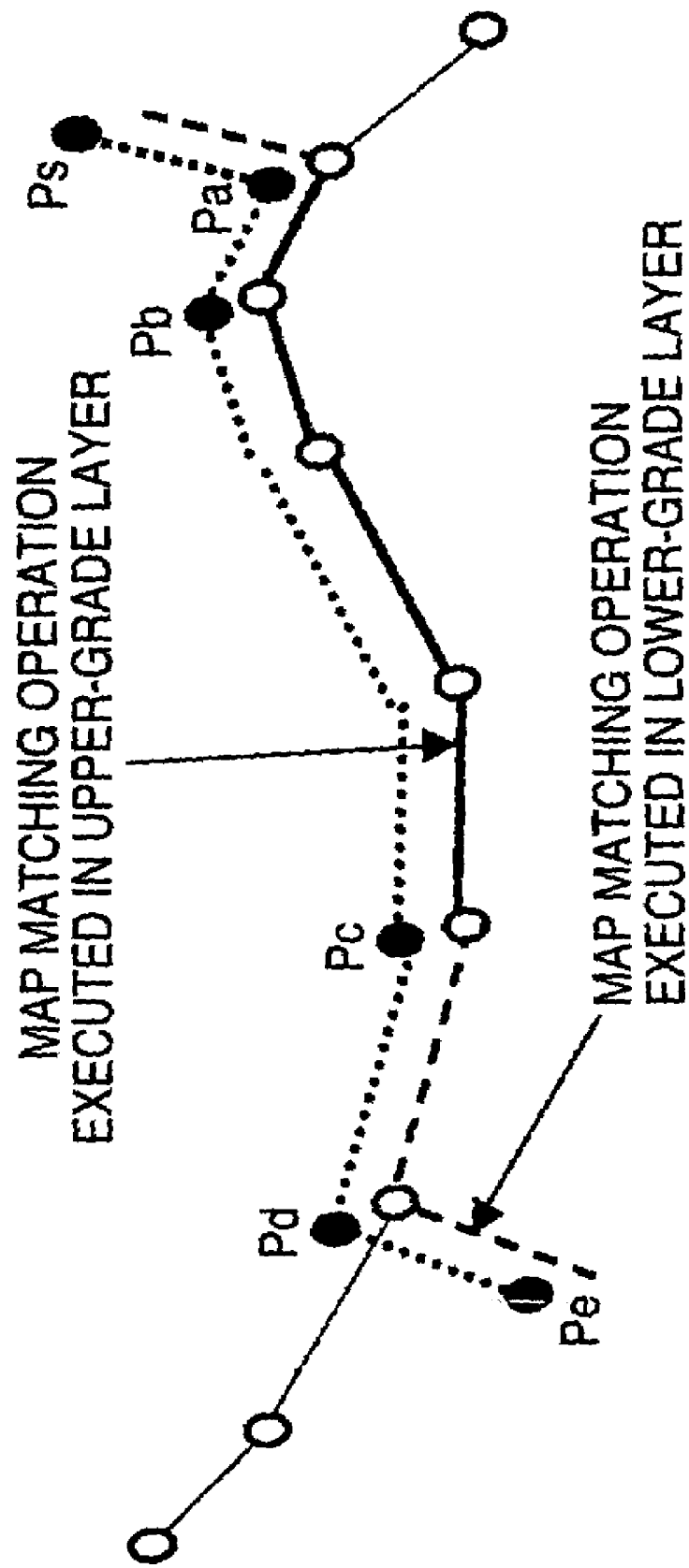
FIG. 53 is a diagram for representing a shape vector which is transmitted in the case that a link having a hierarchical layer identifier is employed.

In the case that such a shape vector shown in FIG. 52 is transmitted from the transmitting device 87, a route from Ps to Pd is present in the upper-grade layer, but a portion corresponding to a route "Pd-Pe" is not present in the upper-grade layer. As a result, the shape matching unit 88d of the receiving device 88 is transferred to the middle-grade layer of the shape matching-purpose data 88b and performs a shape matching operation. In this case, since the node Pd (upper-grade layer) and the node P2 (middle-grade layer) which are commonly defined with respect to two layers, namely the upper-grade layer and the middle-grade layer in a route defined from the nods Ps to the node Pd, a indicated in FIG. 53, the matching result obtained in the upper-grade layer is employed in the route between Ps and Pc, and the matching result obtained in the middle-grade layer is employed in the route between P2 corresponding to Pc and Pe', so that the shape matching unit 88d accomplishes the shape matching operation from the node Ps up to the node Pe.

In this shape matching method, since a common node is similarly set between the middle-grade layer and the lower-grade layer, shape matching results of the respective layers are connected to each other by the common node, so that the shape matching results can be more effectively utilized.

Figure 54:
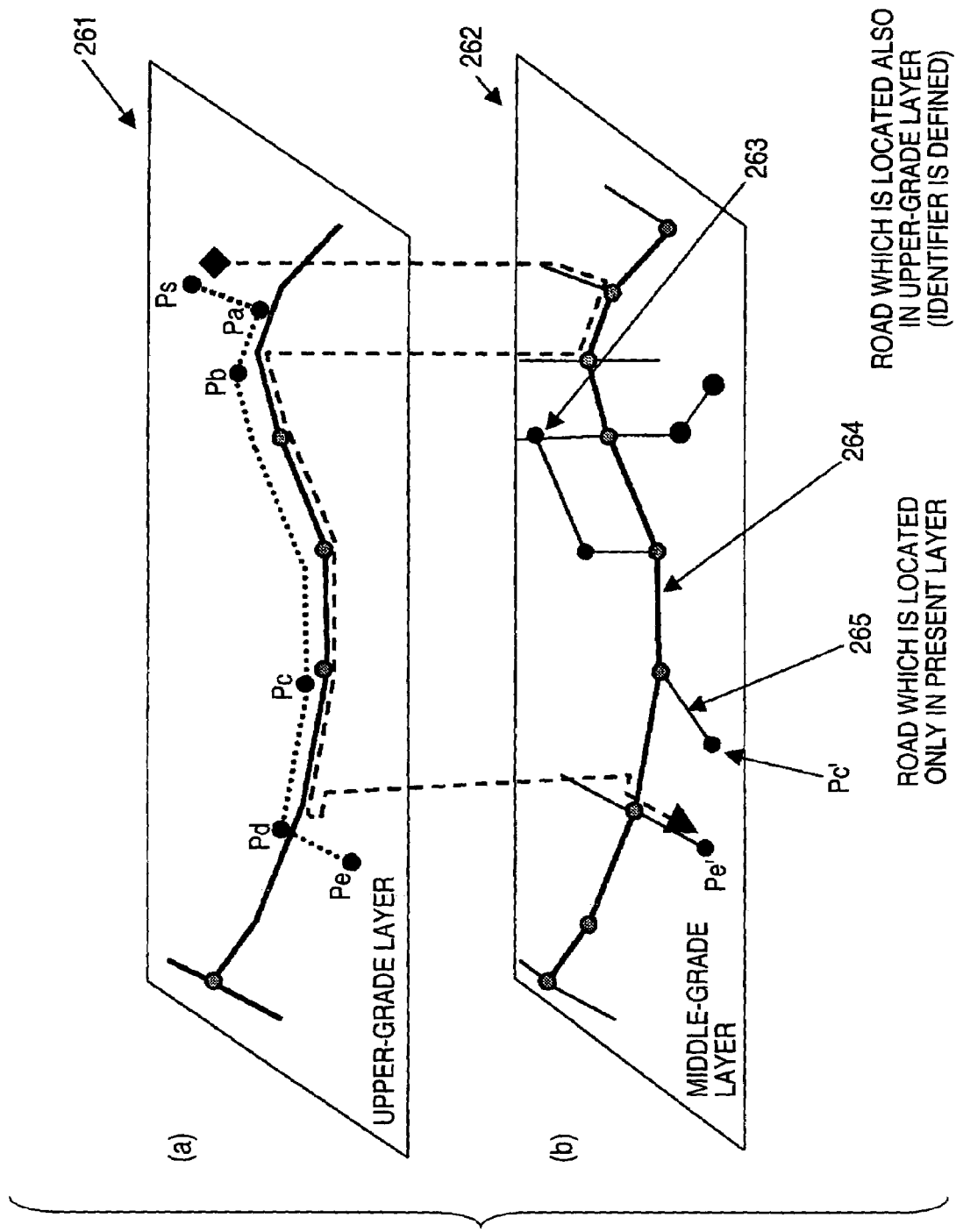
FIG. 54 is a conceptional diagram for representing a shape matching operation based upon a hierarchical layer in the case that the link having the hierarchical layer identifier is employed.
Figure 55:
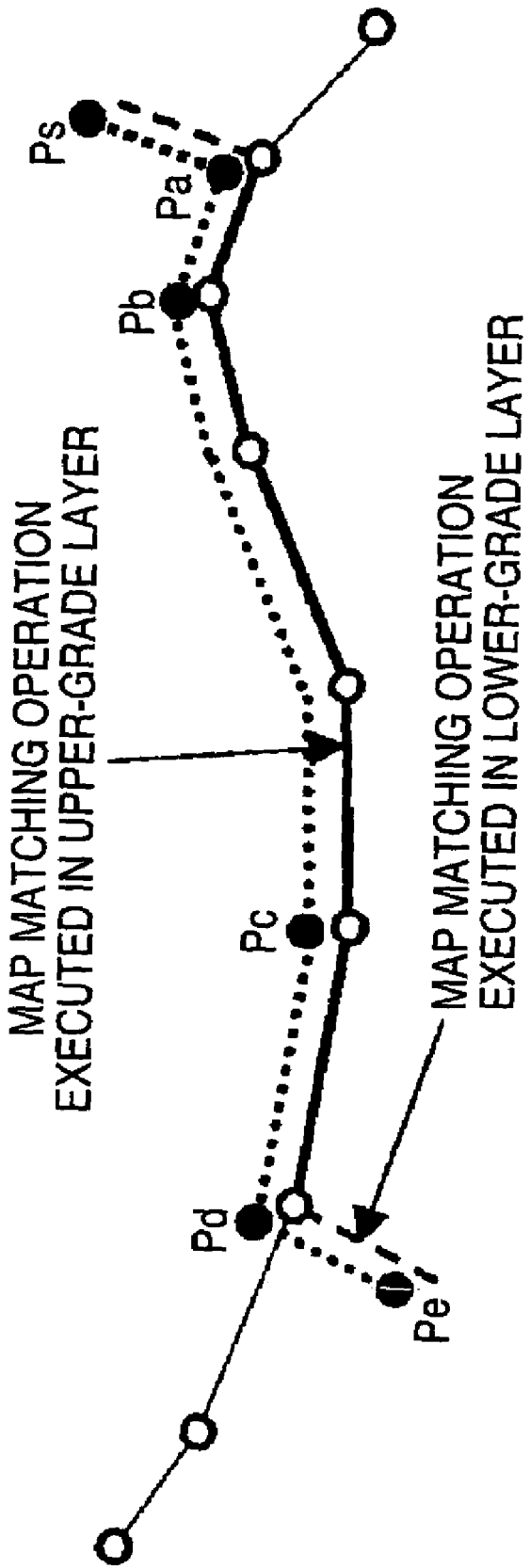
FIG. 55 is a diagram for indicating a matching operation result obtained in the case that the link having the hierarchical layer identifier is employed.

FIG. 54 shows a condition of a shape matching operation in the case that an identifier is owned, while this identifier indicates that a road is linked to which hierarchical layer by a common node. In FIG. 54, reference numerals 263, 264, 265 indicate links. In particular, reference numeral 264 shows such a link that a definition of an identifier is made in a road which is also located in the upper-grade layer. On other hand, both the reference numerals 263 and 265 correspond to roads which are located only in the lower-grade layer, and the roads 263 and 264 are parallel-traveled in a partial section. Also, a result of the shape matching operation shown in FIG. 54 is indicated in FIG. 55. Also, in this case, a structure of hardware is equal to that shown in FIG. 43.

Figure 56:
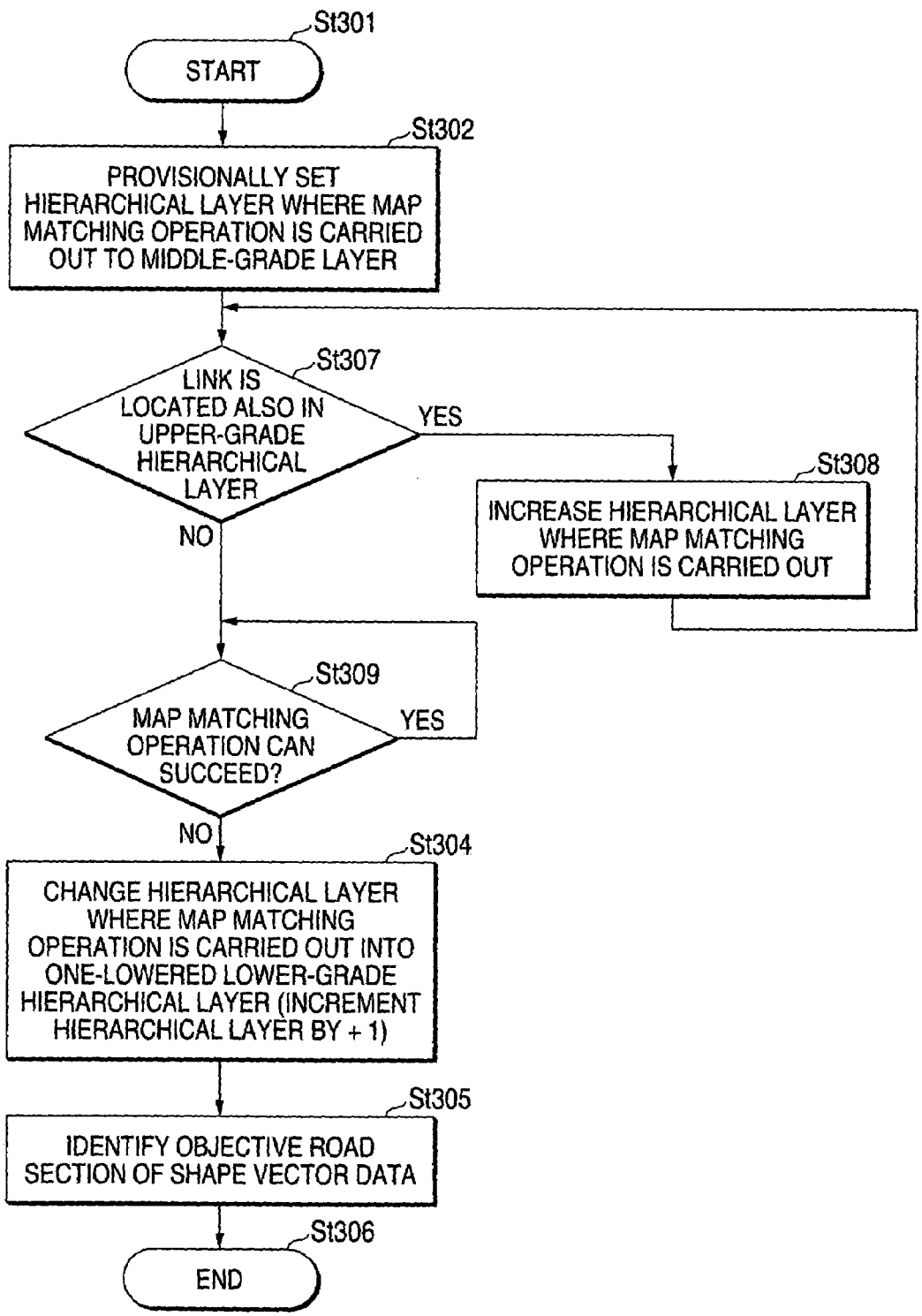
FIG. 56 is a diagram for showing a process flow operation for describing a shape matching operation based upon a hierarchical layer in the case that a node owns hierarchical layer information.
Figure 57:
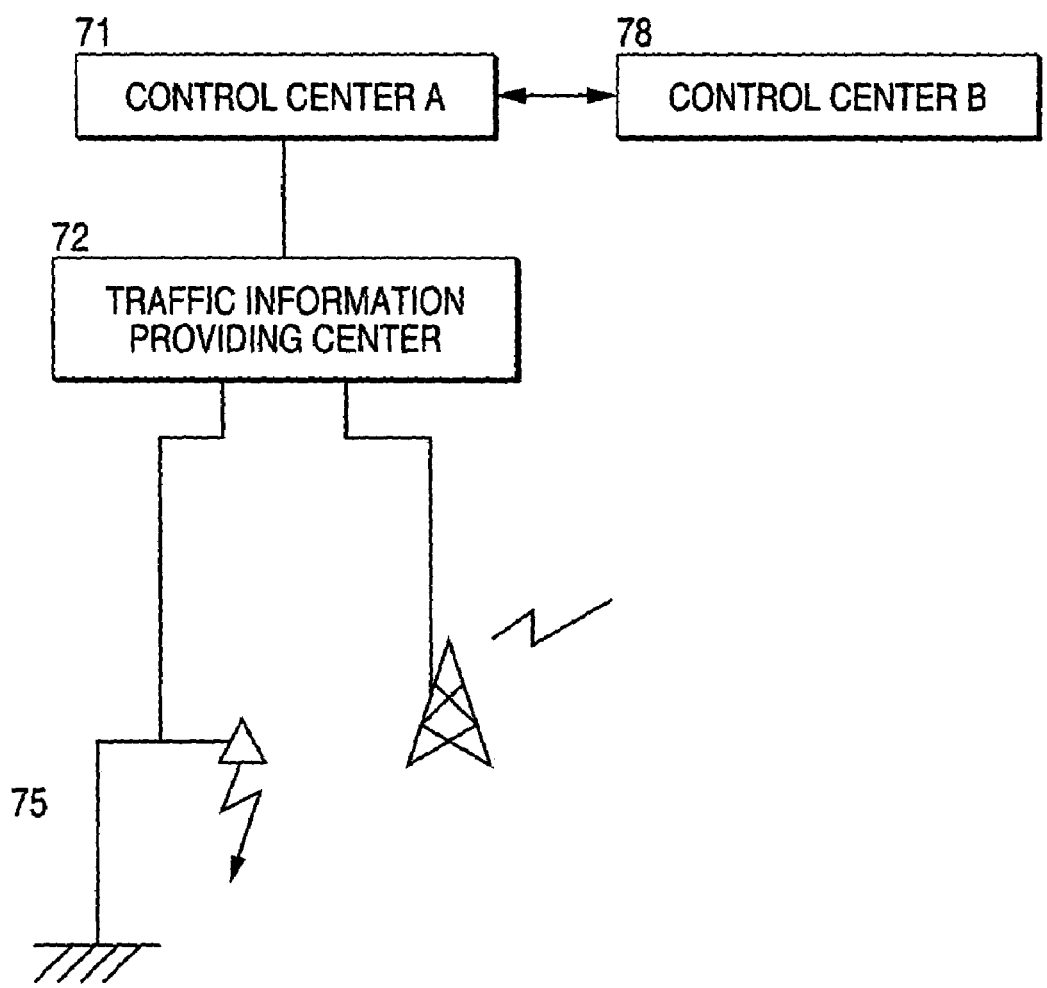
FIG. 57 is a diagram for indicating the traffic information providing center in the prior art.
Figure 58:
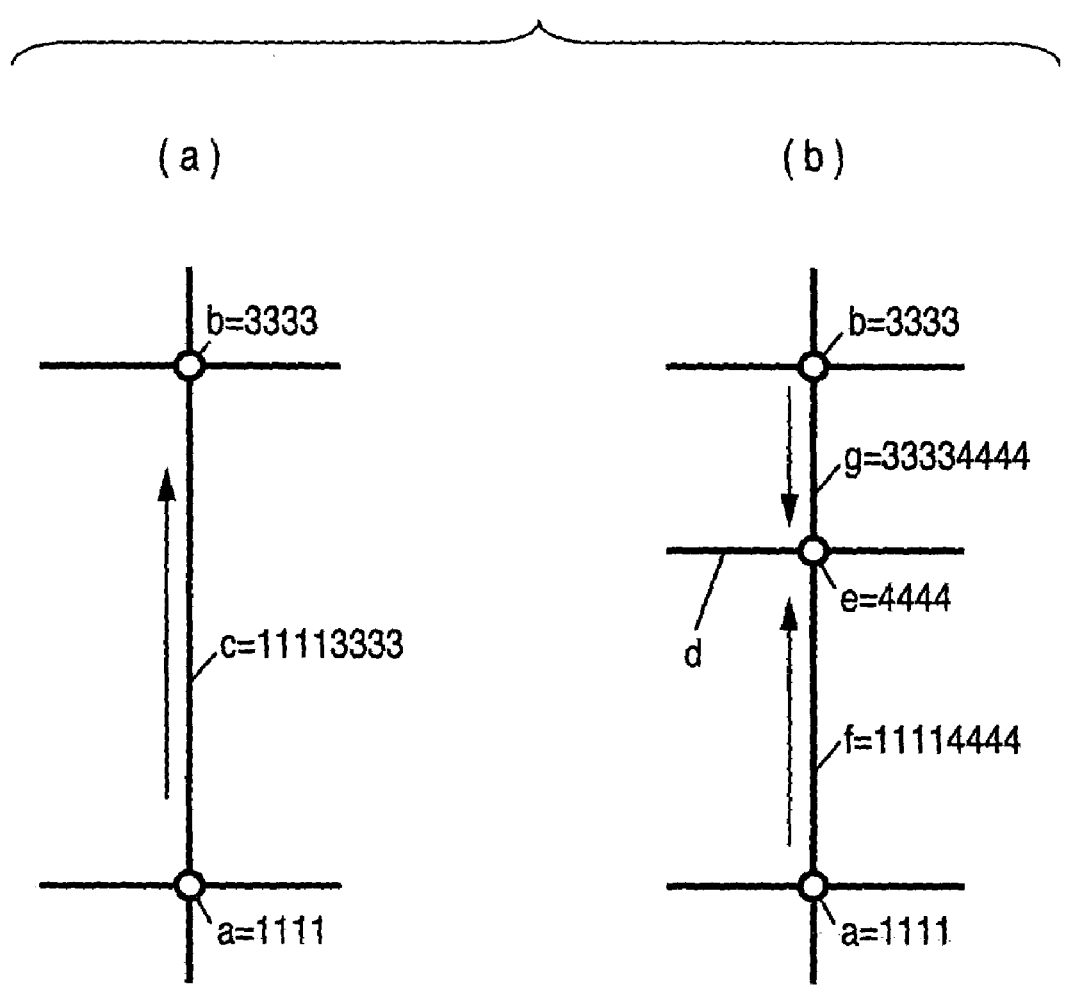
FIG. 58 is a diagram for showing the conventional idea used to identify the nodes and the links.

FIG. 45 indicates a data structure of link information stored in the shape matching database 88b. Also, FIG. 56 indicates a flow chart for describing the shape matching system in the 12th embodiment mode. A first feature of this shape matching system is given as follows: That is, since hierarchical layer belonging information is present in a link, if a shape matching operation is carried out in accordance with this information, then the shape matching operation can be carried out in a high speed.

While the present invention has been described in detail, or with reference to the specific embodiment modes, it is obvious for those skilled in the art that the present invention may be changed and modified without departing from the technical scope and spirit of the present invention.

The present patent application has been made based upon both Japanese Patent Application (No. 2002-096893) filed on Mar. 29, 2002, and Japanese Patent Application (No. 2002-288149) filed on Sep. 30, 2002, the contents of which are incorporated herein as references.

INDUSTRIAL APPLICABILITY

As apparent from the foregoing descriptions, in accordance with the map matching method of the present invention, the road which should be processed can be quickly and correctly identified.

In particular, the great effect can be achieved in such a case that unequal conditions appear in the roads included in the objective roads within the road network, for instance, the travel locus transmitted from the objective road of the traffic information, and the probe (traveling vehicle) of the probe acquisition system.

Also, both the device and the computer program of the present invention can realize the highspeed and corrects map matching operation, and can support the highspeed and correct map matching operation.

Furthermore, in accordance with the present invention, even when the objective roads for providing the traffic information are increased, since the received information is used to execute the shape matching operation, the road can be identified and the traffic information can be displayed without requiring excessive processing capability for the car navigation device. As a result, while the excessive work load of the maintenance for the road data is not given, the positional information on the digital map can be transferred. Also, the information related to the road such as the traffic information can be quickly displayed, or can be immediately provided.

The invention claimed is:

1. A method of identifying an objective road, indicated by location information transmitted from a transmitting side, on a digital map on a receiving side, the method comprising the steps of:
  receiving the location information indicative of shape of the objective road from the transmitting side; and
  identifying the objective road on the digital map by executing shape matching the location information with road network data which are included in the digital map and hierarchized to multi layers such that most upper-grade hierarchical layer represents most important road network,
  wherein the receiving side starts executing the shape matching using the road network of the most upper-grade hierarchical layer.

2. The method according to claim 1, wherein when the receiving side cannot identify the objective road on the digital map by executing shape matching using the road network of the most upper-grade hierarchical layer, the receiving side executes the shape matching using road network of one-lowered-grade hierarchical layer.

3. A receiving device comprising:
  a digital map which includes road network data which are hierarchized to multi layers such that most upper-grade hierarchical layer represents most important road network;
  a data receiving unit for receiving location information indicative of shape of an objective road; and
  a map matching unit for identifying the objective road on the digital map by executing shape matching the location information with the hierarchized road network data,
  wherein the map matching unit starts executing the shape matching using the road network of the most-upper-grade hierarchical layer.

4. The method according to claim 3, wherein when the map matching unit cannot identify the objective road on the digital map by executing shape matching using the road network of the most upper-grade hierarchical layer, the map matching unit executes the shape matching using road network of one-lowered-grade hierarchical layer.

* * * * *

UNITED STATES PATENT AND TRADEMARK OFFICE
CERTIFICATE OF CORRECTION

PATENT NO. : 7,657,372 B2
APPLICATION NO. : 10/509315
DATED : February 2, 2010
INVENTOR(S) : Adachi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1332 days.

Signed and Sealed this

Thirtieth Day of November, 2010

David J. Kappos
*Director of the United States Patent and Trademark Office*